(12) United States Patent
Ohara et al.

(10) Patent No.: US 6,366,300 B1
(45) Date of Patent: Apr. 2, 2002

(54) VISUAL PROGRAMMING METHOD AND ITS SYSTEM

(75) Inventors: Eiji Ohara; Midori Suzuki; Shozo Kondo; Nobuhiro Suetsugu; Akio Hagino, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/171,818

(22) PCT Filed: Mar. 10, 1998

(86) PCT No.: PCT/JP98/00979

§ 371 Date: Oct. 27, 1998

§ 102(e) Date: Oct. 27, 1998

(87) PCT Pub. No.: WO98/40817

PCT Pub. Date: Sep. 17, 1998

(30) Foreign Application Priority Data

Mar. 11, 1997 (JP) ................................................ 9-56750

(51) Int. Cl.[7] .............................. G06F 3/00; G06F 19/00
(52) U.S. Cl. ........................ 345/771; 345/835; 345/967; 700/83; 706/47; 706/59; 717/1
(58) Field of Search ................................. 345/339, 347, 345/348–349, 356, 967, 975, 764, 808, 835, 839, 853, 867, 970, 771, 773; 706/46, 47, 55, 59, 60, 919, 922; 717/1, 4, 10; 700/83

(56) References Cited

U.S. PATENT DOCUMENTS 4,827,404 A * 5/1989 Barstow et al. ................ 703/20
5,450,540 A * 9/1995 Spohrer et al. ............. 345/339 X
5,485,620 A    1/1996 Sadre et al. ................... 717/10
5,537,630 A    7/1996 Berry et al. ................... 345/326
5,566,295 A   10/1996 Cypher et al. ................ 345/326
5,760,788 A * 6/1998 Chainini et al. .......... 345/348 X
5,801,942 A * 9/1998 Nixon et al. ................... 700/83
6,182,024 B1 * 1/2001 Gangopadhyay et al. ... 717/1 X
6,185,728 B1 * 2/2001 Hejlsberg ....................... 717/1
6,189,138 B1 * 2/2001 Fowlow et al. ................ 717/1
6,225,998 B1 * 5/2001 Okita et al. .................. 345/356

FOREIGN PATENT DOCUMENTS

| DE | 4118356 C2 | 12/1992 |
| JP | 6230804 | 8/1994 |
| JP | 7253876 | 10/1995 |
| WO | 9119237 | 12/1991 |

* cited by examiner

Primary Examiner—Raymond J. Bayerl
Assistant Examiner—X. L. Bautista

(57) ABSTRACT

The user is allowed to automatically generate a program by using a visual programming method and a system adopting the method for automatically generating a program wherein an object selection means 8 is used for selecting a behavioral graphical object defining the behavior of a load connected thereto, a behavior selection means 9 is used for selecting the type of the behavior of the behavioral graphical object, a relevant object selection means 10 is used for selecting relevant graphical objects related to the behavior of the behavioral graphical object and a behavioral rule setting means 11 is used for setting behavioral rules of the behavioral graphical object whereas a behavioral characteristic selection unit 3509 is used for selecting a behavior of a behavioral graphical object selected by using a behavioral object selection unit 3508, behavioral condition setting unit 3510 is used for setting conditions for the behavior of the behavioral graphical object and a relevant object selection unit 3511 is used for defining a relation.

17 Claims, 46 Drawing Sheets

FIG.51

```
┌─────────────────────────────────────────┐
│ FLICKER                          5110   │
│   COMMENT                               │
│   ┌─────────────────────────────┐       │
│   └─────────────────────────────┘       │
│        ☐ DISPLAY                        │
│  ───────────────────────────────────    │
│   ┌─ON TIME WIDTH──────────────────┐    │
│   │                                │    │
│   │   ├──▭────────────┤  [0.3] SECONDS │
│   │                                │    │
│   │   ☐ OCX DATA   SIGNAL [     ]  │    │
│   └────────────────────────────────┘    │
│                                         │
│   ┌─OFF TIME WIDTH─────────────────┐    │
│   │                                │    │
│   │   ├──▭────────────┤  [0.2] SECONDS │
│   │                                │    │
│   │   ☐ OCX DATA   SIGNAL [     ]  │    │
│   └────────────────────────────────┘    │
│                                         │
│                            [ DETAIL ]   │
│   [ CANCEL ]              [ __OK__ ]    │
└─────────────────────────────────────────┘
```

FIG.52

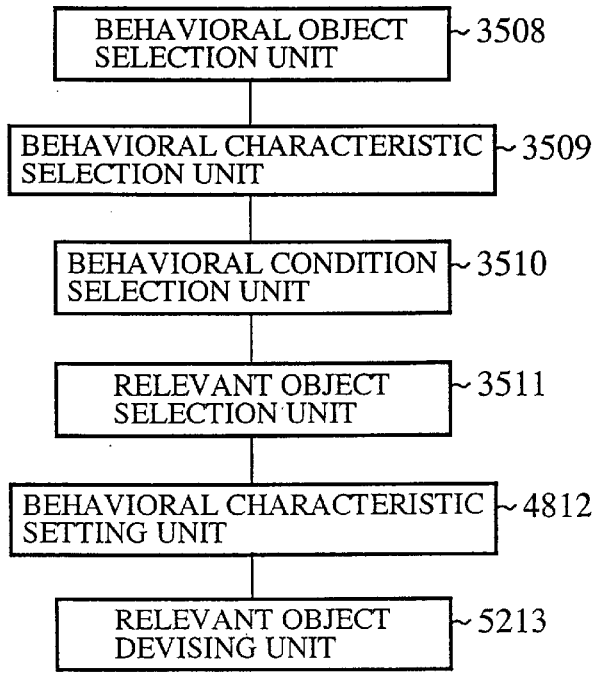

VISUAL PROGRAMMING METHOD AND ITS SYSTEM

This application is the national phase under 35 U.S.C. §371 of prior PCT International Application No. PCT/JP98/00979 which has an International filing date of Mar. 10, 1998 which designated the United States of America, the entire contents of which are hereby incorporated by reference.

TECHNICAL FIELD

In general, the present invention relates to a visual programming method and a system adopting the method. More particularly, the present invention relates to a visual programming method, that is, a user interface technique capable of automatically generating a program by selecting an object defining a behavior, defining the behavior and setting behavioral rules by means of a graphical editor. It also relates to a system adopting the method. Technical fields of the present invention include function block diagrams and visual programming tools based on a diagram widely used as a programming language of a programmable logic controller (PLC), and a work environment for carrying out programming by operating graphical objects such as characters and icons which are displayed on a screen and used in a graphical user interface (GUI) commonly known as a user interface between the user and a personal computer or a workstation serving as a graphical editor.

BACKGROUND ART

With popularization of personal computers, there is a demand for a product that allows the so-called end user, a user who is not specially trained in the programming field, to develop a program.

For the end user, it is as very difficult to master a conventional programming language used for developing a program. For this reason, the idea of mastering the programming language is given up and, instead, an already existing program is used in many cases. This situation is seen as an end user programming problem and, as a solution to this problem, there have been proposed visual programming tools for the end user, programming tools that do not require the conventional literal expressions.

These visual programming tools display graphical objects on a display screen. An example of the graphical objects is an icon which is obtained as a result of treating a certain coherent piece of processing as a component. The end user then forms a combination of a plurality of objects on the display screen and makes some modifications in order to create a program. These visual programming tools are based on object oriented programming languages which are commonly known in the field of information processing. The programming languages themselves are visual.

A prior art disclosed in JP-A No. Hei 8-76985 provides a visual programming tool for a situation in which a given programming language further requires the use of a number of difficult functions, showing the fact that the necessity of visual expressions for the end user exists. At a stage of program development in particular, the end user recognizes the necessity to create variables for holding state information before determining a next step. For this reason, there is a demand for a program specifying inspection of these variables. In JP-A No. Hei 8-76985, on the other hand, there is disclosed a visual programming method which allows the end user to program state information visually by using visual switch objects as a solution once such a programming element has been isolated as one of the difficult functions.

Certainly, storing a state of a program in a variable is a method of the programmer who has been specially trained to write programs. Removal of such a thinking process from programming work is thus considered to be effective for a program development carried out by the end user.

In addition, according to a prior art disclosed in JP-A No. Hei 7-248911, with an existing link object in a user interface for visual programs, it is impossible to write for example a program which requires recursive or iterative processing such as an operation to copy elements of an array having a plurality of elements to other locations. The document shows the fact that a programming language of literal expressions such as BASIC, Smalltalk or C++ must be used in order to write a program of recursive iterative processing. In order to solve this problem, an iterative link object according to another prior art disclosed in JP-A No. Hei 7-248911 is introduced. With this iterative link object, there is provided an interface that allows characteristics of a link to be set so that an iterative application program can be created visually by using such iterative link objects without the need for the end user to master such a programming language. Iterative processing is processing seen in a large number of programs. This prior art is considered to be effective in that the technology allows iterative processing to be programmed visually.

On the other hand, the visual programming tool based on a rudder diagram, a programming language for a programmable logic controller (PLC), adopts a graphical user interface (GUI) to provide an environment in which a variety of parameters can be set. It should be noted that this visual programming tool is one of the technical fields to which the present invention closely relates as will be described later. Unlike the other visual programming tools, however, in the programming environment based on a rudder diagram, a mouse can be used along with a keyboard, increasing operatability accordingly and a rudder diagram is used in the programming language itself.

Nevertheless, the programming language based on a rudder diagram is a programming language for use by a specialist to create a program. To be more specific, a program is created by combining symbols of control devices to compose a sequence control circuit. Thus, in the creation of a program, heuristics (laws of experiences) of relay sequence control and knowledge of a logic circuit are utilized. While this visual programming tool allows a variety of parameters to be set, hence, advanced programming to be carried out, if anything, this tool is for use by a specialist rather than an end user.

As described above, the visual programming tool based on a rudder diagram is opposite to the concept of the user interface for the end user of personal computers and workstations embraced in the prior arts disclosed in JP-A Nos. Hei 8-76985 and Hei 7-248911. Even though the main market of the programmable logic controller (PLC) has been in the field of factory automation (FA), development of a new market in which a PLC is aimed at relatively simple control such as control of an illuminator or a speaker using a sensor at an exposition booth is in progress. In the new market in this field, the end user is the user of personal computers who is assumed to have no knowledge of a programmable logic controller (PLC) at all. Since a programming tool suited for such an end user does not exist, there is raised a demand for a programming tool that allows a program of a programmable logic controller (PLC) to be created with ease by using a personal computer.

When considering an application of the user interface of the technology disclosed in JP-A No. Hei 8-76985 to a programming environment of a PLC, for example, a study of creation of a program for sequence control of a combination comprising a plurality of input signals and one output signal will lead us to think that the user interface can be applied to programming of, among other kinds of control, sequence control to switch the state of the output signal in dependence on the combination of the states of the input signals such as control to make the output signal operative for a combination of the states of the input signals and make the output signal inoperative for another combination of the states of the input signals. If it is possible to provide an environment in which the output signal can be set in an operative or inoperative state by directly operating a graphical object of the output signal, more intuitive programming is considered to be possible.

When considering an application of the user interface of the technology disclosed in JP-A No. Hei 7-248911 to a programming environment of a PLC, a combination of symbols can be thought as a good application of the link object. In this case, however, such an application of the user interface results in a programming technique that is basically the same as the programming technique using a rudder diagram. In addition, in relay sequence control resulting from recursive or iterative programming disclosed in Japanese Laid-open No. Hei 7-248911, there are a number of pieces of recursive processing. It is thus quite within the bounds of possibility that recursive processing can be implemented by linking link objects to form a loop. However, there is still a pending issue that the programming problem of sequence processing, the function of each link object, is not solved.

As described above, while the visual programming tool based on the conventional rudder diagram allows a complicated program to be created, there is a problem that it is difficult to use the tool unless the user has the knowledge of a specialist. As a solution to the problem, an environment which allows a program to be created with ease by the end user even if the end user does not have programming knowledge is applied to the visual programming tool based on a rudder diagram. Even though such an environment has been proposed for use by the end user of personal computers and workstations, it is still difficult to solve the problem. Thus, the problem can be converted into a problem caused by the fact that it is necessary to provide a new user interface that allows a program to be created with ease by the end user even if the end user does not have programming knowledge.

A function block diagram (FBD) is a program created by a language whereby function blocks (FBs), graphical objects each representing a function, are connected to each other to form a flow of data processing. A graphical editor for this language is a tool providing a work environment in which programming can be carried out by operating graphical objects displayed on a screen. The graphical objects include icons and characters used in the graphical user interface (GUI), a commonly known user interface for personal computers and workstations.

In general, it is difficult for the end user who does not do programming work as a main job to develop a program. For such a user, there has been provided an environment for creating a program by connecting graphical objects representing functions to each other along a flow of signals or data in the function block diagram (FBD) language through the use of a graphical editor. In such an environment, the user has to carry out operations to connect graphical objects to generate a program. An example of an operation to connect graphical objects is to connect an output OUT1 of a function block FB1 to an input IN2-1 of a function block FB2 by a line. In this operation, it is necessary for the user to carry out a drag and drop operation, an operation comprising the steps, of pressing the button of a mouse, moving (or dragging) the, mouse to a target position with the button continuously pressed as it is and terminating (or dropping) the operation to press the button as the mouse arrives at the target position. The drag and drop operation is said to be one of most difficult operations of a computer. In the example, it is necessary for the user to do work to move the mouse from the output node OUT 1 to the input node IN2-1 with the button of the mouse pressed continuously as it is. In addition, since the function block FB2 has 2 inputs nodes IN2-1 and IN2-2, the output node OUT1 can be connected incorrectly to the input node IN2-2 unless the drag and drop operation is carried out by moving the mouse to the input node IN2-1, a target position, accurately as the mouse approaches the input node IN2-1. In operation to insert a function block FB5 into a location between function blocks FB3 and FB4, it is necessary to move the function blocks FB3 and FB4. This operation to insert the function block FB5 and to move the function blocks FB3 and FB4 must be done also by carrying out drag and drop operations. Since the display area of the graphical editor is limited, the user spends time and energy for most of the work on editing the layout of function blocks FBs, giving rise to a problem that the efficiency of the original work to create a program is lowered in some cases. In addition, in an arrangement of a plurality of function blocks (FBs), results of program execution may vary in dependence on an order the function blocks are arranged, making it necessary for the user to take the order of arrangement into consideration. In particular, the operation to take the order of arrangement into consideration is difficult for an end user.

As described above, an operation to connect function blocks to each other to be carried out by the user is cumbersome and lowers the work efficiency. On the other hand, the operation of connecting function blocks to each other by lines has a merit that the user is capable of understanding the flow of data visually. It is thus necessary to provide a new user interface which allows the user to create a program as a functional block diagram (FBD) with ease without the need to do the operation of connecting function blocks to each other by lines as in a conventional programming tool.

It is therefore an object of the present invention to address the problems described above and to provide a visual programming method and a system adopting the method which allow a program to be created by the user with ease even if the user does not have knowledge of programming. It is also another object of the present invention to provide a visual programming method and a system adopting the method allowing programming work to be done with ease and a rudder diagram to be displayed as a result of the programming work by using visual objects, that is, a visual programming method and a system adopting the method applicable to a rudder diagram, a programming language of a PLC which can be visually understood with ease.

It is still another object of the present invention to provide a visual programming method and a system adopting the method that allow a program comprising functional blocks (FBs) to be created easily without carrying out operations to connect the functional blocks to each other by lines. In particular, it is a further object of the present invention to provide a visual programming method and a system adopting the method which are applicable a function block diagram (FBD), a programming language of a programmable logic controller (PLC). By utilizing the visual programming method and a system adopting the method provided by the present invention, a function block diagram (FBD) can also be displayed by using graphical objects. As a result, the user is capable of doing programming work with ease and creating a program in an environment which can be visually understood with ease.

DISCLOSURE OF INVENTION

A visual programming method according to the present invention comprises the steps of:

displaying graphical objects each defining a behavior on a graphical editor used for carrying out programming work by operating graphical objects each visually representing a function and selecting, from the displayed graphical objects, objects used in the programming work;

displaying behavioral characteristics of the graphical objects and selecting a behavioral characteristic for each of the selected graphical objects;

defining a relation among the plurality of selected graphical objects; and setting a behavioral rule of the selected graphical objects.

As a result, even a user who has a lack of professional knowledge of programming is capable of developing a program with ease.

In addition, in the visual programming method according to the present invention, the step of selecting a behavioral characteristic of a graphical object displayed on the graphical editor further includes a step of entering a detailed parameter of the behavioral characteristic. As a result, the user is capable of changing a set value of a behavioral characteristic and, hence, creating a program with ease.

Moreover, in the visual method according to the present invention, the step of setting a behavioral rule for graphical objects each defining a behavior with respect to the graphical objects further includes a step of generating a behavioral rule not set yet on the graphical editor from already set behavioral rules. As a result, the user is capable of creating a program with ease without the need to take all behavioral rules into consideration.

Further, in the visual programming method according to the present invention, the step of generating a behavioral rule not set yet from already set behavioral rules further includes a step of displaying the generated behavioral rule. As a result, programming is made simple.

In addition, in the visual programming method according to the present invention, the step of generating a behavioral rule not set yet from already set behavioral rules further includes a step of allowing a user to modify a generated behavioral rule by entering an acceptance or refusal input in response to the displayed behavioral rule. As a result, programming is made simple.

Moreover, in the visual programming method according to the present invention, there is further included a step of adding a modified behavioral rule to already set behavioral rules. As a result, programming is made simple.

Further, in the visual programming method according to the present invention, there is further included a step of generating a logic equation from already set behavioral rules. As a result, the efficiency of the programming work is enhanced.

In addition, in the visual programming method according to the present invention, there is further included a step of displaying results of the visual programming on the graphical editor obtained at each of the steps in terms of graphical objects and allowing a user to verify a behavior by operating the graphical objects displayed on the graphical editor. As a result, the user is capable of correctly creating a program with ease.

Moreover, in the visual programming method according to the present invention, a step of verifying a behavior further includes a step of generating a literal sentence written in a natural language to describe a program displayed on the graphical editor and displaying the generated literal sentence on the graphical editor. As a result, programming is made simple.

Further, a system adopting the visual programming method according to the present invention comprises:

an object selection means which displays graphical objects each defining a behavior on a graphical editor and which allows a user to select those of the displayed graphical objects as objects to be used in the programming work;

a behavior selection means which displays behavioral characteristics of the graphical objects and which allows the user to select a behavioral characteristic of each of the selected graphical objects;

a relevant object selection means which defines a relation among the plurality of graphical objects selected by using the object selection means and the behavior selection means; and a behavioral rule setting means which sets a behavioral rule of the selected graphical objects.

As a result, by operating graphical objects obtained as a result of visually expressing a function, even a user who has a lack of professional knowledge of programming is capable of developing a program with ease.

In addition, in the system adopting the visual programming method according to the present invention, a behavioral parameter setting means allows a user to enter a detailed parameter of a behavior selected by using the behavior selection means to the graphical editor. As a result, the user is capable of changing a set value of a behavioral characteristic and, hence, creating a program with ease.

Moreover, in the system adopting the visual programming method according to the present invention, a behavioral rule generation means generates a behavioral rule not set yet on the graphical editor from behavioral rules already set by the behavioral rule setting means. As a result, the user is capable of creating a program with ease without the need to take all behavioral rules into consideration.

Further, in the system adopting the visual programming method according to the present invention, a generated rule display means displays a behavioral rule generated by the behavioral rule generation means. As a result, programming is made simple.

In addition, in the system adopting the visual programming method according to the present invention, a behavioral rule modification means allows a user to modify a behavioral rule displayed by the system generated rule display means by entering an acceptance or refusal input in response to the displayed behavioral rule. As a result, programming is made simple.

Moreover, in the system adopting the visual programming method according to the present invention, a behavioral rule addition means adds a behavioral rule changed by the behavioral rule modification means to behavioral rules already set by the behavioral rule setting means. As a result, programming is made simple.

Further, in the system adopting the visual programming method according to the present invention, a logic equation generation means automatically generates a logic equation from already set behavioral rules. As a result, a program generated by the visual programming system can be executed at a high speed and, hence, the efficiency of the programming work can be enhanced.

In addition, in the system adopting the visual programming method according to the present invention, a behavior verification means displays a program automatically generated on the basis of data supplied by the behavior selection means, the behavioral parameter setting means and the logic equation generation means on the graphical editor in terms of graphical objects and allows a user to verify a behavior by operating the graphical objects displayed on the graphical editor. As a result, the user is capable of correctly creating a program with ease.

Moreover, in the system adopting the visual programming method according to the present inventions a natural language statement display means generates a literal sentence written in a natural language to describe a program displayed on the graphical editor by the behavior verification means and displays the generated literal sentence on the graphical editor. As a result, the user is capable of creating a program with ease.

Further, a visual programming method according to the present invention comprises:

- a first step of creating and displaying graphical objects each defining a behavior on a graphical editor used for carrying out programming work by operating graphical objects each visually representing a function;
- a second step of creating a layout diagram showing a layout of graphical objects representing configuration members of an application system being created by a user and displaying the layout diagram on the same screen as a screen used at the first step; and
- a third step of allowing the user to select one of the graphical objects each used for defining a behavior and displayed at the first step and transferring the selected graphical object to the layout diagram.

In addition, the visual programming method according to the present invention further comprises a fourth step of allowing a user to select a graphical object or a plurality of graphical objects from the graphical objects each used for defining a behavior and displayed at the first step and transferring the same plurality of selected graphical objects to the layout diagram. As a result, the user is capable of doing work to create a more sophisticated program with ease and a high degree of efficiency.

Moreover, the visual programming method according to the present invention further comprises a fifth step of displaying a graphical object or a plurality of graphical objects transferred at the fourth step on the layout diagram. As a result, the user is capable of doing work to create a more sophisticated program with ease and a high degree of efficiency.

Further, the visual programming method according to the present invention further comprises:

- a sixth step of creating a layout diagram showing a layout of graphical objects representing configuration members of an application system being created by a user and displaying the layout diagram on a screen different from a screen used at the first step; and
- a seventh step of allowing the user to select one of the graphical objects each used for defining a behavior and displayed at the first step and transferring the selected graphical object to the layout diagram created and displayed at the sixth step.

As a result, the user is capable of doing work to create a more sophisticated program with ease and a high degree of efficiency.

In addition, the visual programming method according to the present invention further comprises an eighth step of allowing a user to select a plurality of graphical objects from the graphical objects each used for defining a behavior and each displayed at the first step and then transferring the same plurality of selected graphical objects to the layout diagram created at the sixth step. As a result, the user is capable of doing work to create a more sophisticated program with ease and a high degree of efficiency.

Moreover, the visual programming method according to the present invention further comprises a ninth step of allowing a user to select a graphical object or a plurality of graphical objects from the graphical objects each used for defining a behavior and each displayed at the first step and then transferring the same plurality of selected graphical objects to the layout diagram created at the sixth step as well as displaying the same plurality of selected graphical objects on the layout diagram. As a result, the user is capable of doing work to create a more sophisticated program with ease and a high degree of efficiency.

Further, the visual programming method according to the present invention further comprises:

- a tenth step of identifying arrangement orders of graphical objects selected by a user and assigning a priority to each of the arrangement orders in case a plurality of arrangement orders are identified;
- an eleventh step of displaying the same plurality of identified arrangement orders sequentially one after another in a sequence determined by the priorities assigned thereto at the tenth step; and
- a twelfth step of allowing the user to select an arrangement order among the same plurality of identified arrangement orders displayed sequentially at the eleventh step.

As a result, the user is capable of doing work to create a more sophisticated program with ease and a high degree of efficiency.

In addition, the visual programming method according to the present invention further comprises a thirteenth step of allowing a user to change an arrangement order of graphical objects selected by the user at the twelfth step. As a result, the user is capable of doing work to create a more sophisticated program with ease and a high degree of efficiency.

Moreover, the visual programming method according to the present invention further comprises:

- a 14th step of detecting a settable parameter graphical object with a parameter thereof not set yet among graphical objects selected by a user and notifying the user of a result of detection;
- a 15th step of detecting selection of the graphical object reported to the user at the 14th step or a graphical object other than the reported graphical object and creating as well as displaying a window used for setting a parameter of the reported graphical object or the other graphical object; and
- a 16th step of allowing the user to set the parameter on the window displayed at the 15th step.

As a result, the user is capable of doing work to create a more sophisticated program with ease and a high degree of efficiency.

Further, the visual programming method according to the present invention further comprises:

- a 17th step of selecting one graphical object or a plurality of graphical objects among graphical objects displayed on the graphical editor used for carrying out programming work by operating graphical objects each visually representing a function;

a 18th step of creating a new graphical object on the basis of the graphical objects selected at the 17th step and putting the created new graphical object in a displayable state; and a 19th step of displaying the new graphical object on the graphical editor.

As a result, the user is capable of doing work to create a more sophisticated program with ease and a high degree of efficiency.

In addition, the visual programming method according to the present invention further comprises:

a 20th step of setting state information for graphical objects displayed on the graphical editor used for carrying out programming work by operating graphical objects each visually representing a function;

a 21st step of allowing a user to set a state of each of the graphical objects on the basis of setting carried out at the 20th step; and a 22nd step of storing a result obtained at the 21st step as a behavioral rule.

As a result, the user is capable of doing work to create a more sophisticated program with ease and a high degree of efficiency.

Moreover, the visual programming method according to the present invention further comprises a 23rd step of recreating and displaying a behavioral rule stored at the 22nd step on another screen. As a result, the user is capable of doing work to create a more sophisticated program with ease and a high degree of efficiency.

Further, the visual programming method according to the present invention further comprises:

a 24th step of allowing a user to change a state of a graphical object; and a 25th step comprising the steps of:

monitoring a state of a graphical object set at the 24th step;

setting state information in graphical objects displayed on the graphical editor, used for carrying out programming work, by operating ordinary graphical objects each visually representing a function; and, if a behavioral condition, set by the user corresponding to respective states of the graphical objects and used as behavioral rules on the basis of the set state information, is satisfied, detecting a parameter settable graphical object with a parameter thereof not set yet from graphical objects selected by the user;

detecting selection of the parameter settable graphical object or a graphical object other than the parameter settable graphical object and creating a window used for setting a parameter of the parameter settable graphical object or the other graphical object;

allowing the user to set a parameter on the displayed window; and changing a state of the graphical object in accordance with the parameter set by the user.

As a result, the user is capable of doing work to create a more sophisticated program with ease and a high degree of efficiency.

In addition, the visual programming method according to the present invention further comprises a 26th step of allowing a user to change an image of a graphical object. As a result, the user is capable of doing work to create a more sophisticated program with ease and a high degree of efficiency.

Moreover, a programming system according to the present invention comprises:

a display means for creating and displaying graphical objects each defining a behavior on a screen of a graphical editor, which is used for carrying out programming work, by operating graphical objects each visually representing a function, so as to create a layout diagram showing a layout of graphical objects representing configuration members of an application system being created by a user and to display the layout diagram on the same screen as the screen of the graphical editor; and a transfer means for transferring a graphical object selected by the user among the graphical objects each used for defining a behavior and displayed by the display means to the layout diagram.

As a result, the user is capable of doing work to create a more sophisticated program with ease and a high degree of efficiency.

Moreover, in the system adopting the visual programming method according to the present invention, the transfer means transfers a plurality of graphical objects selected by a user from among the graphical objects displayed by the display means for creating and displaying graphical objects each defining a behavior to the layout diagram. As a result, the user is capable of doing work to create a more sophisticated program with ease and a high degree of efficiency.

Further, in the system adopting the visual programming method according to the present invention, the display means displays one graphical object or a plurality of graphical objects transferred by the transfer means on the layout diagram. As a result, the user is capable of doing work to create a more sophisticated program with ease and a high degree of efficiency.

In addition, in the system adopting the visual programming method according to the present invention:

the display means creates a layout diagram showing a layout of graphical objects representing configuration members of an application system being created by a user and displays the layout diagram on a screen different from a screen for displaying a layout diagram showing a layout of graphical objects each defining a behavior; and the transfer means transfers a graphical object selected by the user from the graphical objects each defining a behavior to the layout diagram different from the laid out diagram showing a layout of graphical objects representing configuration members of an application system.

As a result, the user is capable of doing work to create a more sophisticated program with ease and a high degree of efficiency.

Moreover, in the system adopting the visual programming method according to the present invention, the transfer means transfers a plurality of graphical objects, selected by a user from the graphical objects used for defining behaviors and displayed by the display means, to a layout diagram different from a laid out diagram showing a layout of graphical objects representing configuration members of an application system. As a result, the user is capable of doing work to create a more sophisticated program with ease and a high degree of efficiency.

Further, in the system adopting the visual programming method according to the present invention, the display means displays a graphical object or a plurality of graphical objects transferred by the transfer means on a layout diagram different from a layout diagram showing a layout of graphical objects representing configuration members of an application system.

In addition, the system adopting the visual programming method according to the present invention comprises:

an identifying means for identifying the arrangement orders of graphical objects selected by a user and for assigning a priority to each of the arrangement orders when a plurality of arrangement orders are identified;

a step display means for displaying the same plurality of identified arrangement orders sequentially one after another in a sequence determined by the priorities assigned thereto by the identifying means; and a select means for allowing the user to select an arrangement order among the same plurality of identified arrangement orders displayed sequentially by the step display means.

As a result, the user is capable of doing work to create a more sophisticated program with ease and a high degree of efficiency.

Moreover, the system adopting the visual programming method according to the present invention comprises a change means for allowing a user to change an arrangement order of graphical objects selected by the user. As a result, the user is capable of doing work to create a more sophisticated program with ease and a high degree of efficiency.

Further, the system adopting the visual programming method according to the present invention comprises:

a notification means for detecting a settable parameter graphical object with a new parameter thereof from among graphical objects selected by a user and for then notifying the user of a result of detection; and a parameter setting means for detecting selection of the graphical object reported to the user by the notification means or a graphical object other than the reported graphical object and allowing the user to set a parameter of the reported graphical object or the other graphical object on a window created and displayed by the display means for setting a parameter.

As a result, the user is capable of doing work to create a more sophisticated program with ease and a high degree of efficiency.

In addition, the system adopting the visual programming method according to the present invention comprises:

a select means for selecting one graphical object or a plurality of graphical objects from among graphical objects displayed on the graphical editor used for carrying out programming work by operating graphical objects each visually representing a function;

a new object creation means for creating a new graphical object on the basis of the one graphical object or the same plurality of graphical objects selected by the select means and putting the created new graphical object in a displayable state; and a new object display means for displaying the new graphical object.

As a result, the user is capable of doing work to create a more sophisticated program with ease and a high degree of efficiency.

Moreover, the system adopting the visual programming method according to the present invention comprises:

a state information setting means for setting state information for graphical objects displayed on the graphical editor used for carrying out programming work by operating graphical objects each visually representing a function;

a state setting means for allowing a user to set a state of each of the graphical objects on the basis of setting carried out by the state information setting means; and a behavioral rule saving means for storing a result produced by the state setting means as a behavioral rule.

As a result, the user is capable of doing work to create a more sophisticated program with ease and a high degree of efficiency.

Further, the system adopting the visual programming method according to the present invention comprises a behavioral rule display means for re-creating and displaying a behavioral rule stored by the behavioral rule saving means on a new screen. As a result, the user is capable of doing work to create a more sophisticated program with ease and a high degree of efficiency.

In addition, the system adopting the visual programming method according to the present invention comprises:

a state change means for allowing a user to change a state of a graphical object; and a state change display means for monitoring a state of a graphical object set by the state change means; and, if a behavioral condition for respective states of the graphical objects set by the user on the basis of the set state information of each of the graphical objects is satisfied, changing a state of the graphical object with a parameter thereof set among the graphical objects each having a settable parameter, and displaying the state.

As a result, the user is capable of doing work to create a more sophisticated program with ease and a high degree of efficiency.

BRIEF DESCRIPTION OF DRAWINGS

FIG. 51 is an explanatory diagram showing a typical parameter setting window;

FIG. 52 is a block diagram showing a system adopting the programming method as implemented by a third embodiment of the present invention;

BEST MODE FOR CARRYING OUT THE INVENTION

In order to describe the present invention in more detail, a best mode for implementing the invention is explained by referring to diagrams as follows.

Basic Configuration

First of all, the basic configurations and the basic operations of a visual programming method provided by the present invention and a system adopting the method are explained to be followed by description of first to twelfth embodiments.

The following description explains typical cases in which the visual programming method provided by the present invention and the system adopting the method are applied to a visual programming environment of a rudder diagram, a programming language of a PLC.

Figure 1:
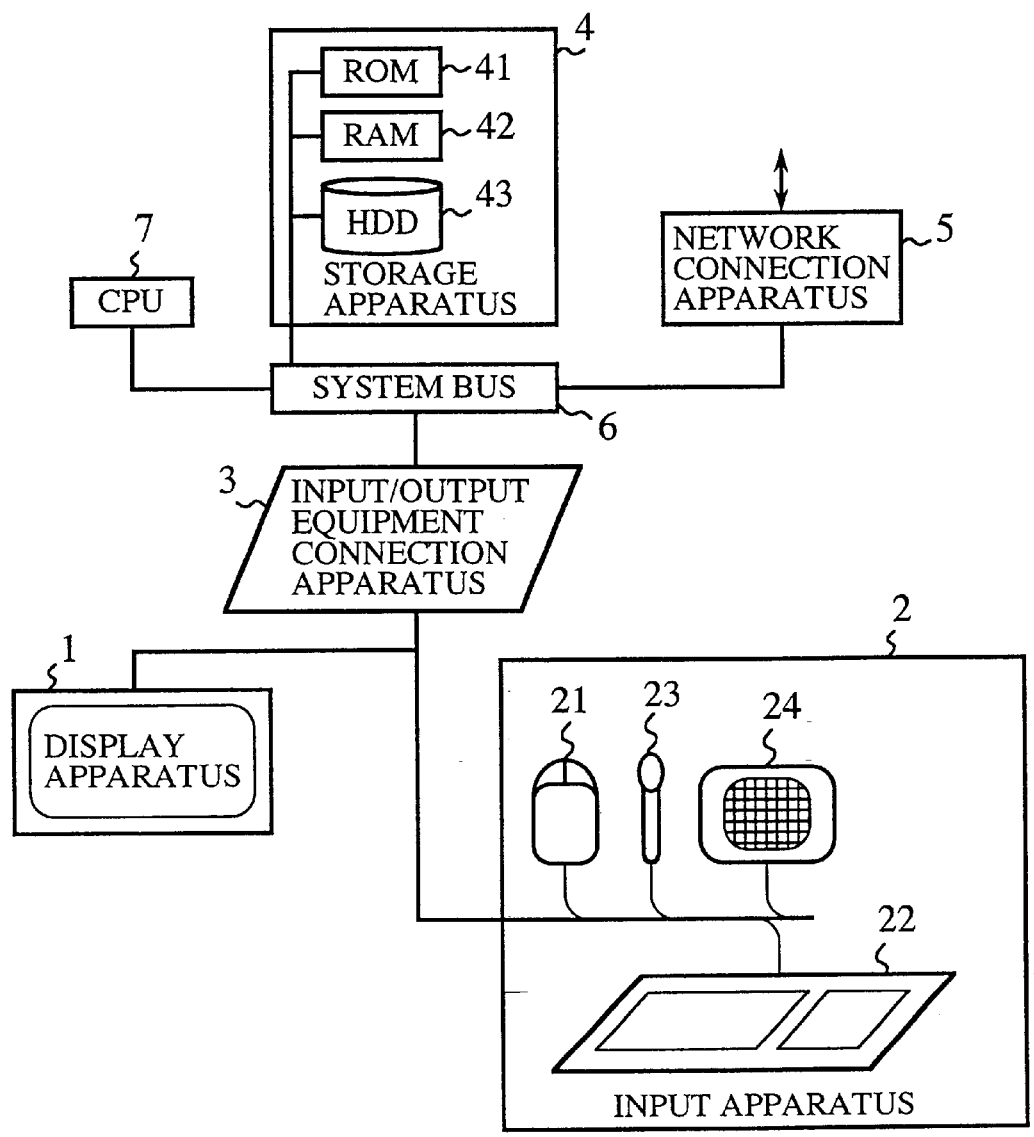
FIG. 1 is a system configuration diagram showing the basic configuration of a system implementing a visual programming method according to the present invention.

FIG. 1 is a diagram showing the basic configuration of hardware composing a system implementing a visual programming method provided by the present invention. In the figure, reference numerals 1 and 2 denote a display apparatus for displaying a graphical editor and an input apparatus respectively. Used for operating the graphical editor, the input apparatus 2 includes a mouse 21, a keyboard 22, a microphone 23, a gesture recognition unit 24, a pen shown in none of the figures and a touch screen also shown in none of the figures. Reference numeral 3 is an input/output equipment connecting apparatus for connecting the display apparatus 1 and the input apparatus 2 to a system bus 6. Reference numeral 4 denotes a storage apparatus. Used as a working area of the graphical editor and for storing a generated program, the storage apparatus 4 includes a read-only memory (ROM) unit 41, a random-access memory (RAM) unit 42, a hard disc drive 43 and a CD-ROM drive which is shown in none of the figures.

Reference numeral 5 is a network connection apparatus for connecting this visual programming system to other systems. The system bus 6 is used for exchanging data among mainly the display apparatus 1, the input apparatus 2, the input/output equipment connecting apparatus 3, the storage apparatus 4, the network connection apparatus 5 and a CPU (Central Processing Unit) 7. The CPU 7 controls operations of the display apparatus 1, the input apparatus 2, the input/output equipment connecting apparatus 3, the storage apparatus 4, the network connection apparatus 5 and the system bus 6 in order to actually carry out processing of the graphical editor. As described above, the system for implementing the visual programming method comprises the display apparatus 1, the input apparatus 2, the input/ output equipment connecting apparatus 3, the storage apparatus 4, the network connection apparatus 5, the system bus 6 and the CPU 7.

Figure 2:
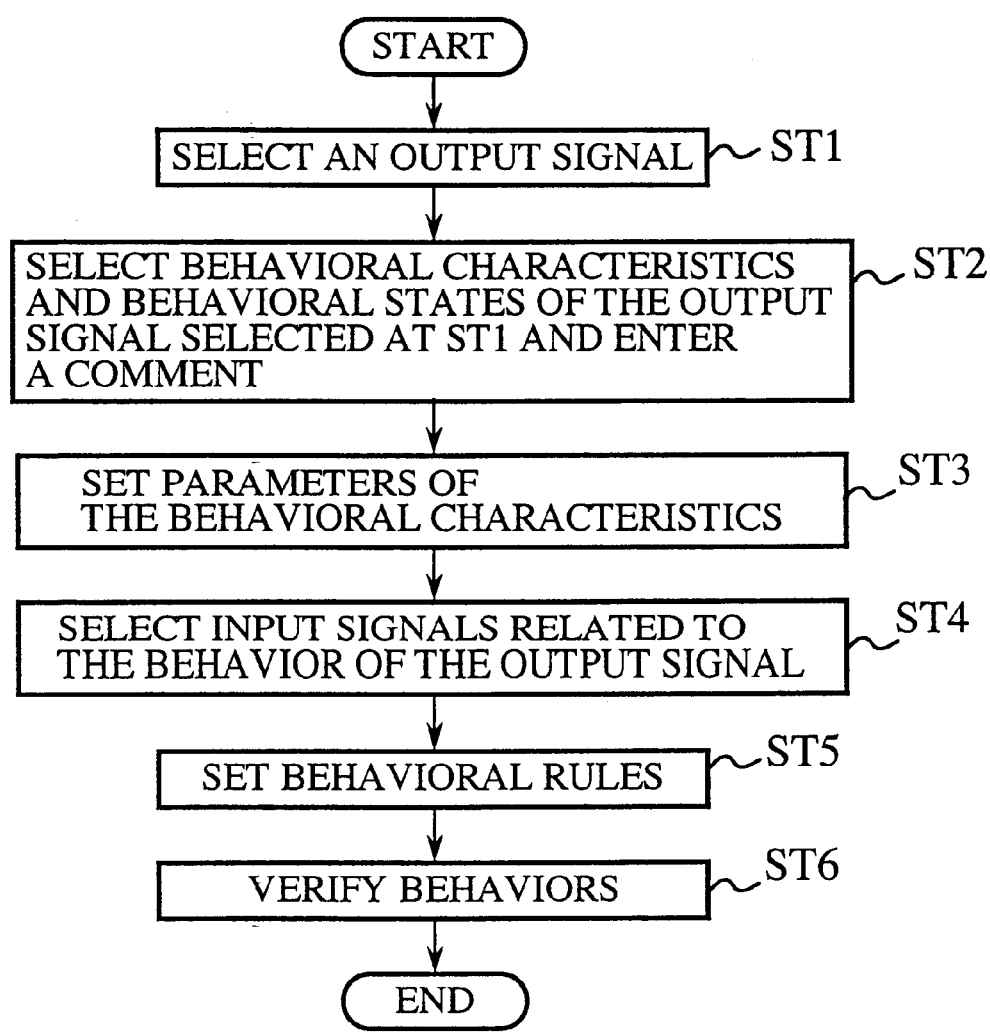
FIG. 2 is a flowchart showing an operation procedure of the visual programming method according to the present invention to be followed by the user.

FIG. 2 is a flowchart showing an operation procedure of the visual programming method provided by the present invention to be followed by the user. The following is a description of a user interface used as an operation procedure of programming work, the most prominent characteristic of the visual programming method provided by the present invention, with reference to operations represented by the flowchart shown in FIG. 2.

The system shown in FIG. 1 for implementing the visual programming method is implemented by systems provided by first to sixth embodiments for implementing the visual programming method as will be described later. In addition, the following explanation of a user interface also applies to later descriptions of the visual programming method and the systems adopting the method as implemented by the first to sixth embodiments.

When the user operates the user interface based on the visual programming method provided by the present invention, the visual programming system provided by the invention automatically generates a program. In the following description, only matters related to the user interface characterizing the visual programming method are explained, excluding automatic generation of a program because the automatic generation of a program is the same as the conventional system.

With the visual programming method provided by the present invention, in order to automatically generate a program of a PLC, the user executes the steps of selecting an output signal defining a behavior; selecting a behavior; selecting signals relevant to the behavior; setting behavioral rules; and confirming the behavior. For operations carried out to execute the steps, the use of various input units can be thought of. Graphical objects such as a button, a check box, a slide bar and an icon are operated mainly by clicking or dragging the mouse 21 of the input apparatus 2. On the other hand, a string of characters is entered mainly by using the keyboard 22 of the input apparatus 2.

Figure 3:
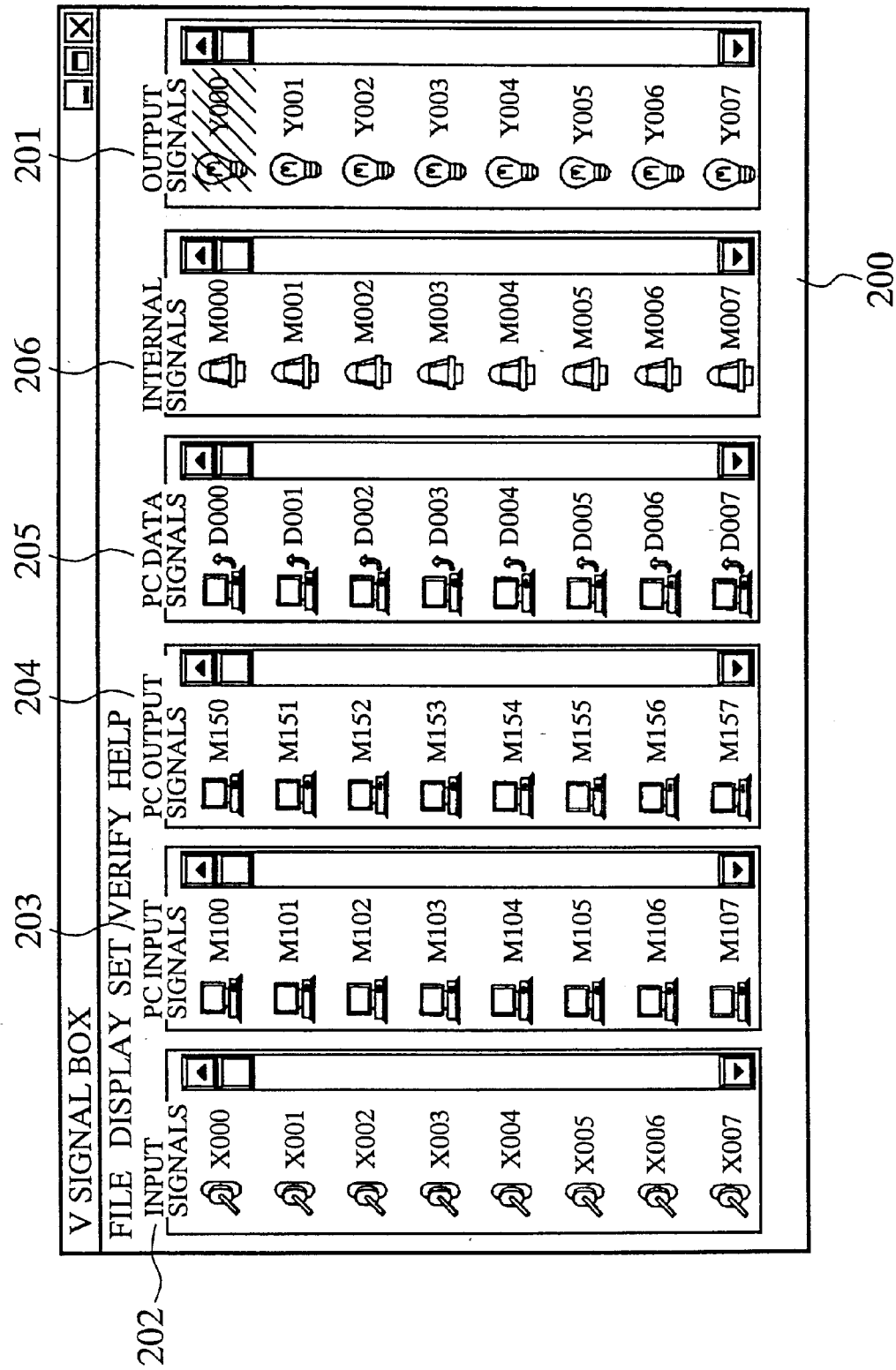
FIG. 3 is an explanatory diagram showing a signal box of output signals.

A flow of operations to select an output signal carried out at a step ST1 of the flowchart shown in FIG. 2 is explained as follows. FIG. 3 is an explanatory diagram showing a signal box, that is, a window used for selecting an object defining a behavior. When a graphical editor is activated, the signal box 200 is displayed as an initial screen of the display apparatus 1.

The user selects a graphical object, that is, an object defining a behavior, by clicking the mouse 21. On the signal box 200, a graphical object representing a signal and the name of the graphical object are displayed as a pair. In the explanatory diagram of FIG. 3, a graphical object with a name of 'Y000' representing one of output signals 201 is selected. The explanation is given below by assuming that the output signal Y000 drives an ordinary lamp.

On the signal box 200, input signals 202, personal computer input signals 203, personal computer output signals 204, personal computer data signals 205 and internal signals 206 are displayed in addition to the output signals 201. Signals displayed on the signal box 200 that can define behaviors are the output signals 201, the personal computer output signals 204 and the internal signals 206.

A flow of operations to select an output signal carried out at a step ST2 of the flowchart shown in FIG. 2 is explained as follows.

Figure 4:
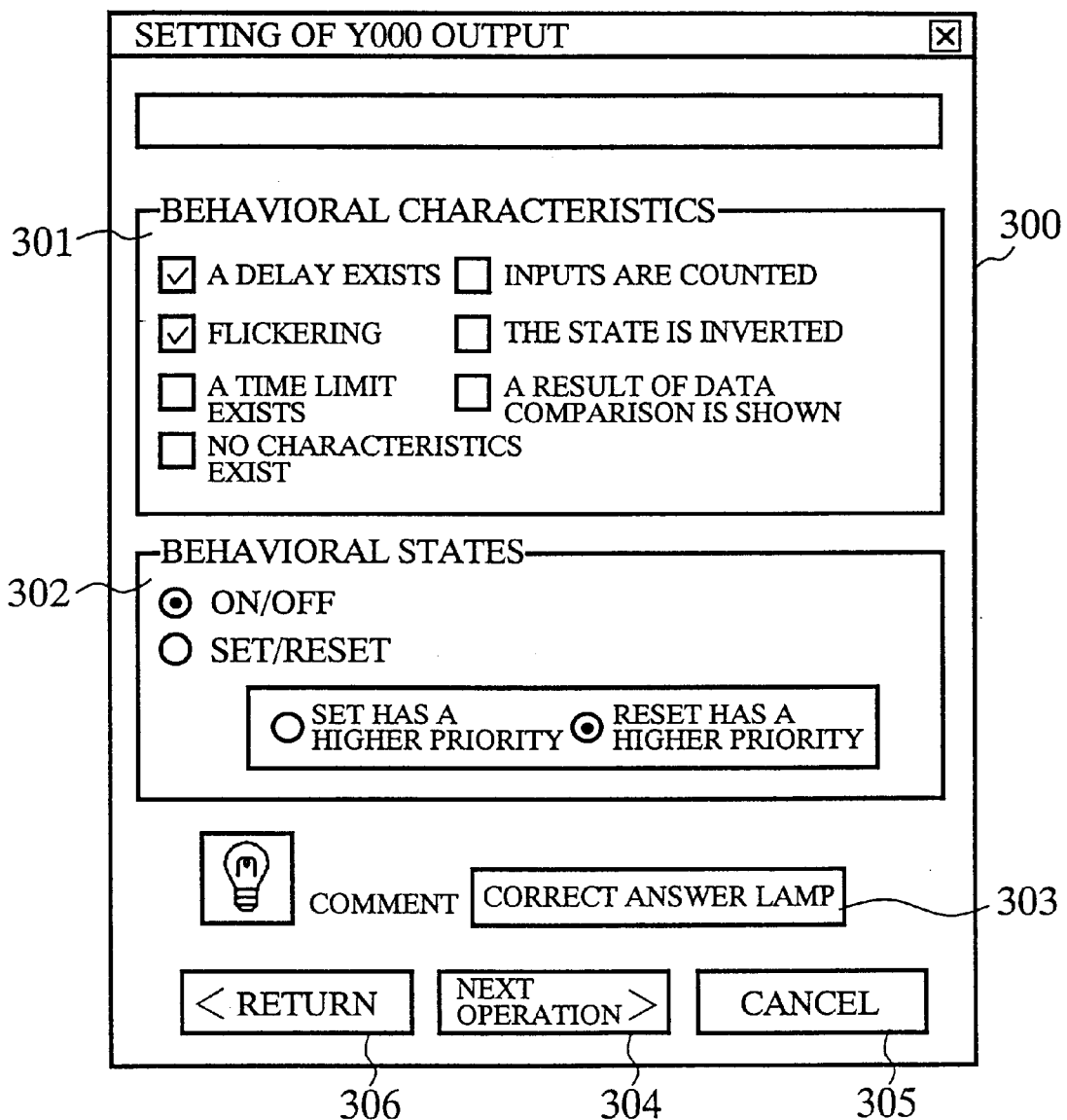
FIG. 4 is an explanatory diagram showing a behavioral characteristic selection window.

FIG. 4 is an explanatory diagram showing a behavioral characteristic selection window 300 for selecting a behavior of the output signal Y000 selected from the signal box 200. The behavioral characteristic selection window 300 shown in FIG. 4 is displayed on the display apparatus 1 when a signal set item of a set, menu on the signal box 200 shown in FIG. 3 is selected. It should be noted that the signal set item itself is not shown in FIG. 3.

The user selects and enters a behavioral characteristic 301, a behavioral state 302 and a comment 303 of the object defining a behavior, which has been selected from the signal box 200 shown in FIG. 3, as follows.

First of all, the user selects a behavioral characteristic 301 by clicking a check box associated with the behavioral characteristic 301 by using the mouse 21. In the explanatory diagram of FIG. 4, 'A delay exists' and 'flickering' behavioral characteristics are selected.

Then, the user selects a behavioral state 302 by clicking a check box associated with the behavioral state 302 by using the mouse 21. In the explanatory diagram of FIG. 4, 'ON/OFF' and 'SET/RESET' behavioral states, either of which is selected by the user, are displayed. The 'ON/OFF' behavioral state applies for example to an imagined case in which on and off operations of an illuminator switch are driven by the selected output signal. On the other hand, the 'SET/REST' behavioral state applies for example to an imagined case in which operations of the selected output signal is used to drive the second needle of a stop watch.

Subsequently, the user enters a comment 303 to a character input area, a field commonly known in the visual interface environment. In the case of creation of a program implementing a quiz response system, for example, the comment can be used for giving a name of 'correct answer lamp' to the output signal Y000. The user enters a string of characters as a comment 303 to the character input area via the keyboard 22. The comment 303 is not absolutely required though. That is to say, a comment 303 does not have to be entered. In the above description, the behavioral characteristic 301, the behavioral state 302 and the comment 303 are entered in an order they are enumerated here. It should be noted, however, that they can be entered in an order freely selected by the user.

At a point of time the behavioral characteristic selection window 300 is displayed on the display apparatus 1, only the 'ON/OFF' behavioral state 302 is set as default setting. Thus, if there is no problem with the default setting kept as it is, the user can click a 'next operation' button 304 by using the mouse 21 in order to go on to a next operation. In this case, if the 'next operation' button 304 is clicked, a window shown in FIG. 6 is displayed on the display apparatus 1. If any of the behavioral characteristics 301 are selected, on the other hand, a window shown in FIG. 5 is displayed on the display apparatus 1.

A flow of the processing to select an output signal carried out at a step ST3 of the flowchart shown in FIG. 2 to set behavioral characteristic parameters is explained as follows.

Figure 5:
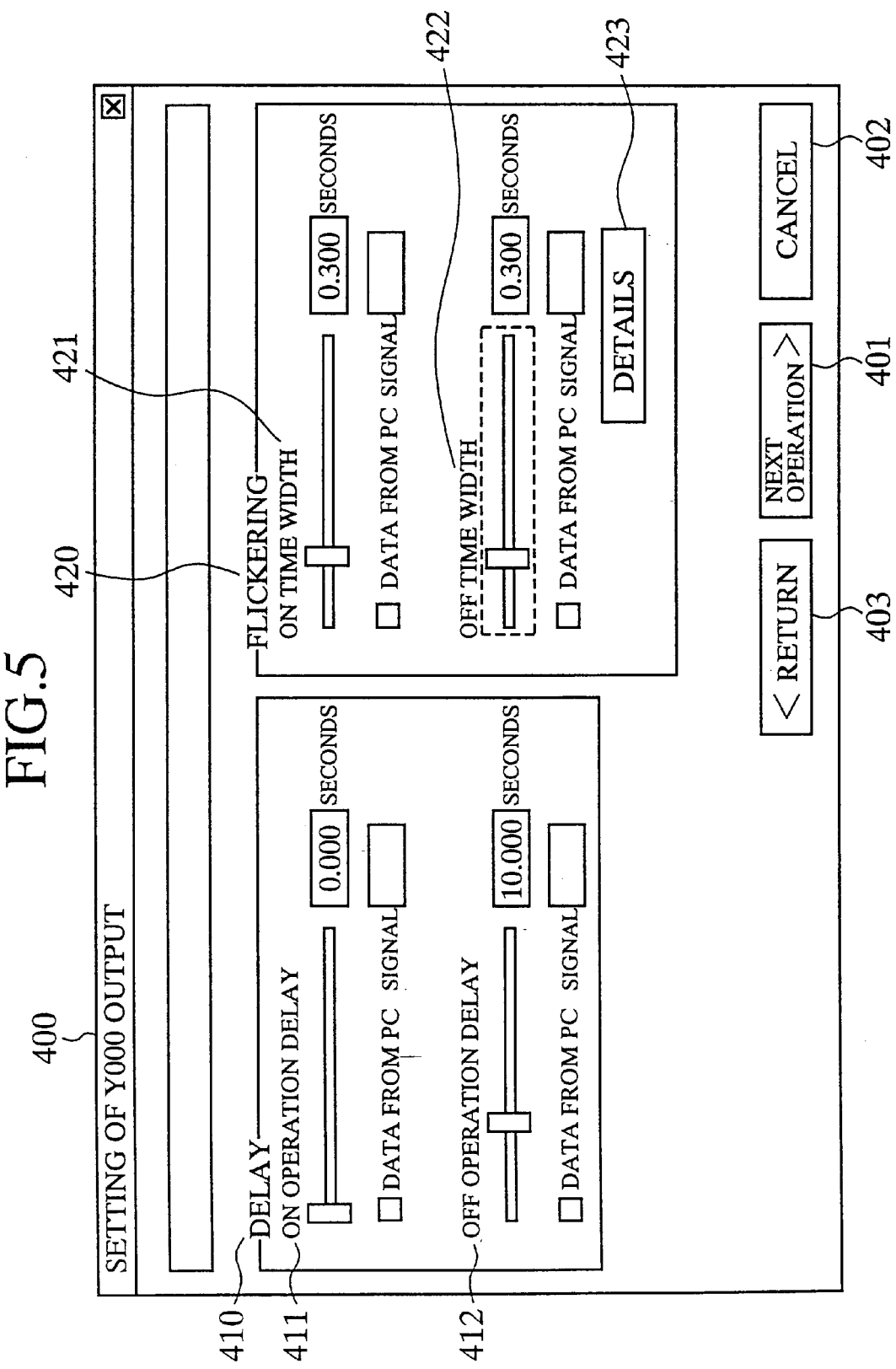
FIG. 5 is an explanatory diagram showing a parameter setting window.
Figure 6:
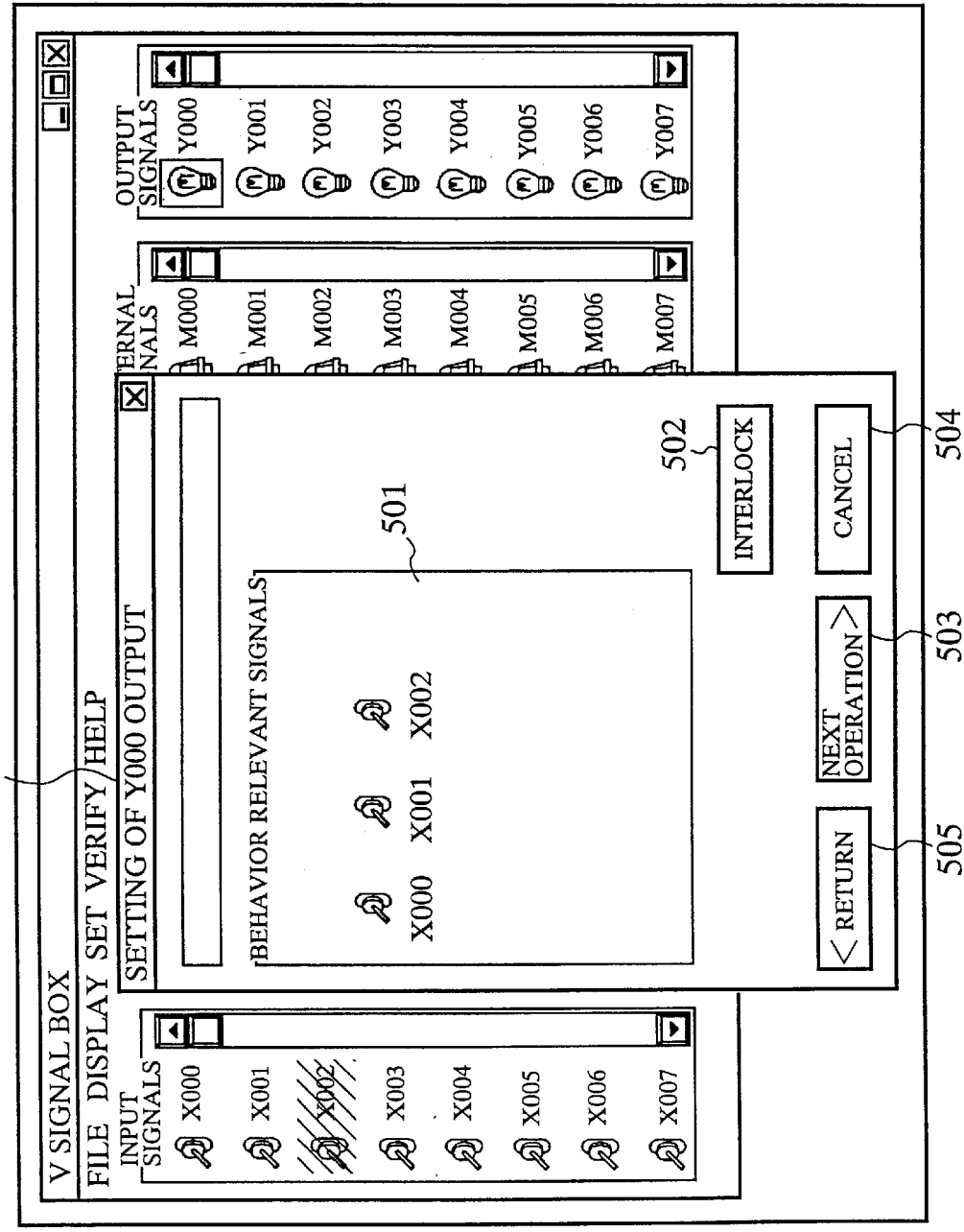
FIG. 6 is an explanatory diagram showing a relevant signal selection window.

FIG. 5 is an explanatory diagram showing a parameter setting window 400 used for setting parameters of the behavioral characteristics 301 selected by using the behavioral characteristic selection window 300 shown in FIG. 4. On the parameter setting window 400, a 'delay' parameter 410 corresponds to the 'A delay exists' item of the behavioral characteristics 301 of the behavioral characteristic selection window 300 shown in FIG. 4 whereas a 'flickering' parameter 420 corresponds to the 'flickering' item of the behavioral characteristics 301 of the behavioral characteristic selection window 300. A parameter is set by dragging a slide bar, a commonly known tool in the visual interface environment, by means of the mouse 21 or by entering a value to the character input area via the keyboard 22.

The following description begins with an explanation of the setting of parameters of the 'delay' item 410. A parameter 'ON operation delay' 411 means a behavioral characteristic of the output signal Y000 to start flickering after a set time delay has lapsed since the output signal Y00 is switched on. If the time delay is set at 10 seconds, for example, the output signal Y000 starts flickering after the time delay of 10 seconds has lapsed since the output signal Y00 is switched on. A parameter 'OFF operation delay' 412 means a behavioral characteristic of the output signal Y000 to start flickering after a set time delay has lapsed since the output signal Y00 is switched off. If the time delay is set at 10 seconds, for example, the output signal Y000 starts flickering after the time delay of 10 seconds has lapsed since the output signal Y00 is switched off. In the present example, the parameter 'ON operation delay' 411 is not set while the value of the parameter 'OFF operation delay' 412 is set at 10 seconds.

Next, the setting of parameters of the 'flickering' parameter 420 is explained. A parameter 'ON time width' 421 is the duration of 1 ON time of a flickering operation whereas a parameter 'OFF time width' 422 is the duration of 1 OFF time of a flickering operation. In the example shown in FIG. 5, the values of both the parameters are set at 0.3 seconds.

A 'detail' button 423 is provided for an advanced programmer who desires to set more detailed parameters. If this button 423 is selected by clicking the mouse 21, a window used for setting detailed parameters is displayed. It should be noted that this window is shown in none of the figures. When the setting of the parameters is finished, a 'next operation' button 401 is clicked by using the mouse 21 to display a relevant signal selection window 500 shown in FIG. 6. In the explanation of the setting of parameters shown in FIG. 5, the parameters are set in an order starting with the 'delay' item 410 to the 'flickering' item 420. It should be noted that the parameters can be set in any arbitrary order.

In addition, parameters of other behavioral characteristics can be set with ease by using similar user interfaces. The operations described so far are what is typically needed by the user to program the behavior of the output signal Y000. Operations carried out at steps ST4 and ST5 of the flowchart shown in FIG. 2 to be explained below set behavioral conditions, that is, conditions for executing the behavior of the output signal Y000 programmed at the steps ST2 and ST3.

A flow of the processing carried out at the step ST4 shown in. 2 to select a signal related to the output signal is explained as follows.

FIG. 6 is an explanatory diagram showing a relevant signal selection window 500, a window used for selecting signals relevant to the behavior of the output signal. A signal relevant to the behavior of the output signal is selected from those shown in the signal box 200 described earlier by clicking a graphical object representing the signal by means of the mouse 21. A graphical object representing a selected signal is automatically displayed in a behavior relevant signal area 501 of the relevant signal selection window 500 as shown in FIG. 6. In the case of some contemporary visual programming tools, in such an operation to select an item signal, it is necessary to carry out an operation of dragging a graphical object representing the selected item to a predetermined position typically by means of a mouse. In the case of the visual programming method provided by the present invention and the system adopting the method, on the other hand; the dragging operation is not required.

In the explanatory diagram of FIG. 6, input signals X000, X001 and X002 are selected by repeating the select operation described above. The input signals X000, X001 and X002 are signals generated by on/off switches for operating the output signal Y000. The switches correspond to switches of a generally used illuminator.

Like the 'detail' button 423 on the parameter setting window 400 shown in FIG. 5, an 'interlock' button 502 is provided for an advanced programmer. Interlocking is prevention of a plurality of output signals from being activated at the same time. If it is desired to prevent the output signals Y000 and Y001 from operating at the same time, the 'interlock' button 502 is clicked by means of the mouse 21 to display an interlock select window which is then used for selecting the output signal Y001. It should be noted that the interlock select window is shown in none of the figures.

Figure 7:
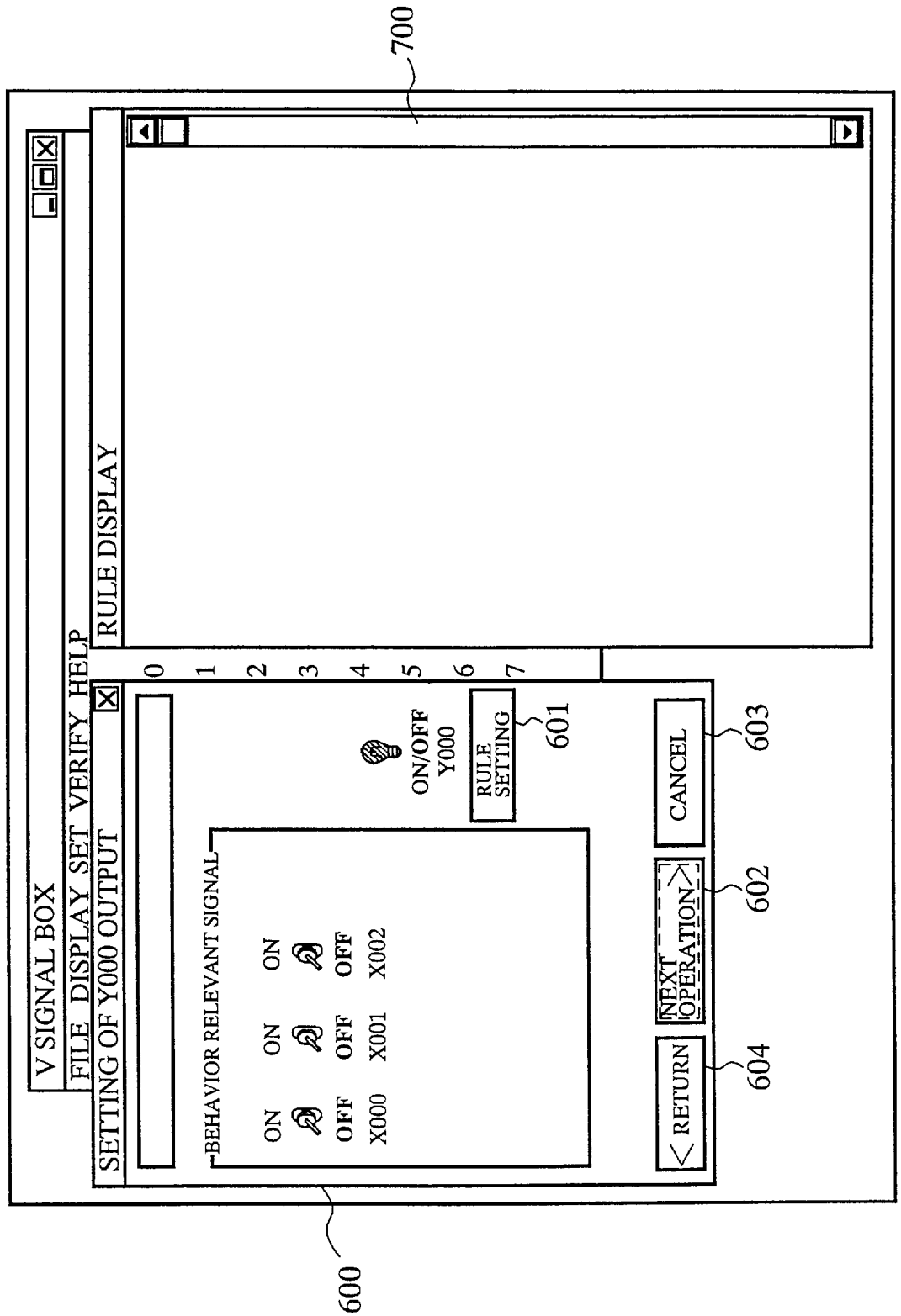
FIG. 7 is an explanatory diagram showing a behavioral rule setting window and a rule display window.

When the selection of the input signals is finished, a 'next operation' button 503 is clicked by using the mouse 21 to go on to the behavioral rule setting window 600 shown in FIG. 7. At the step ST4 described above, the output signal Y000 is programmed to behave in dependence on the input signals X000, X001 and X002. In terms of the conventional language, for example, the programming carried out at the step is equivalent to setting a function for defining the behavior of the output signal Y000 with the function having 3 arguments, namely, the input signals X000, X001 and X002.

The following is a description of a flow of operations carried out at the step ST5 of the flowchart shown in FIG. 2 to set behavioral rules.

FIG. 7 is an explanatory diagram showing a behavioral rule setting window 600 and a rule display window 700. The behavioral rule setting window 600 is used for setting behavioral rules of the output signal. When behavioral rules set by using the behavioral rule setting window 600 is accepted by the visual programming system, the user is informed of the fact that the set rules have been cataloged as behavioral rules by displaying the set rules on the rule display window 700.

When the 'next operation' button 503 of the relevant signal selection window 500 is selected, the relevant signal selection window 500 shown in FIG. 6 disappears from the screen of the display apparatus 1, being replaced by the behavioral rule setting window 600 and the rule display window 700. A behavioral rule defines combinations of the states of a signal defining a behavior and the states of behavior relevant signals. The combinations are each used as a behavioral condition for the signal defining a behavior to enter a state thereof.

In the case of the input signals X000, X001 and X002 selected from the relevant signal selection window 500 shown in FIG. 6, the states of the signals are the 2 ON and OFF states. Thus, for the 3 input signals, there are 8 different combinations. In the case of the output signal Y000, the states of the signal are also the 2 ON and OFF states. At the step ST5, combinations of the states of the input signals X000, X001 and X002 selected at the step ST4 as signals relevant to the behavior of the output signal are programmed as a behavioral condition for the output signal Y000 to display the behavior defined thereby.

In the initial state of the behavioral rule setting window 600, the input signals X001, X002 and X002 are all displayed in an off state. A graphical object representing a signal, meaning in particular an input or output signal in this embodiment, is an object oriented entity which is generally known in the visual programming environment. The graphical object has for example a function to switch from an off state to an on state or vice versa in the event of a click, that is, when the object is clicked by using the mouse 21.

When it is desired to put the input signal X000, which is displayed in an off state initially, in an on state, the user just clicks the graphical object of the input signal X000 by using the mouse 21. Behavioral rules occurring to the user are set sequentially one rule after another by operating graphical objects representing signals. In the case of the example shown in FIG. 7, 8 combinations exist. When it is desired to program the output signal Y000 and the input signals X000, X001 and X002 so that the output signal Y000 is activated when the input signal X000 is on and either of the input signals X001 and X002 is on, behavioral rules 1 and 2 are set as follows. Behavioral rule 1 is (X000: on, X001: on and X002: off Y000: on) whereas behavioral rule 2 is (X000: on, X001: off and X002: on Y000: on) where notation 'Y000: on' means that the output signal Y000 is activated to a flickering state.

Figure 8:
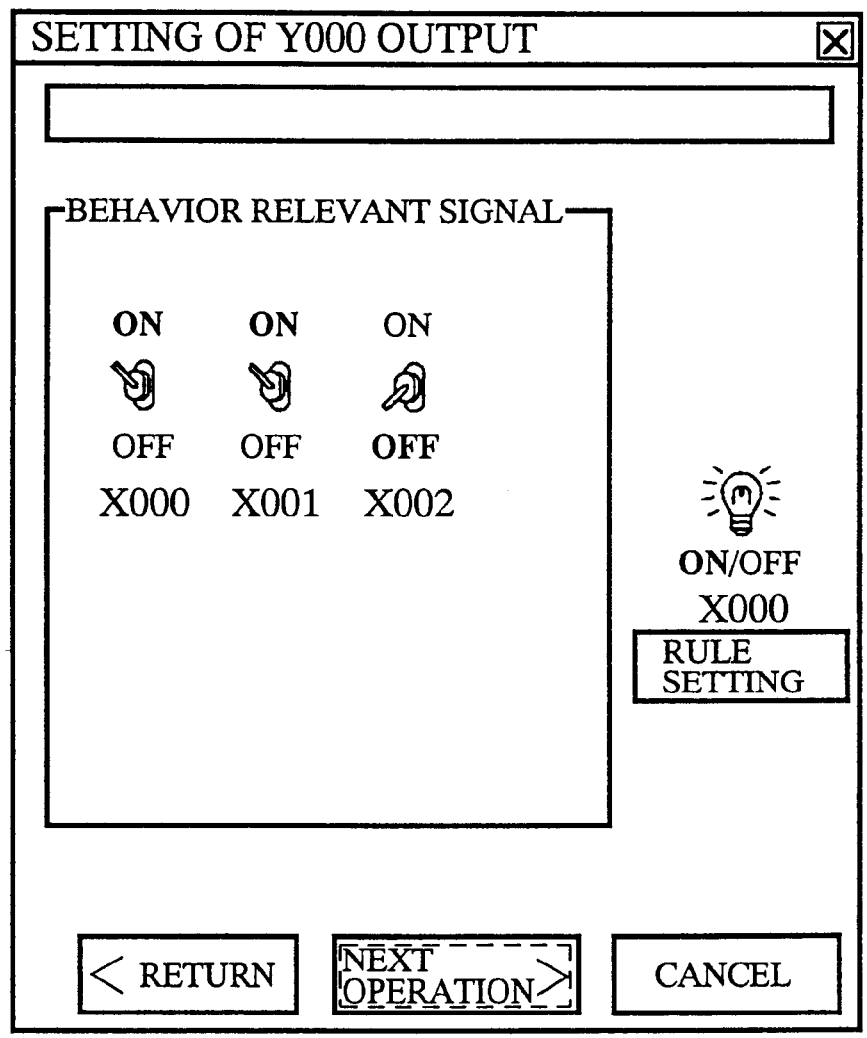
FIG. 8 is an explanatory diagram showing a typical displayed screen of the behavioral rule setting window shown in FIG. 7.

FIG. 8 is an explanatory diagram showing of the behavioral rule setting window 600 wherein behavioral rule 1 described above has been set. In order to catalog behavioral rule 1 as a behavioral rule, a 'rule setting' button 601 is clicked by using the mouse 21. When the 'rule setting' button 601 is clicked by using the mouse 21, the set rule is displayed on a rule display window 700 to notify the user that behavioral rule 1 has been cataloged in the visual programming system.

Figure 9:
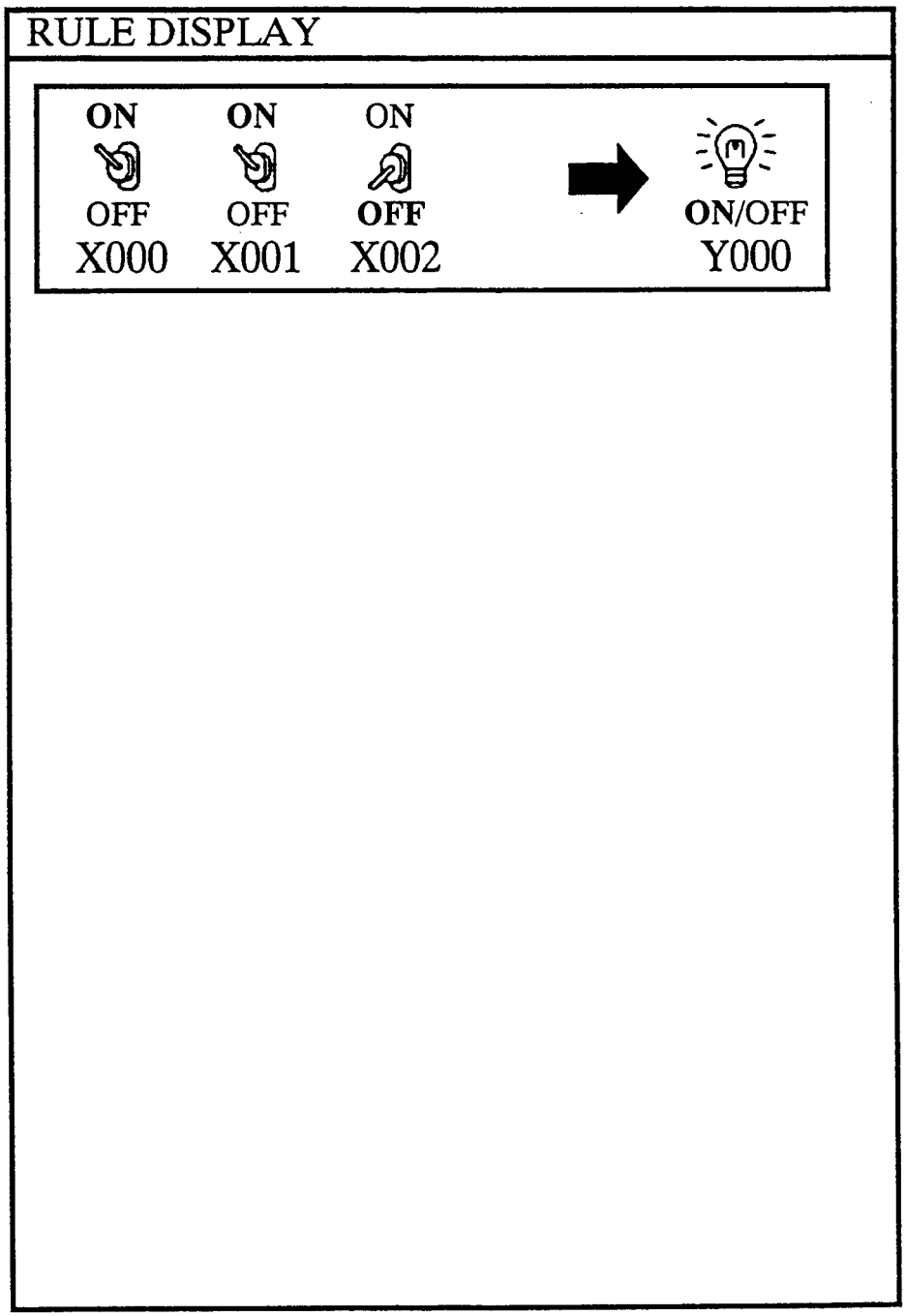
FIG. 9 is an explanatory diagram showing a typical displayed screen of a rule display window shown in FIG. 7.
Figure 10:
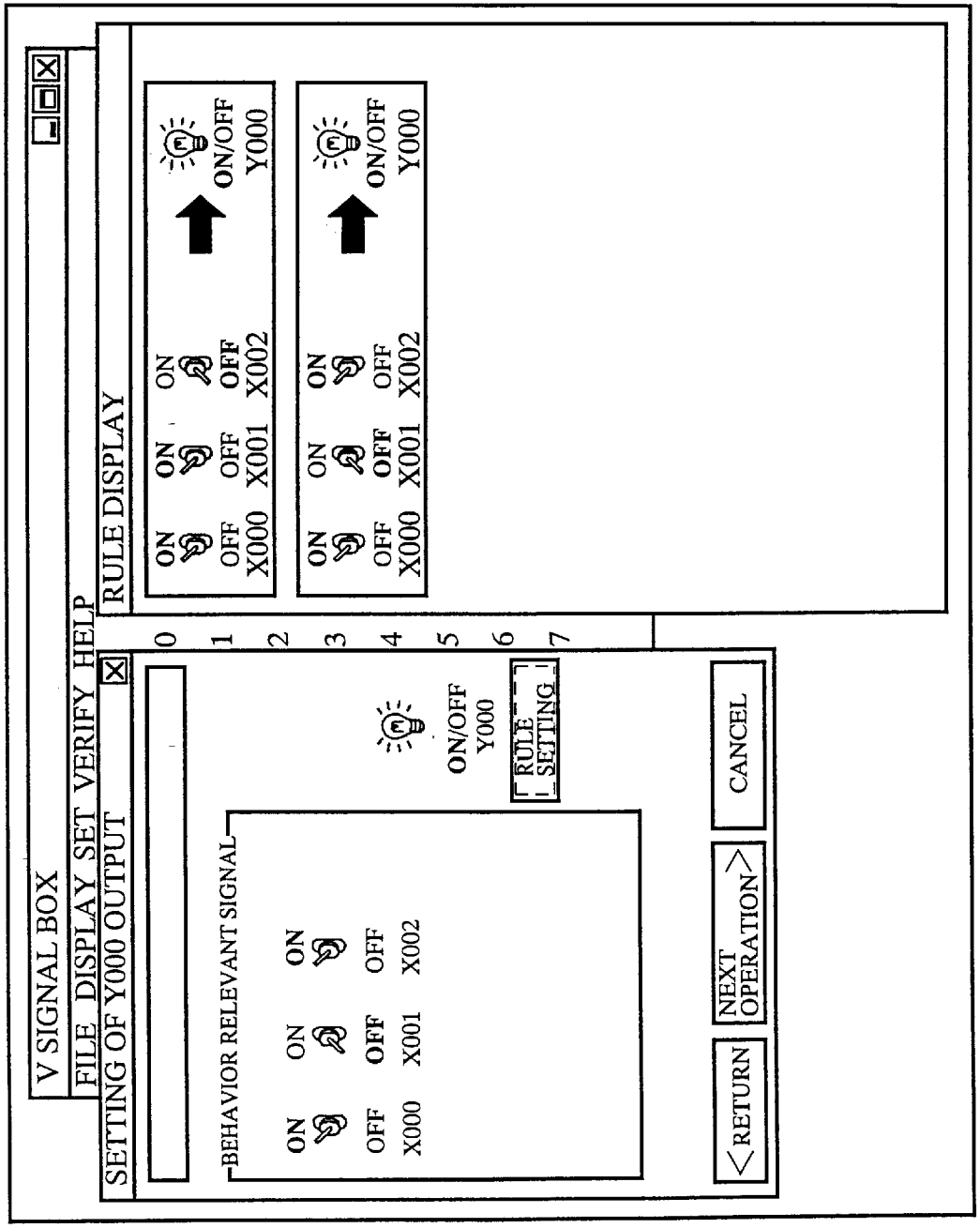
FIG. 10 is an explanatory diagram showing a typical displayed screen of the behavioral rule setting window and the rule display window shown in FIG. 7.

FIG. 9 is an explanatory diagram showing the rule display window 700 on which behavioral rule 1 is displayed. Similarly, behavioral rule 2 will also be displayed on the rule display window 700 like as behavioral rule 1 is displayed as shown in FIG. 9. In the above description, the behavioral rule setting window 600 and the rule display window 700 are explained separately by using FIGS. 8 and 9 respectively. In actuality, however, the behavioral rule setting window 600 and the rule display window 700 are displayed side by side on the same screen as shown in FIG. 10 so that the user is capable of immediately and intuitively recognizing the fact that behavioral rules have been correctly cataloged.

Since the user sets only 2 behavioral rules, the remaining 6 behavioral rules all set the output signal in an off state. When the setting of all behavioral rules is finished, the user clicks a 'next operation' button 602 of the behavioral rule setting window 600 by using the mouse 21. When the 'next operation' button 602 is selected by using the mouse 21, the flow of operations continues to a screen shown in FIG. 14.

The operations carried out so far are programming to set behavioral rules each used as a behavioral condition of the output signal Y000. Thus, since the programming of the behaviors and the behavioral conditions has been completed, a program is automatically generated.

A flow of operations carried out at a step ST6 of the flowchart shown in FIG. 2 is explained as follows.

Figure 14:
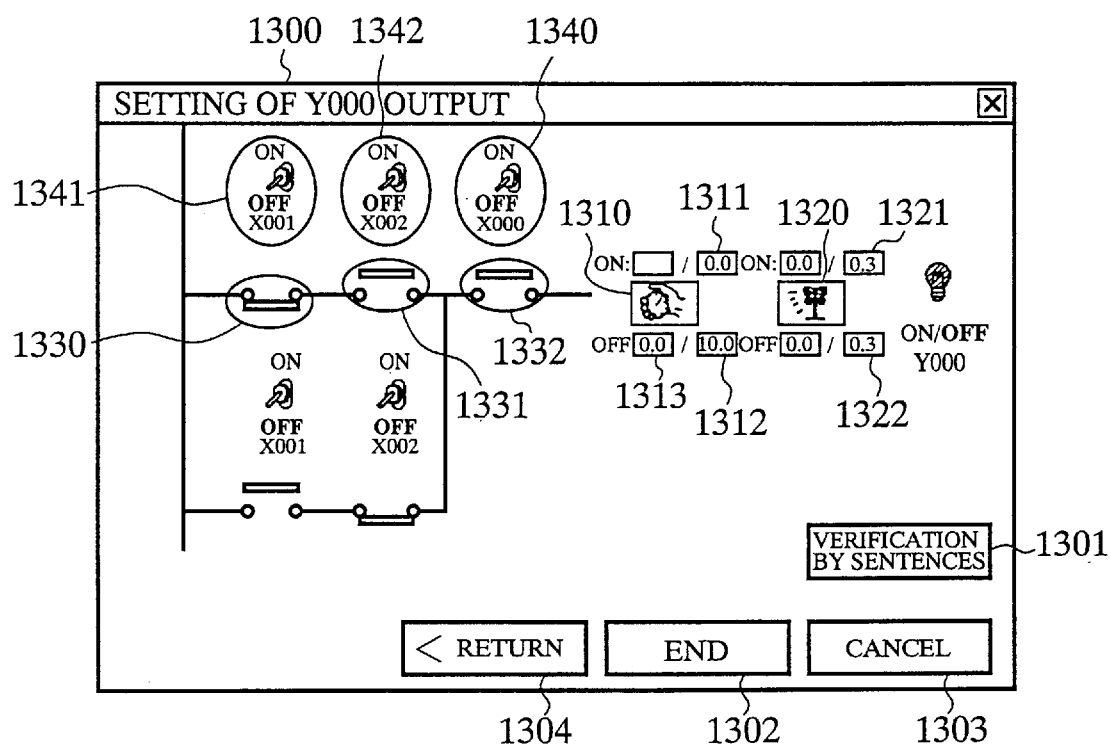
FIG. 14 is an explanatory diagram showing a behavior verification window.

At the step ST6, results of the operations carried out at the steps ST1 to ST5, that is, results of the programming work, are verified. When the setting of behavioral rules is finished, a behavior verification window 1300 shown in FIG. 14 is displayed on the display apparatus 1. On the behavior verification window 1300, the 3 input signals X000, X001 and X002, that is, the behavior relevant signals of the output signal Y000, are displayed as a rudder diagram. That is to say, the behavior verification window 1300 which displays behavioral characteristics of the output signal appears on the display apparatus 1.

The input signals displayed on the left side of the behavior verification window 1300 are displayed as switches wired to form an electrical circuit based on a logic equation. For example, a contact point state 1330 represents a closed state of a graphical object representing the input signal X001 while contact point states 1331 and 1332 represent open states of graphical objects representing the input signals X002 and X000 respectively. When the graphical objects representing the input signals X002 and X000 are turned on, the contact point states 1331 and 1332 are changed to a closed state, resulting a state of connection shown in FIG. 15. In this state, the behavior of the output signal Y007 is started. From a figure like a rudder diagram, the user knows that the output signal displays a behavior when the contact points of the visual objects representing the behavior relevant signals shown in the figure are put in a closed state.

That is to say, the user knows that the output signal displays a behavior when the contact points of the graphical objects connected to each other in series are put in a closed state. An icon 1310 is a graphical object indicating a delay characteristic. An 'ON operation delay' display area 1311 set by using the parameter setting window 400 is displayed above the icon 1310 whereas an 'OFF operation delay' display area 1312 also set by using the parameter setting window 400 is displayed below the icon 1310. In the example, the OFF operation delay is set at 10 seconds, meaning that the output signal Y000 enters an off state after a period of 10 seconds elapses since a combination of the states of the input signals is set to turn off the output signal Y000.

A display area 1313 displays a time that has been elapsing since a combination of the states of the input signals is set to deactivate the output signal while the output signal is active. For example, assume that the input signals are put in states conforming to behavioral rule 1 or 2 to activate the output signal. Then, the input signals are put in new states other than the states conforming to behavioral rule 1 or 2. In this case, the display area 1313 displays a time that has been elapsing since the states of the input signals are changed. As time goes by, the value displayed on the display area 1313 is updated accordingly. When the value displayed on the display area 1313 becomes equal to the OFF operation delay of 10 seconds displayed on the 'OFF operation delay' display area 1312, the operation to update the elapsing time is terminated and the output signal Y000 is deactivated.

Reference numeral 1320 is an icon representing a flickering characteristic. An 'ON time width' display area 1321 above the icon 1320 displays an on time width set by using the parameter setting window 400. On the other hand, 'an OFF time width' display area 1322 below the icon 1320 displays an off time width also set by using the parameter setting window 400. A blank display area on the left side of the 'ON time width' display area 1321 typically displays an on time that has been elapsing since the output signal enters an on state.

Figure 15:
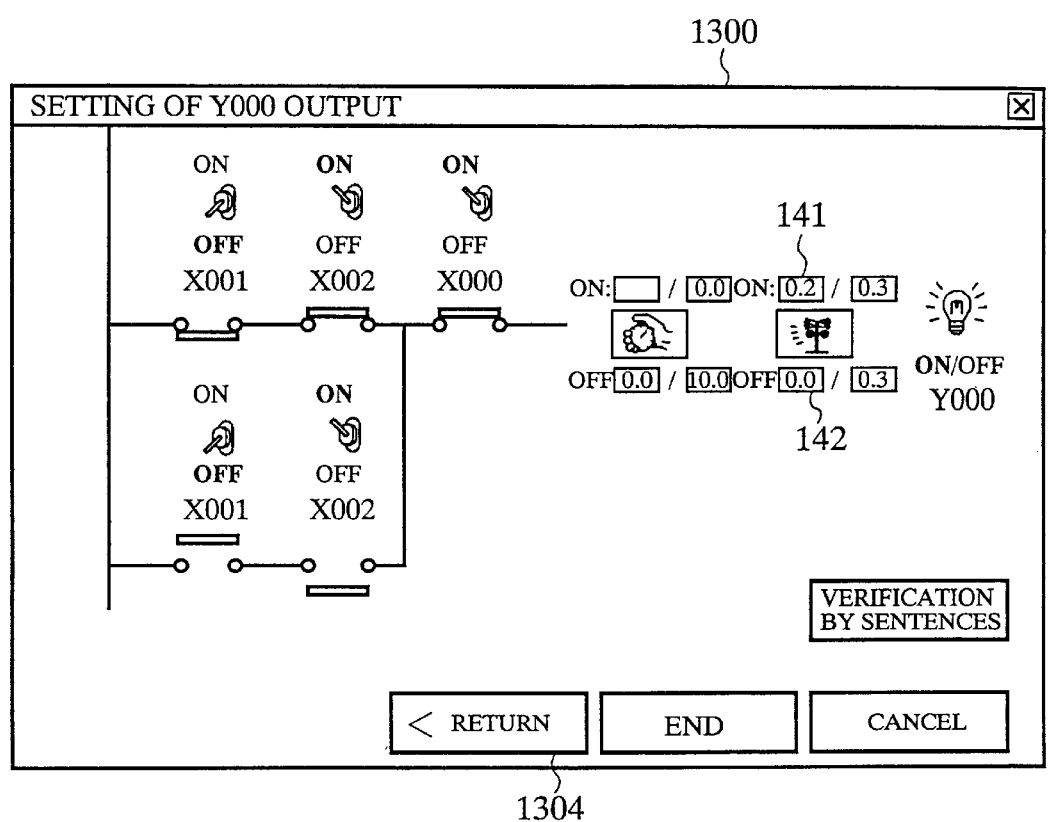
FIG. 15 is an explanatory diagram showing a state obtained after carrying out verification operations by using the behavior verification window shown in FIG. 14.

FIG. 15 is an explanatory diagram showing a state obtained after the graphical object 1340 representing the input signal X000 and the graphical object 1342 representing the input signal X002 displayed on the behavior verification window 1300 shown in FIG. 14 are operated to put the contact points 1331 and 1332 in a closed state to verify the correct execution of the created program. As shown in the figure, the output signal Y000 is about to finish an on state which has a width of 0.3 seconds indicated by the on time width of the flickering behavioral characteristic.

Reference numeral 141 shown in FIG. 15 is a display area displaying a lapsing time within the on time width of the flickering behavioral characteristic. Similarly, reference numeral 142 is a display area displaying a lapsing time within the off time width of the flickering behavioral characteristic.

Figure 16:
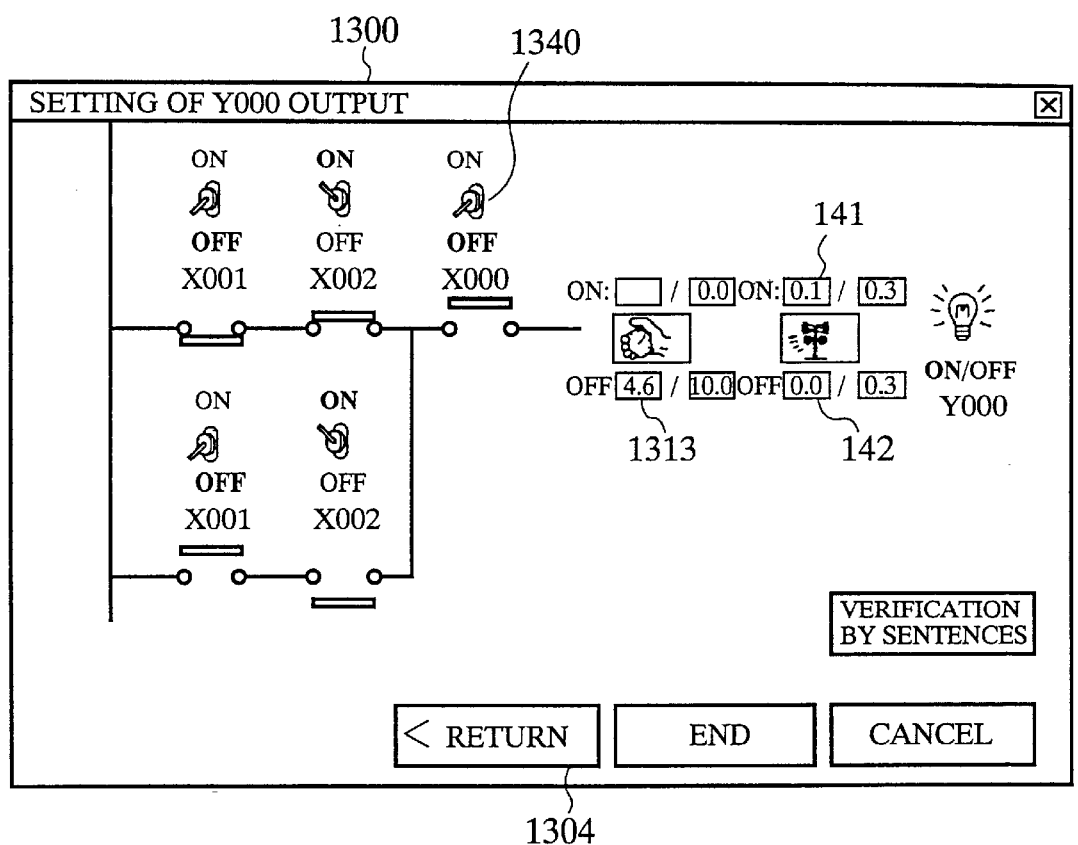
FIG. 16 is an explanatory diagram showing a typical operation of the behavior verification window shown in FIG. 15.

FIG. 16 is an explanatory diagram showing a result of a typical verification operation which is carried out after a state of program execution shown in FIG. 15 is established. To be more specific, the graphical object 1340 representing the input signal X000 is switched from an on state to an off state to terminate the behavior of the output signal Y000.

The display area 141 shown in FIG. 16 displays a value of 0.1 seconds, indicating that an on time of 0.1 seconds has lapsed since the output signal Y000 entered an on state having an on time width specified as a parameter of the flickering characteristic. A display area 1313 shown in FIG. 16 displays a value of 4.6 seconds, indicating that a time of 4.6 seconds has lapsed within the 'OFF operation delay' parameter of the delay behavioral characteristic since the verification operation was carried out to terminate the behavior of the output signal Y000.

As the value displayed on the display area 1313 reaches 10, the output signal ends the behavior displaying a flickering characteristic. If the graphical object 1340 representing the input signal X000 is switched back from the off state shown in FIG. 16 to the on state, the execution of the program is resumed.

With the behavior verification window 1300, the user is capable of verifying correct operations of a program automatically generated by the visual programming system. If a result of the Verification indicates that the program does not carry out an intended operation, the behavioral rule setting window 600 and the rule display window 700 can be redisplayed by clicking a 'return' button 1304 of the behavior verification window 1300 by means of the mouse 21 to return to a stage at which the behavioral rules can be verified and modified.

By clicking a 'return' button of a window by means of the mouse 21 as described above, an immediately preceding programming user interface is displayed and, by repeating this operation, programming user interfaces are displayed one after another in an order opposite to what is described so far, allowing the user to modify and verify data. As an alternative method, a signal to be verified, namely, the output signal Y000 in this example, is selected by using the signal box 200 shown in FIG. 3 and then a 'signal setting' item is selected from the 'setting' menu to display the behavioral characteristic selection window 300. Thereafter, the program can be verified in an order of user interfaces explained so far.

Figure 17:
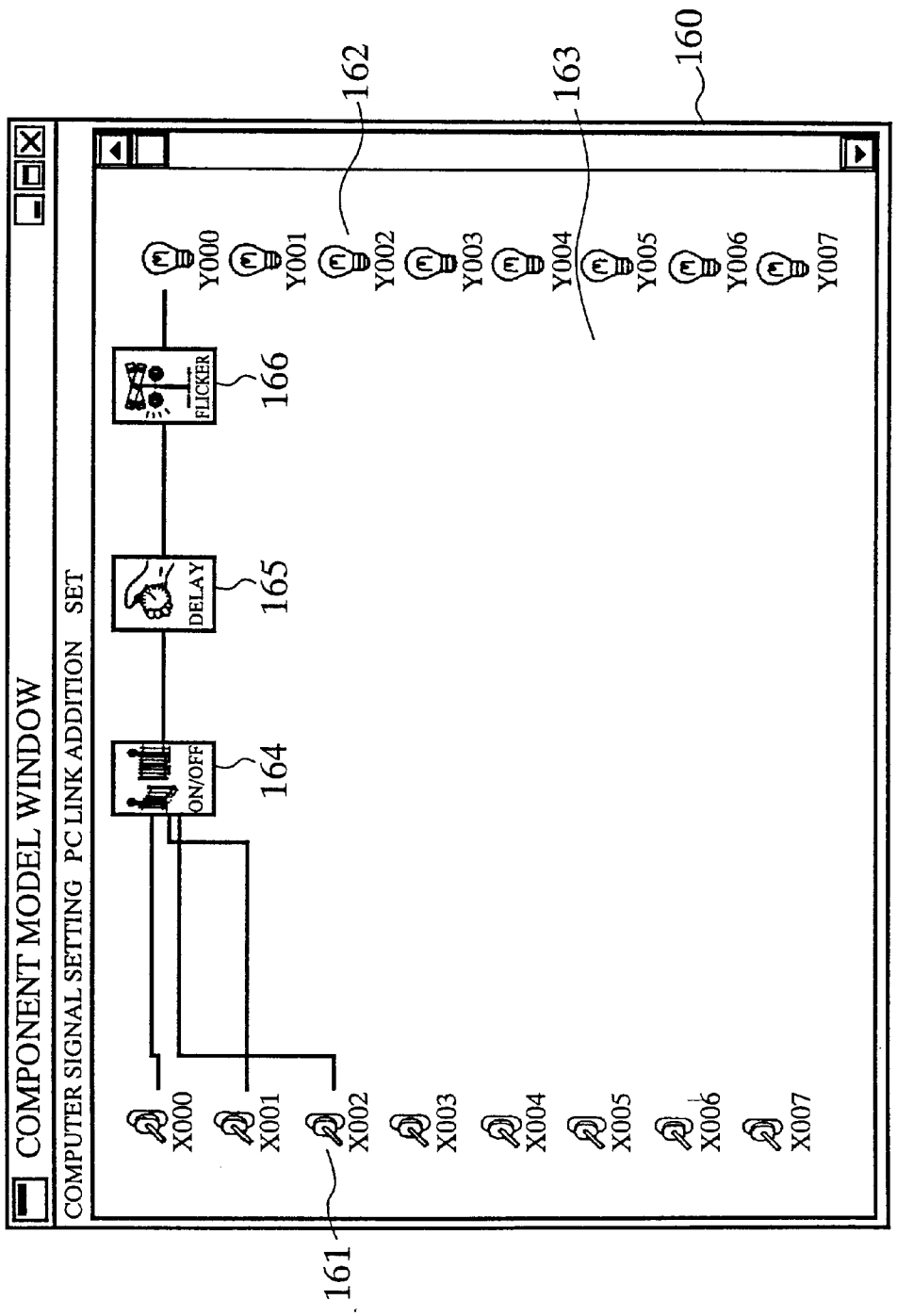
FIG. 17 is an explanatory diagram showing a component model window.

If a 'verification' icon of the signal box 200 shown in FIG. 3 is clicked to display a 'verification' menu and a 'component model window display' sub-menu of the 'verification' menu is then selected, a component model window 160 shown in FIG. 17 appears on the display apparatus 1. It should be noted that the 'component model window display' sub-menu itself is shown in none of the figures.

FIG. 16 is an explanatory diagram showing only a portion of the component model window 160. By scrolling the screen through an appropriate operation, unseen portions can be displayed. On the left end of the display area of the component model window 160, input signals are displayed in the vertical direction. This vertical input signal display area is referred to hereafter as an input signal area 161. On the right end of the display area of the component model window 160, on the other hand, output signals are displayed in the vertical direction. This vertical output signal display area is referred to hereafter as an output signal area 162. A display area between the input signal area 161 and the output signal area 162 is referred to as a component area 163 in which a relation between input signals and output signals is expressed by using graphical objects such as icons and lines.

An existing behavior relevant signal other than the input signals, if any, is displayed at a proper location in the component area 163. FIG. 17 shows a relation between the output signal Y000 and the input signals X000, X001 and X002.

The relation is verified starting with a visual object (or an icon) displayed in the component area 163 at a location closest to the input signal area 161. An icon 164 indicates that the behavioral states of the output signal Y000 are on and off states. The icon 164 also represents a logic portion in which the 3 input signals are wired in accordance with a logic equation generated by a logic equation generating means 13. An icon 165 is an icon for expressing a delay behavioral characteristic and an icon 166 expresses a flickering behavioral characteristic.

As described above, on the component model window 160 shown in FIG. 17, combinations of behavior relevant signals and characteristics displayed on the behavior verification window 1300 of FIG. 15 are expressed on a macro basis. Since the purpose of the behavior verification window 1300 is to verify operations for an output signal, information such as a behavioral characteristic parameter is displayed locally in detail. On the other hand, the component model window 160 is used for verification of setting of behavioral characteristics for all output signals on a macro basis. Pieces of information set for behavioral characteristics of all output signals are thus displayed on the component model window 160 on a macro basis in order to allow all the pieces of information to be displayed at the same time. It should be noted that, in the example shown in FIG. 17, information on only 1 output signal is displayed though.

When a 'complete' button 1302 of the behavior verification window 1300 shown in FIG. 14 is clicked at the end of programming operations for 1 output signal, all the programming operations for the output signal are terminated. Then, only the signal box 200 appears on the display apparatus 1. If an 'entire circuit simulation' item of the 'verification' menu of the displayed signal box 200 is selected, a circuit block simulation window of all programmed output signals is displayed. It should be noted that the 'entire circuit simulation' item itself is shown in none of the figures.

Figure 18:
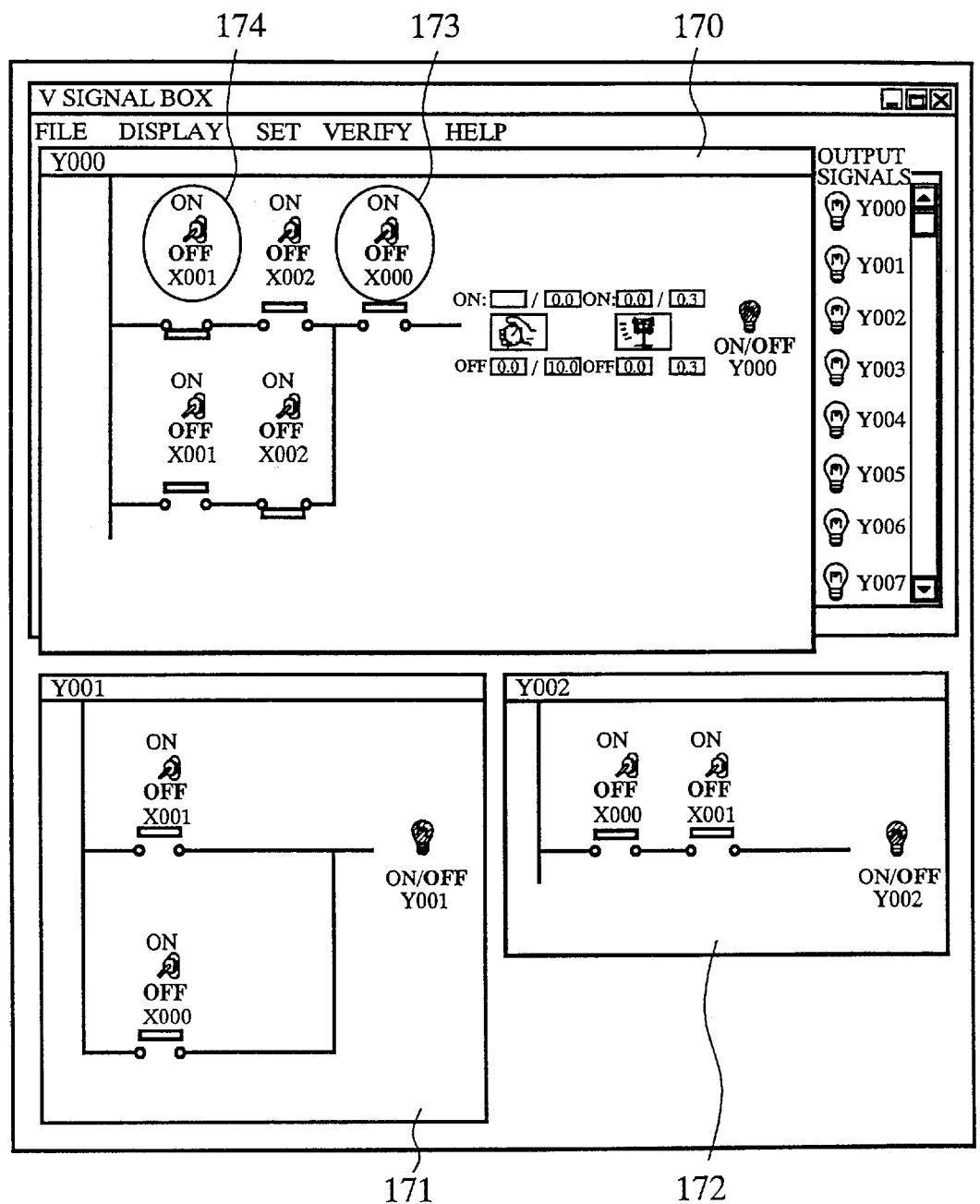
FIG. 18 is an explanatory diagram showing a state right after the start of an operation of entire circuit simulation, one of the functions of a visual editor.

While the component model window 160 is used for verifying a result of programming a PLC statically, the entire circuit simulation its intended to be used for verifying operations of all results of programming a PLC. FIG. 18 is an explanatory diagram showing a state after selection of an 'entire simulation start' upon completion of programming of 3 output signals Y000, Y001 and Y002.

3 circuit block simulation windows shown in FIG. 18 each with an output signal name at the left upper corner thereof are each the same as a behavior verification window 1300 of FIG. 14 for displaying information on an output signal in detail. On the 'entire circuit simulation' screen, however, a 'verification by sentences' button 1301 shown in FIG. 14 is not displayed.

Each of the output signals shown in FIG. 18 is explained in brief as follows. The output signal Y000 of the circuit block simulation window 170 has the same behavior as the output signal Y000 described so far. On the other hand, the output signal Y001 of the circuit block simulation window 171 is activated when the input signal X000 or X001 is turned on. Finally, the output signal Y002 of the circuit block simulation window 172 is activated when both the input signals X000 and X001 are turned on.

A simulation operation is carried out in the same way as the behavior verification window 1300 by operating a visual object representing a signal on any of the circuit block simulation windows. However, an operation carried out on a visual object representing an input signal on any of the circuit block simulation windows is interlocked with all the other circuit block simulation windows. To be more specific, consider as an example a case in which visual objects 173 and 174 representing the input signals X000 and X001 respectively on the circuit block simulation window 170 are switched from an off state to an on state. In this case, the input signals X000 and X001 on the circuit block simulation window 171 for the output signal Y001 as well as the input signals X000 and X001 on the circuit block simulation window 172 for the output signal X002 are also switched from an off state to an on state at the same time, causing all the 3 output signals to start their behaviors. FIG. 18 is an explanatory diagram showing a result of the interlocked operations described above. As described above, in a visual programming environment embracing the present invention, behaviors can be carried out by simulation by carrying out the same operations as the programming process explained earlier.

A user interface provided by the present invention for creating a program is explained once more in brief in a summary as follows. A signal box 200 is used for selecting a signal defining a behavior, that is, an object, a behavior of which is to be programmed. A behavioral characteristic selection window 300 is used for entering behavioral characteristics, behavioral states and a comment. A parameter setting window 400 is used for setting details of each behavioral characteristic. A relevant signal selection window 500 is used for selecting signals relevant to the behavior of a signal defining a behavior. A behavioral rule setting window 600 or a system generated rule display window 1000 is used for setting behavioral rules which each serve as a behavioral condition of a signal defining the behavior of a load connected thereto, that is, an object, a behavior of which is to be programmed.

At this stage, a program has already been automatically generated by the visual programming system. The user can verify behaviors carried out by the program by using a tool such as a behavior verification window 1300 or a component model window 160. The graphical editor provided by the present invention is a generic name of all user interfaces of the visual programming system which allows the user to do programming work by carrying out operations such as clicking and dragging using a device such as a mouse on windows such as the signal box 200, the behavioral characteristic selection window 300, the parameter setting window 400, the relevant signal selection window 500, the behavioral rule setting window 600, the rule display window 700 and the behavior verification window 1300.

An icon shown in the figures as a graphical object is no more than a typical example. An icon with another shape or another size, or even another object can also be used as well. In the examples described above, another icon shape can be selected from a menu, which is shown in none of the figures, of the signal box 200. Since a variety of devices are each employed as a control device in a sequencer, different icon shapes for the devices are provided.

The following is a description of first to sixth embodiments which are based on the basic configurations of the visual programming method provided by the present invention as described above and the system adopting the method to implement more detailed configurations and operations of the present invention.

FIRST EMBODIMENT

Figure 20:
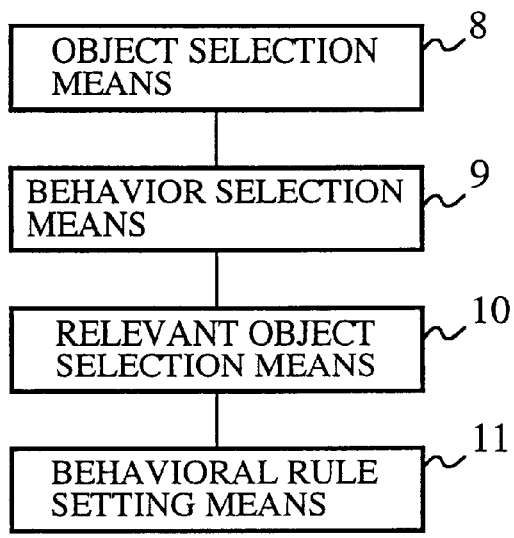
FIG. 20 is a block diagram showing a system adopting the visual programming method as implemented by a first embodiment of the present invention.
Figure 21:
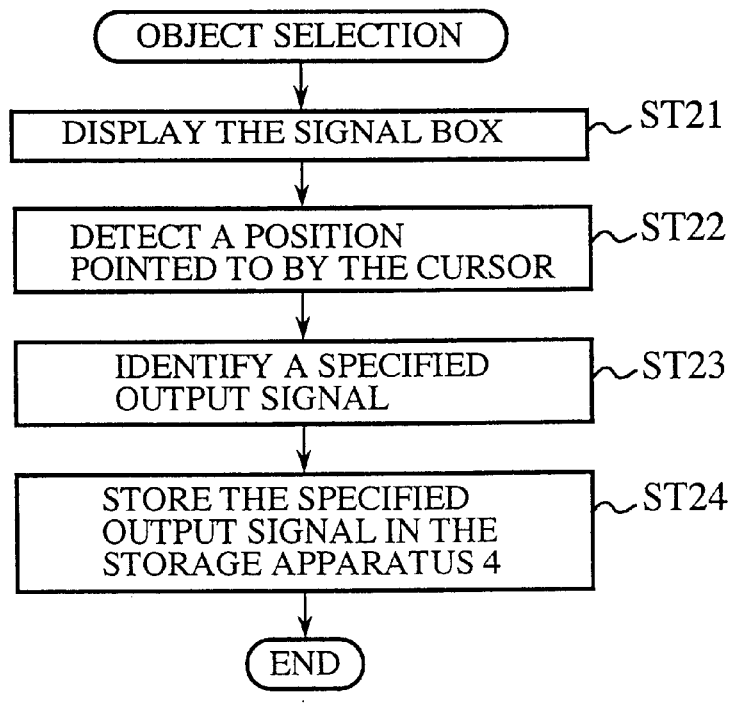
FIG. 21 is a flowchart showing typical operations carried out by an object selection means shown in FIG. 20.

FIG. 20 is a block diagram showing a system adopting the visual programming method as implemented by the first embodiment of the present invention. In the figure, reference numerals 8 and 9 denote an object selection means and a behavior selection means respectively whereas reference numerals 10 and 11 denote a relevant object selection means and a behavioral rule setting means respectively. A main characteristic of the visual programming system implemented by the first embodiment has something to do with the user interface. Like the conventional system, the first embodiment is of course provided with a means for generating a program or code even though this means is shown in none of the figures. A generated program is transferred to a PLC typically by way of the network connection apparatus 5 shown in FIG. 1. The visual programming system implemented by the first embodiment is stored typically in the hard disc drive (HDD) 43 shown in FIG. 1 to be executed by the CPU 7 in conjunction with the display apparatus 1, the input apparatus 2 and other components.

In the visual programming method provided by the first embodiment and the system adopting the method, the object selection means 8 is used for selecting a graphical object, a behavior of which is to be programmed and the behavior selection means 9 is used for selecting the type of the behavior of the graphical object to be defined. On the other hand, the relevant object selection means 10 is used for selecting a graphical object relevant to the behavior of the graphical object and the behavioral rule setting means 11 is used for setting a behavioral rule of the graphical object for defining the behavior of a load connected thereto. As a result, by virtue of the visual programming method provided by the first embodiment and the system adopting the method, a user who has a lack of professional knowledge of programming is capable of visually developing a program with ease by merely clicking graphical objects displayed on a screen of a graphical editor using a device such as a mouse without the need to master a programming language which is difficult to understand.

The operations of the visual programming method provided by the first embodiment and the system adopting the method are explained as follows.

First of all, the object selection means 8 displays the signal box 200 shown in FIG. 3 on the display apparatus 1. Then, the object selection means 8 detects the fact that a graphical object for defining the behavior of a load connected thereto has been selected by the user using typically the mouse 21 of the input unit 2, and stores the name of an output signal represented by the selected graphical object typically in the RAM unit 42 of the storage apparatus 4.

Subsequently, the behavior selection means 9 displays the behavioral characteristic selection window 300 shown in FIG. 4 on the display apparatus 1. The behavior selection means 9 then detects the type of a behavioral characteristic selected from a group of behavioral characteristics 301 and the type of a behavioral state selected from a group of behavioral conditions 302 by the user using typically the mouse 21 of the input apparatus 2 as well as a string of characters entered by the user to the comment area 303 using typically the keyboard 22 of the input apparatus 2. The type of the behavioral characteristic, the type of the behavioral state and the string of characters are then stored typically in the RAM unit 42 of the storage apparatus 4.

Then, the relevant object selection means 10 detects the fact that signals relevant to a graphical object for defining the behavior of a load connected thereto have been selected from the signal box 200 shown in FIG. 3 by the user using typically the mouse 21 of the input unit 2. The graphical object was selected earlier from the signal box 200 shown in FIG. 3 by the user using the object selection means 8. The relevant object selection means 10 then displays graphical objects representing the selected signals in the behavior relevant signal area 501 of the relevant signal selection window 500 shown in FIG. 6 and stores the names of the selected signals typically in the RAM unit 42 of the storage apparatus 4.

Subsequently, the behavioral rule setting means 11 displays the behavioral rule setting window 600 shown in FIG. 7 on the display apparatus 1. The user then operates graphical objects displayed on the behavioral rule setting window 600 to represent the signals selected by using the relevant object selection means 10 and selects the 'rule setting' button 601 by using typically the mouse 21 of the input unit 2 to set a behavioral rule. Then, the behavioral rule setting means 11 displays the behavioral rule set by the user on the rule display window 800 shown in FIG. 9 as well as temporarily stores the behavioral rule typically in the RAM unit 42 of the storage apparatus 4.

The following is a description of operations carried out by the object selection means 8 according to an eleventh embodiment.

Only ideal operations of the visual programming system provided by the first embodiment are explained. That is to say, explanation of special processing such as exception handling is omitted. Explanation of operations which are carried out when a 'return' button and a 'cancel' button are selected is also omitted as well.

Figure 22:
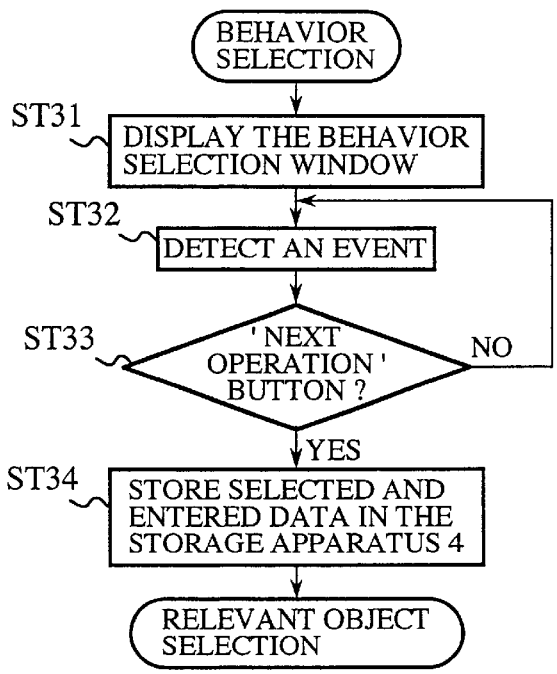
FIG. 22 is a flowchart showing typical operations carried out by a behavior selection means shown in FIG. 20.

FIG. 22 is a flowchart showing typical operations carried out by the object selection means 8 shown in FIG. 20.

As shown in the figure, the flowchart begins with a step ST21 at which the signal box 200 is displayed on the display apparatus 1. The flow of the processing then goes on to a step ST22 at which a position on the signal box 200 pointed to by the user using the mouse 21 at the step ST21 is detected. Then, the flow of the processing proceeds to a step ST23 to form a judgment as to whether or not the behavior of a signal at the position detected at the step ST22 can be defined. In the above explanation of the user interface, an output signal is selected from the signal box 200 as an example. However, a personal computer output signal 204 or an internal signal 206 may also be selected. Subsequently, the flow of the processing continues to a step ST24 at which information on the signal, the selection of which was detected at the step ST23, is stored typically in the RAM unit 42 of the storage apparatus 4.

FIG. 22 is a flowchart showing typical operations carried out by the behavior selection means 9 shown in FIG. 20. As shown in the figure, the flowchart begins with a step ST31 at which the behavior selection window 300 is displayed on the display apparatus 1. The flow of the processing then goes on to a step ST32 at which a position on the behavior selection window 300 pointed to by the user using typically the mouse 21 of the input apparatus 2 is detected.

Then, the flow of the processing continues to a step ST33 to form a judgment as to whether or not a 'next operation' button 304 has been selected at the step ST32. In the case of an event not followed by an operation to click the 'next operation' button 304, nothing is carried out.

If the outcome of the judgment formed at the step ST33 indicates that the 'next operation' button 304 has been selected, on the other hand, a selected parameter of the behavioral characteristic 301, a selected parameter of the behavioral state 302 and a string of characters entered as a comment 303 are fetched and stored typically in the RAM unit 42 of the storage apparatus 4. The comment 303 is entered typically via the keyboard 22.

The behavioral characteristic 301, the behavioral state 302 and the comment 303 are each a graphical object. In the case of an event in which the 'A delay exists' parameter of the behavioral characteristic 301 is selected, for example, the selected behavioral characteristic 301 processes the event and a result of the selection according to the event is stored internally. That is to say, at a step ST34, information on graphical objects stored internally is actually read out to be stored typically in the RAM unit 42 of the storage apparatus 4.

When the processing carried out at the step ST34 is completed, the relevant object selection means 10 starts its operations. The behavioral characteristic selection window 300 shown in FIG. 4 disappears from the display unit 1, being replaced by the relevant signal selection window 500 shown in FIG. 6. Some default values are set as parameters of the behavioral characteristic 301. A characteristic of the behavioral characteristic selection window 300 is the fact that parameters of the behavioral characteristic 301 are each displayed as a phrase written in a natural language. In the conventional visual programming tool, in many cases, an object to be selected is expressed by a graphical object such as an icon. With an object expressed by a graphical object, visual expression of the object is not adequate due to, among other reasons, limitation on the display space of the graphical object, adversely making it difficult to understand the meaning of the graphical object. As a solution to the problem encountered in the conventional visual programming tool, in the behavioral characteristic selection window 300 of the first embodiment, an object to be selected is represented by a phrase written in a natural language in place of a visual object.

If an icon is used to express an object to be selected in place of a phrase of 'A delay exists' or the word 'flickering' displayed on the screen shown in FIG. 4, the expression given by the icon will be difficult to understand. Thus, the expression given by the phrase of 'A delay exists' or the word 'flickering' written in the natural language is easier for the user to understand. If an object, which is difficult to understand when it is expressed by a 2-dimensionally displayed icon, can be displayed in 3 dimensions or displayed as a moving picture due to an improved level of the graphic technology achieved in the future, however, a visual expression other than a string of characters can also be used. This is because such a 3-dimensional display or a moving picture can also be intuitively understood with ease as well.

Since the parameters 'ON/OFF' and 'SET/RESET' of the behavioral state 302 may also be difficult to understand for some inexperienced users, a function such as an agent for helping the user understand their meanings may be provided.

Figure 23:
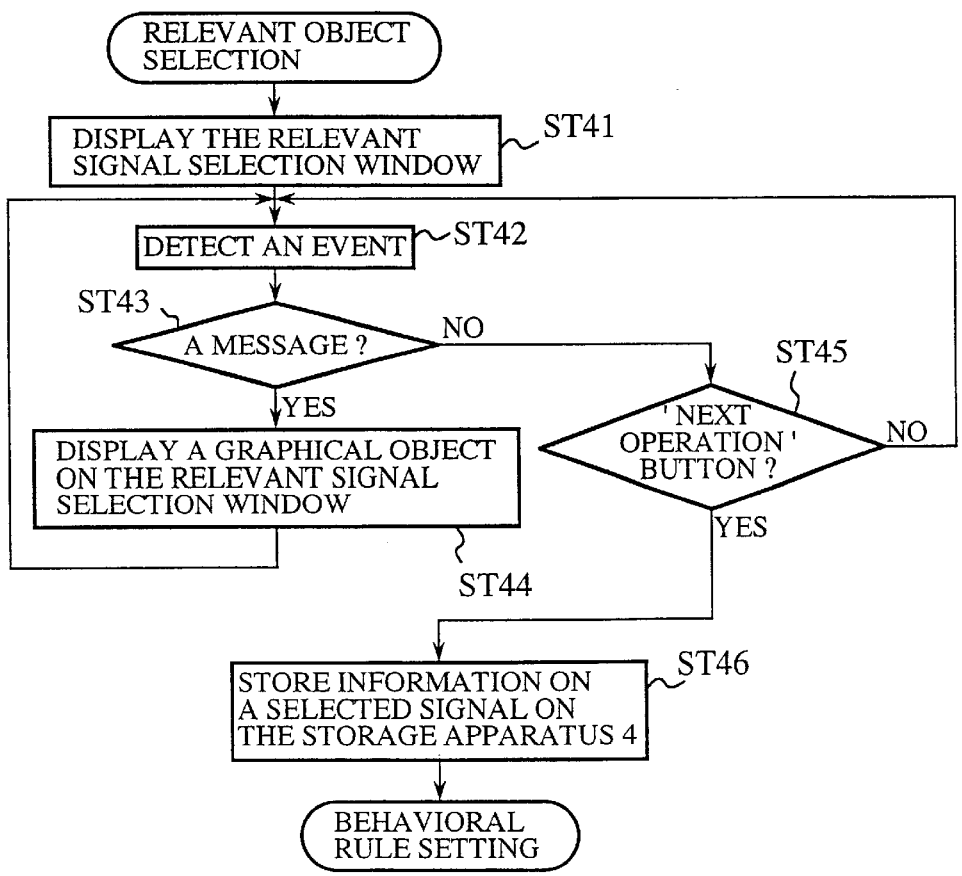
FIG. 23 is a flowchart showing typical operations carried out by an object selection means shown in FIG. 20.

FIG. 23 is a flowchart showing typical operations carried out by the relevant object selection means 10.

As shown in the figure, the flowchart begins with a step ST41 at which the relevant signal selection window 500 is displayed on the display apparatus 1. When the relevant signal selection window 500 is displayed at the step ST41, the user selects signals relevant to the behavior of the output signal selected by using the object selection means 8 by clicking graphical objects displayed on the signal box 200 using the mouse 21. The relevant object selection means 10 has nothing to do with the process of selection of these relevant signals.

A click event of a graphical object for example is processed by the graphical object itself. The graphical object detects the fact that the relevant signal selection window 500 is displayed and sends a message to the relevant object selection means 10 to notify that the graphical object has been selected. At a step ST42, the relevant object selection means 10 receives this message in detection of the event. It should be noted that, at the step ST42, events in which buttons on the relevant signal selection window 500 are clicked are also detected.

The flow of the processing then goes on to a step ST43 to form a judgment as to whether or not an event detected at the step ST42 is a message sent by the graphical object. If the outcome of the judgment formed at the step ST43 indicates that the event is the message from the graphical object, the flow of the processing proceeds to a step ST44 at which the graphical object sending the message is displayed in a behavior relevant signal area 501 on the relevant signal selection window 500.

If the outcome of the judgment formed at the step ST43 indicates that the event is an event of clicking a button, on the other hand, the flow of the processing continues to a step ST45 to form a judgment as to whether or not the 'next operation' button 503 has been clicked. If the outcome of the judgment formed at the step ST45 indicates that the 'next operation' button 503 has been clicked, the flow of the processing goes on to a step ST46 at which information on the behavior relevant signal is stored typically in the RAM unit 42 of the storage apparatus 4 before proceeding to processing carried out by the behavioral rule setting means 11.

Figure 24:
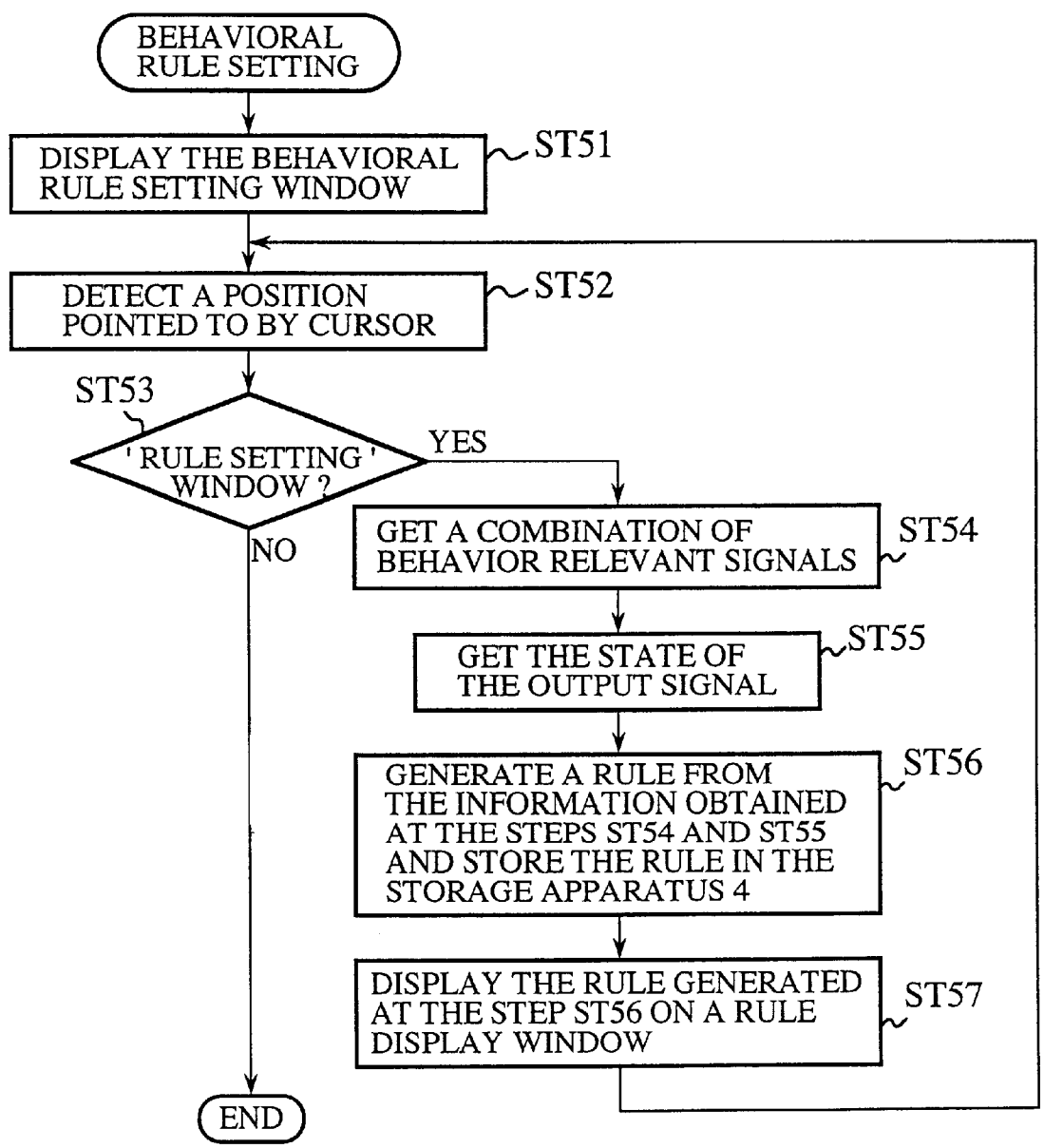
FIG. 24 is a flowchart showing typical operations carried out by a behavioral rule setting means shown in FIG. 20.

FIG. 24 is a flowchart showing typical operations carried out by the behavioral rule setting means 11. As shown in the figure, the flowchart begins with a step ST51 at which the behavioral rule setting window 600 and the rule display window 700 are displayed on the display apparatus 1.

On the relevant behavioral rule setting window 600, behavior relevant signals selected by using the relevant object selection means 10 and the output signal selected by using the object selection means 8 are displayed in an off state and halted state respectively. On the rule display window 700, on the other hand, nothing is displayed because no behavioral rule has been set.

At a step ST52, an event on the behavioral rule setting window 600 is detected. An event detected at the step ST52 is an event of clicking a 'rule setting' button 601, a 'next operation' button 602, a 'cancel' button 603 or a 'return' button 604 only. During a period of time between the steps ST51 and ST52, the user clicks visual objects (or icons) representing a signal defining the behavior of a load connected thereto and signals relevant to the behavior displayed on the behavioral rule setting window 600 by using the mouse 21 in order to express behavioral rules visually.

The visual objects (or icons) representing a signal defining the behavior of a load connected thereto and signals relevant to the behavior are each designed to be object oriented. To put it in detail, for example, a visual object representing the input signal X000 has a function to detect an event of the input signal X000, change its state and display the changed state on the behavioral rule setting window 600 visually.

Visual objects representing the input signals X001 and X000 and the output signal Y000 each also have the same function. Thus, the step ST52 has nothing to do with the operations carried out by the user to set behavioral rules visually. In order to catalog set behavioral rules in the visual programming system, the 'rule setting' button 601 is clicked. When the click event is detected at the step ST52, the flow of the processing goes on to a step ST53 to form a judgment as to whether or not the 'rule setting' button 601 has been selected. If the outcome of the judgment formed at the step ST53 indicates that the 'rule setting' button 601 has been selected, the flow of the processing proceeds to a step ST54 at which information on the states of visual objects representing the behavior relevant signals on the behavioral rule setting window 600 is fetched in. The flow of the processing then continues to a step ST55.

At the step ST55, information on the state of the visual object representing the signal, the behavior of which is being programmed, is fetched in. The flow of the processing then continues to a step ST56 at which the pieces of information on the states of the visual objects fetched in at the steps ST54 and ST55 are combined to set behavioral rules which are then stored typically in the RAM unit 42 of the storage apparatus 4.

For instance, in the example shown in FIG. 8, at the step ST54 of the flowchart shown in FIG. 24, the state information (X000: ON, X001: ON and X002: OFF) is fetched and, at the step ST55, the state information (Y000: ON) is fetched. Then, at the step ST56, behavioral rule 1 given as an example in the description of user interfaces is generated and stored in the storage apparatus 4. The flow of the processing then goes on to a step ST57 at which the behavioral rule generated at the step ST56 is displayed on the rule display window 700 in terms of visual objects.

FIG. 9 is an explanatory diagram showing a typical displayed screen of the rule display window 700 displaying behavioral rule 1 . Then, the flow of the processing returns from the step ST57 to the steps ST51 and ST52. Assume that a button other than the 'rule setting' button 601 is clicked. The flow of the processing then goes on to the step ST53 to form a judgment as to whether or not the 'next operation' button 602 has been clicked. If the outcome of the judgment formed at the step ST53 indicates that the 'next operation' button 602 has been clicked, the processing to set behavioral rules is completed. After the processing carried out by the behavioral rule setting means 11 is finished, the visual programming system automatically generates a program and saves the program typically in the hard disc drive (HDD) 43 of the storage apparatus 4 in the form of a file.

As described above, according to the first embodiment, the object selection means 8 is used for selecting a behavioral graphical object defining the behavior of a load connected thereto, the behavior selection means 9 is used for selecting the type of the behavior of the behavioral graphical object, the relevant object selection means 10 is used for selecting relevant graphical objects related to the behavior of the behavioral graphical object and the behavioral rule setting means 11 is used for setting behavioral rules of the behavioral graphical object defining. As a result, a user who has a lack of professional knowledge of programming is capable of visually developing a program with ease by merely clicking graphical objects displayed on a screen of a graphical editor using a device such as a mouse without the need to master a programming language which is difficult to understand. Also in domains in which only specialists work, such as PLC (programmable logic controller) programming which particularly requires professional knowledge of a programming language and sequence control, a user with no professional training is also capable of creating such programs with ease.

SECOND EMBODIMENT

Figure 25:
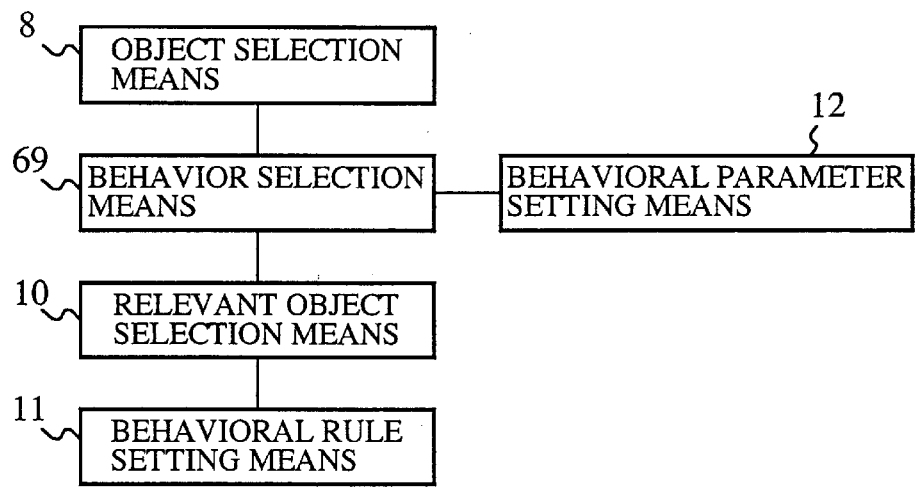
FIG. 25 is a block diagram showing a system adopting the visual programming method as implemented by a second embodiment of the present invention.
Figure 26:
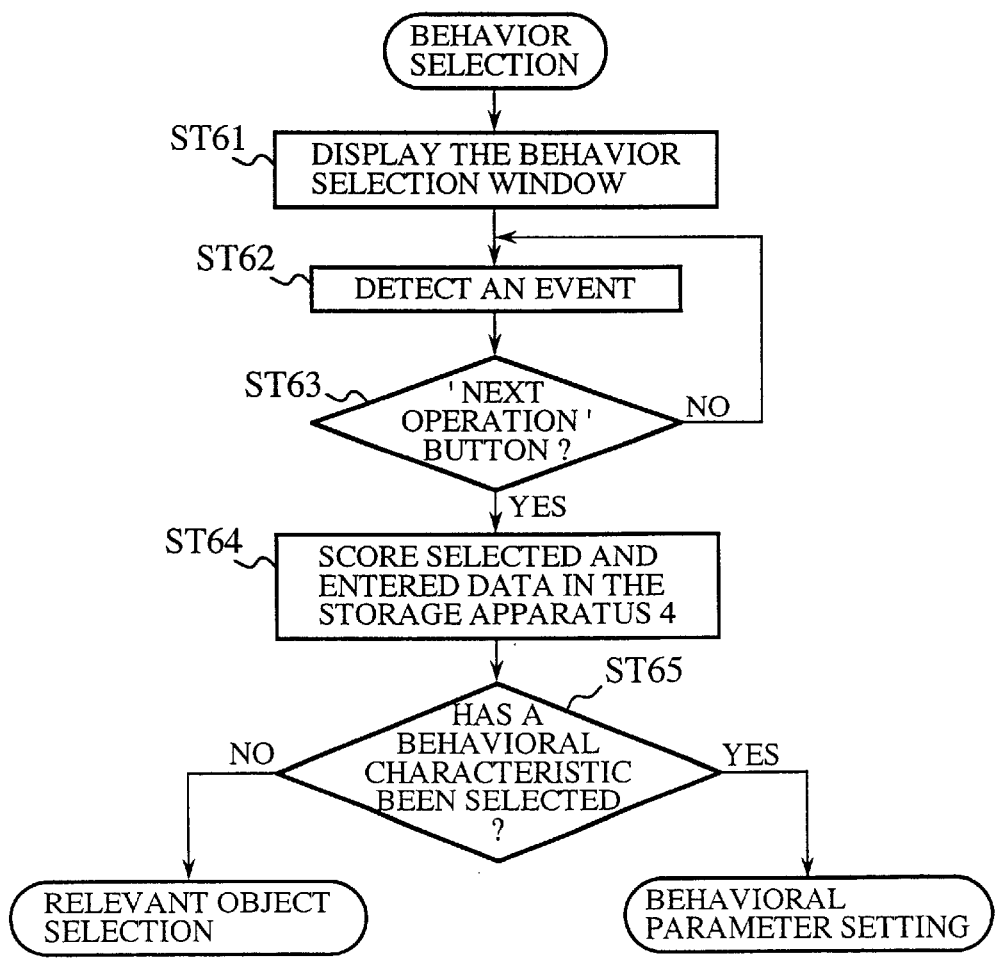
FIG. 26 is a flowchart showing typical operations of a behavior selection means shown in FIG. 25.

FIG. 25 is a block diagram showing a system adopting the visual programming method as implemented by a second embodiment of the present invention. In the figure, reference numerals 12 and 69 denote a behavioral parameter setting means and a behavior selection means respectively. The visual programming system implemented by the second embodiment is a system provided with a user interface which allows a value set for a behavioral characteristic selected by the behavior selection means 69 to be changed. It should be noted that elements of the second embodiment identical with those of the first embodiment are denoted by the same reference numerals as the latter and their explanation is omitted to avoid duplication of description. The visual programming system implemented by the second embodiment is stored typically in the hard disc drive (HDD) 43 shown in FIG. 1 to be executed by the CPU 7 in conjunction with the display apparatus 1, the input apparatus 2 and other components.

The visual programming system implemented by the second is built by adding a behavioral parameter setting means 12 to the visual programming system provided by the first embodiment so that detailed behavioral parameters of a behavioral characteristic selected by using the behavior selection means 69 can be set.

If the outcome of the judgment formed at the step ST33 of the flowchart representing typical operations carried out by the behavior selection means 9 as shown in FIG. 20 indicates that the 'next operation' button has been selected, the processing goes on from the behavior selection means 9 to the relevant object selection means 10. In the case of the behavior selection means 69 of the visual programming system implemented by the second embodiment shown in FIG. 2, if the outcome of the judgment formed at the step ST63 indicates that the 'next operation' button has been selected, the processing goes on a step ST65. At the step ST65, data stored in storage apparatus 4 at the step ST64 is examined to form a judgment as to whether or not a behavioral characteristic has been selected. If a behavioral characteristic is found to be selected, the behavioral parameter setting means 12 is used for setting detailed behavioral parameters. If the outcome of the judgment formed at the step ST65 indicates that no behavioral characteristic is selected, on the other hand, the relevant object selection means 10 is used for selecting relevant objects.

Figure 27:
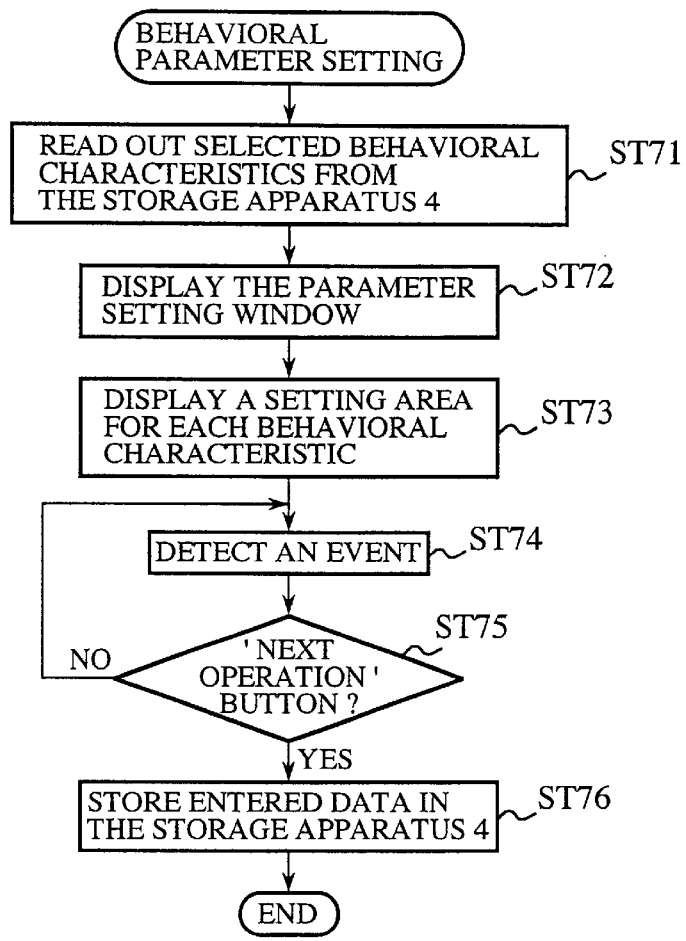
FIG. 27 is a flowchart showing typical operations carried out by a behavioral parameter setting means shown in FIG. 25.

FIG. 27 is a flowchart showing typical operations carried out by the behavioral parameter setting means 12. As shown in the figure, the flowchart begins with a step ST71 at which the behavior selection means 69 reads out a behavioral characteristic from the storage apparatus 4 in order to recognize the selected behavioral characteristic. The flow of the processing then goes on to a step ST72 at which the parameter setting window 400 is displayed on the display apparatus 1. Then, the flow of the processing proceeds to a step ST73 at which a parameter setting area for each behavioral characteristic recognized at the step ST71 is displayed on the parameter setting window 400 displayed at the step ST72.

For example, the parameter setting window 400 is first displayed on the display apparatus 1 and the parameter setting area 410 for the 'delay' behavioral characteristic and the parameter setting area 420 for the 'flickering' behavioral characteristic are displayed on the parameter setting window 400 as shown in FIG. 5. At the step ST72, parameter setting areas for behavioral characteristics other than those selected by the user by using the behavior selection means 69 are not displayed. For example, a parameter setting area for 'A time limit exists' behavioral characteristic of the example shown in FIG. 4 is not displayed because this behavioral characteristic is not selected. In this way, if it is within quite the bounds of possibility that displaying unnecessary information adversely makes the user confused, the confusing information is not displayed.

The flow of the processing then continues to a step ST74 to detect an event caused by an operation carried out by the user on any parameter setting area displayed at the step ST73. Then, the flow of the processing goes on to a step ST75 to form a judgment based on the event detected at the step S74 as to whether or not the 'next operation' button 401 has been clicked. If the 'next operation' button 401 has not been clicked, the flow of the processing returns to the step ST74 to wait for detection of a next event. If the outcome of the judgment formed at the step ST75 indicates that the 'next operation' button 401 has been clicked, on the other hand, the flow of the processing proceeds to a step ST76.

At the step ST76, data entered by the user to the parameter setting areas using typically the mouse 21 and the keyboard 22 prior to the continuation of the flow of the processing to the step ST76 is fetched from the areas and stored typically in the RAM unit 42 of the storage apparatus 4.

When the processing carried out at the step ST76 is completed, the flow of the processing continues to an operation of the relevant object selection means 10 which is not included in the flowchart shown in FIG. 27. In the operation carried out by the relevant object selection means 10, the relevant signal selection window 500 shown in FIG. 6 is displayed on the display apparatus 1.

As described above, according to the second embodiment, a behavioral parameter setting means 12 is included to allow detailed behavioral parameters of a behavioral characteristic selected by using the behavior selection means 69 to be set. As a result, the user is capable of changing values set for a behavioral characteristic selected by using the behavior selection means 9 and, hence, carrying out programming work with ease and a higher degree of efficiency.

THIRD EMBODIMENT

Figure 28:
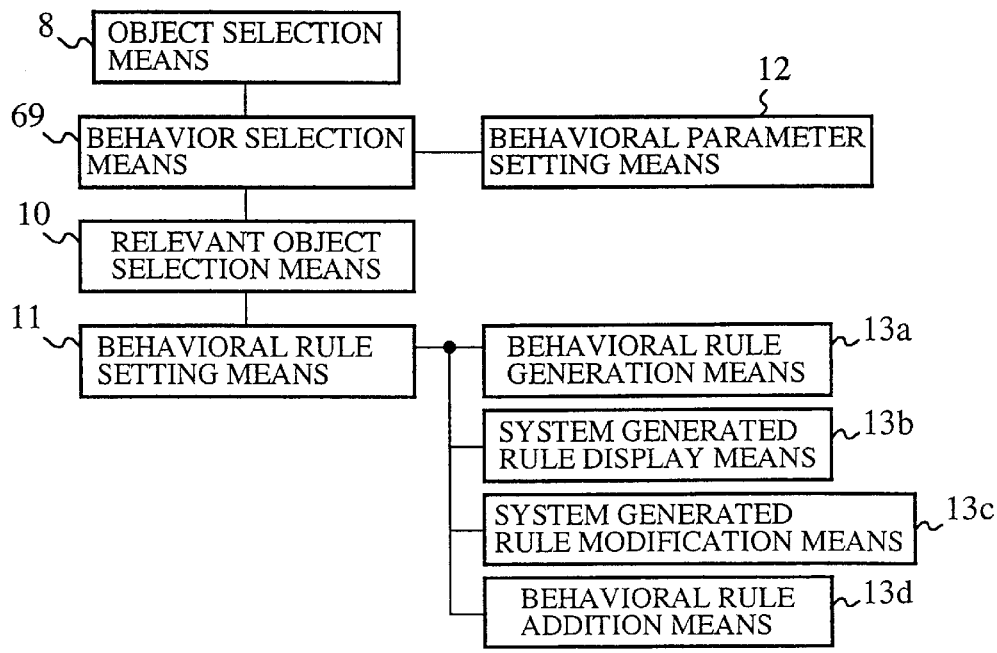
FIG. 28 is a block diagram showing a system adopting the visual programming method as implemented by a third embodiment of the present invention.

FIG. 28 is a block diagram showing a system adopting the visual programming method as implemented by a third embodiment of the present invention. As shown in the figure, the visual programming system also includes a behavioral rule generation means 13a, a generated rule display means 13b, a system generated rule modification means 13c and a behavioral rule addition means 13d. The behavioral rule generation means 13a, the system generated rule display means 13b, the system generated rule modification means 13c and the behavioral rule addition means 13d each constitute a user interface. It should be noted that, since the object selection means 8, the behavior selection means 69, the relevant object selection means 10 and the behavioral parameter setting means 12 are identical with those of the second embodiment, they are denoted by the same reference numerals as the latter and their description is omitted to avoid duplication of explanation. The visual programming system implemented by the third embodiment is stored typically in the hard disc drive (HDD) 43 shown in FIG. 1 to be executed by the CPU 7 in conjunction with the display apparatus 1, the input apparatus 2 and other components.

In the system adopting the visual programming method provided by the second embodiment, it is necessary for the user to consider all behavioral rules, that is, all combinations of the states of behavior relevant signals, when setting some of the behavioral rules by using a user interface provided by the behavioral rule setting means 11 in order to avoid incorrect operations.

In the system adopting the visual programming method provided by the third embodiment, on the other hand, there is provided a user interface capable of setting all behavioral rules wherein the visual programming system automatically generates a behavioral rule without the necessity for the user to take all behavioral rules into consideration so that it is necessary for the user to merely accept or deny a behavioral rule generated by the system.

Operations carried out by the system adopting the visual programming method provided by the third embodiment are explained as follows.

If the outcome of the judgment formed at the step ST53 of the flowchart of FIG. 24 representing operations carried out by the behavioral rule setting means 11 indicates that a button other than the 'rule setting' button 601 on the behavioral rule setting window 600 has been clicked, the processing is ended. In the case of the visual programming system implemented by the third embodiment, on the other hand, the flow of the processing goes on from a step ST83 to an operation carried out by the behavioral rule generation means 13a as shown by a flowchart of FIG. 29.

Figure 29:
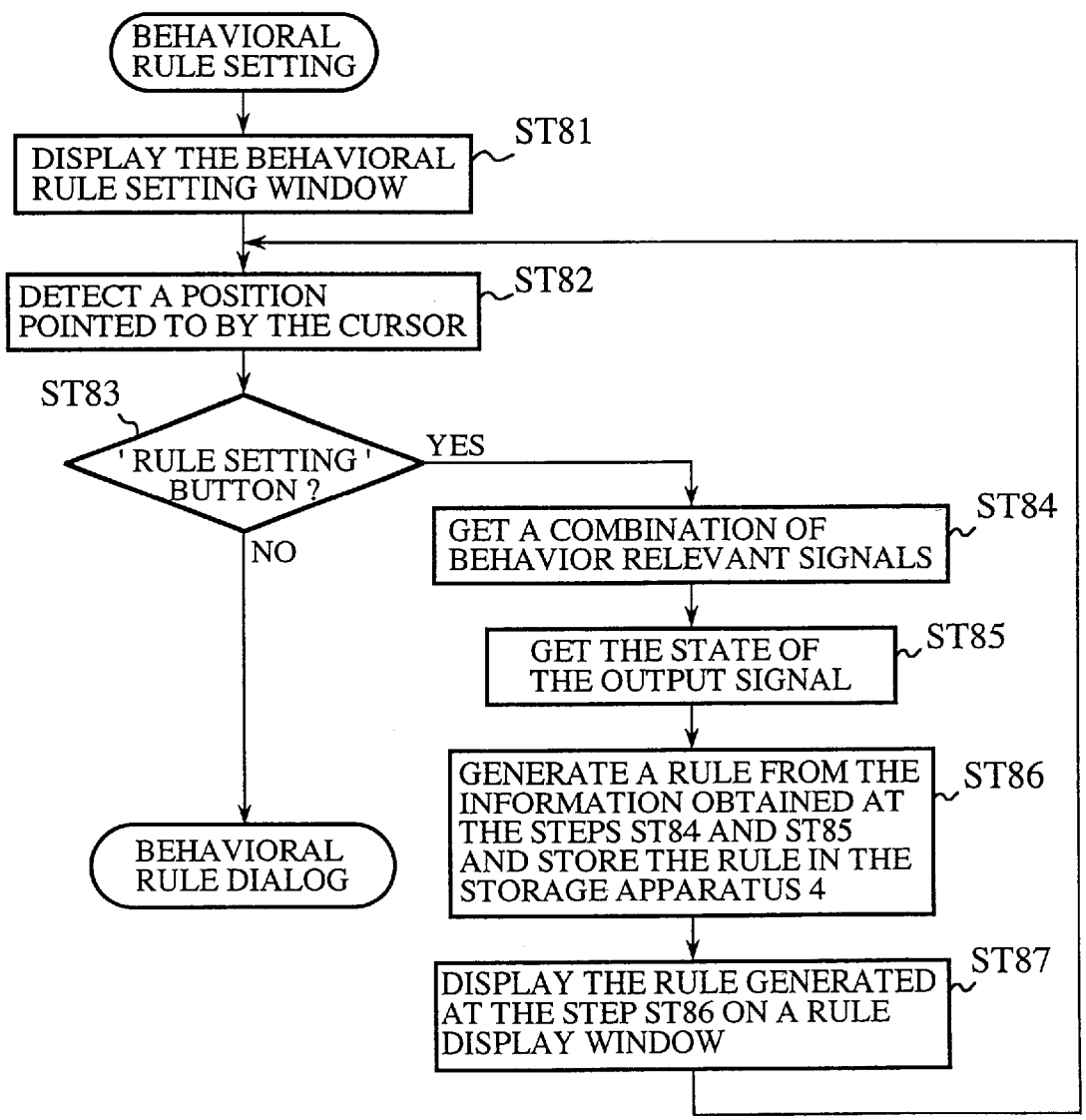
FIG. 29 is a flowchart showing typical operations carried out by a behavioral rule setting means shown in FIG. 28.

To be more specific, if the outcome of the judgment formed at the step ST83 of the flowchart shown in FIG. 29 indicates that the 'next operation' button 602 of the behavioral rule setting window 600 shown in FIG. 7 has been clicked while the user is setting behavioral rules by using the behavioral rule setting means 11, the processing continues from the behavioral rule setting means 11 to the behavioral rule generation means 13a. The behavioral rule generation means 13a reads out behavioral rules from typically the RAM unit 42 of the storage apparatus 4. The behavioral rules have been set by using the behavioral rule setting means 11 and stored in the RAM unit 42 prior to the detection of the clicking of the 'next operation' button 602 on the behavioral rule setting window 600. Behavioral rules that have not been set by the user are then generated by using the behavioral rules read out from the RAM unit 42 as a base.

Since behavioral rules can be generated by the visual programming system using an already known technique, the description of the generation method is omitted. The system generated rule display means 13b displays a system generated behavioral rule on a system generated rule display window 1000 shown in FIG. 11 in terms of graphical objects on the display apparatus 1. The system generated rule modification means 13c detects selection of a 'yes' button 1001 or a 'no' button 1002 made by the user for the system generated behavioral rule on the system generated rule display window 1000.

If the 'no' button 1002 is selected, the state of the signal, the behavior of which is determined by the behavioral rule generated by the visual programming system, is changed. The behavioral rule addition means 13d stores a system generated behavioral rule, typically in the RAM unit 42 of the storage apparatus 4 as a behavioral rule added to behavioral rules already set by using the behavioral rule setting window 600.

The user interfaces of the behavioral rule generation means 13a, the system generated rule display means 13b, the system generated rule modification means 13c and the behavioral rule addition means 13d are explained as follows. In the example shown in FIG. 10, the user sets 2 behavioral rules. Assume that the user does not think of other behavioral rules at this point of time. Since there are a total of 8 possible combinations of the states of the input signals, it is actually necessary to take the remaining 6 combinations into consideration. In this example, the visual programming system automatically generates the remaining 6 combinations and reveals the generated behavioral rules to the user.

The user clicks the 'yes' button 1001 or the 'no' button 1002 by using the mouse 21 for each behavioral rule revealed by the visual programming system in order to respectively accept or reject the behavioral rule automatically generated by the visual programming system. The system generated rule display window 1000 including the 'yes' button 1001 and the 'no' button 1002 used to respectively accept and reject a behavioral rule is displayed when the 'next operation' button 602 of the behavioral rule setting window 600 is clicked by the user by using the mouse 21.

Figure 11:
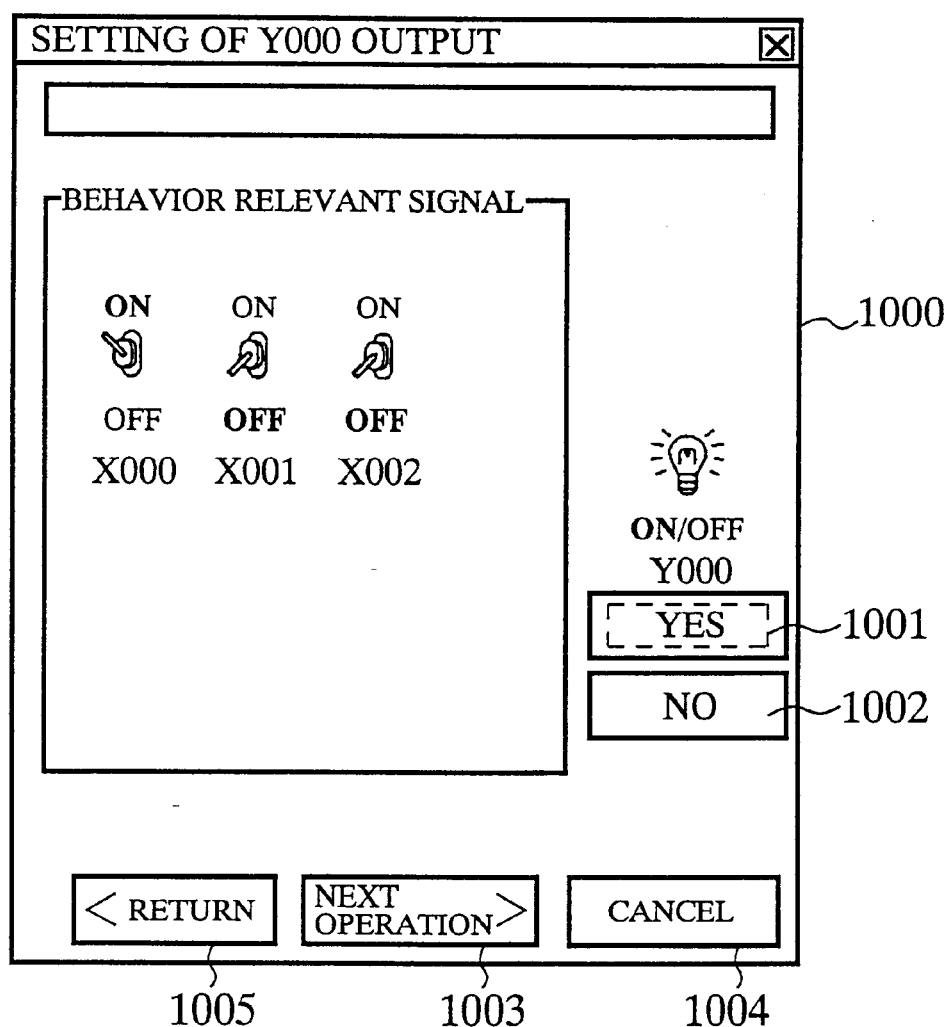
FIG. 11 is an explanatory diagram showing a generated rule display window.

At the time the 'next operation' button 602 of the behavioral rule setting window 600 is clicked, behavioral rules other than behavioral rules already set by the user are read out from the storage apparatus 4 and revealed to the user as system generated behavioral rules. FIG. 11 is an explanatory diagram showing the system generated rule display window 1000, a window for revealing each behavioral rule automatically generated by the visual programming system.

As a continuation of behavioral rules 1 and 2, the visual programming system generates behavioral rule 3 stipulating that the output signal Y000 be turned on when only the input signal X000 is on. In response to behavioral rule 3 of (X000: ON, X001: OFF and X002: OFF→Y000: ON) displayed on the system generated rule display window 1000, the user either clicks the 'yes' button 1001 or the 'no' button 1002 in order to respectively accept or reject behavioral rule 3 automatically generated by the visual programming system. Since the output signal Y000 does not operate in conformity with behavioral rule 3, the user clicks the 'no' button 1002 by using the mouse 21.

When the user clicks the 'no' button 1002, the visual programming system changes the state of the output signal Y007 in the generated behavioral rule from on to off and displays (X000: ON, X001: OFF and X002: OFF Y000: OFF) on the rule display window 700 as behavioral rule 3 instead.

Figure 12:
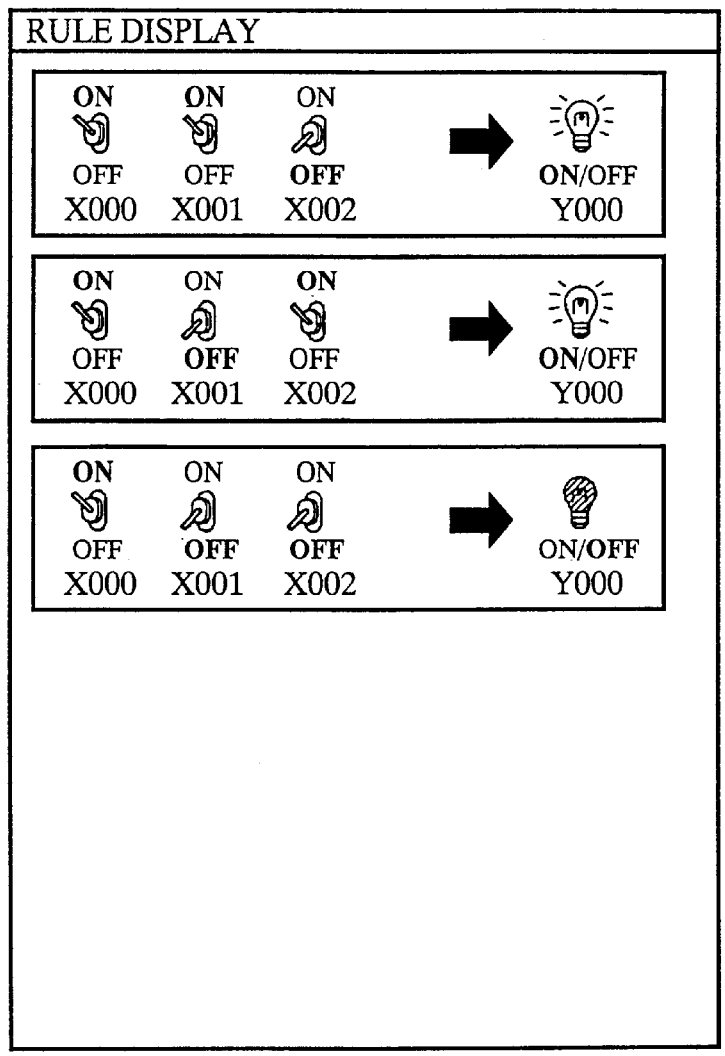
FIG. 12 is an explanatory diagram showing a typical displayed screen of the rule display window obtained as a result of a response given by the user to the system generated rule display window shown in FIG. 11.

FIG. 12 is an explanatory diagram showing a typical displayed screen of the rule display window 700 showing set behavioral rules up to behavioral rule 3. When the user clicks the 'yes' button 1001 or the 'no' button 1002 on the system generated rule display window 1000, the visual programming system generates a next behavioral rule and displays the rule on the system generated rule display window 1000. In this case, a behavioral rule that is judged on the basis of behavioral rules 1, 2 and 3 to be optimum is generated. Thereafter, the visual programming system generates behavioral rules from the remaining combinations of the states of the input signals and displays each of the behavioral rules on the system generated rule display window 1000 in the same way. In response to a generated behavioral rule displayed on the system generated rule display window 1000, the user clicks the 'yes' button 1001 or the 'no' button 1002. In this example, the user clicks the 'no' button 1002 for the remaining 5 behavioral rules following behavioral rules 1, 2 and 3.

In the particular example described above, there are only few combinations of the states of the input signals. If there are a large number of input signal states, the user has to do hard work to respond to each generated behavioral rule. In order to solve this problem, in the present invention, the visual programming system displays an inquiry typically saying: "Will you reject behavioral rules other than the already set behavioral rules?" in accordance with a certain behavioral condition selected by using the behavioral characteristic selection window 300 with proper timing. If the user clicks a 'yes' button in response to the inquiry, remaining behavioral rules will all be discarded. If the user clicks a 'no' button in response to the inquiry, on the other hand, the visual programming system will automatically generate the remaining behavioral rules one rule after another. For each generated behavioral rule, the visual programming system displays the inquiry with proper timing in an attempt to reduce the work load borne by the user.

Figure 13:
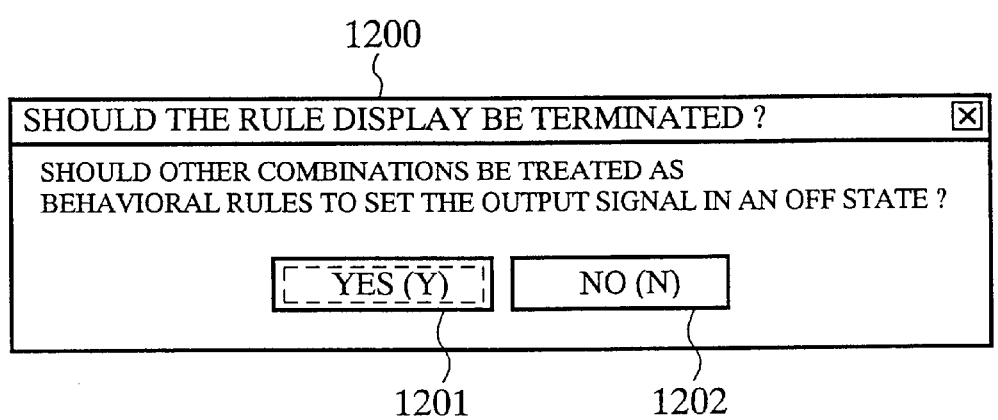
FIG. 13 is an explanatory diagram showing a window serving as an interface for prompting confirmation of treating other behavioral rules as rules to provide an off output signal in an inquiry window.

FIG. 13 is an explanatory diagram showing a window 1200 for displaying the above inquiry. If the user clicks a 'yes' button 1201 on the window 1200 in response to the inquiry, the output signal Y000 will be off in all remaining behavioral rules. If the user clicks a 'no' button 1202 in response to the inquiry, on the other hand, the visual programming system will automatically generate the remaining behavioral rules one rule after another and, for each generated behavioral rule, the visual programming system displays the inquiry. As an alternative solution to the problem described above, the visual programming system provides an environment to display for example 'Others are off' and 'Others are on' buttons on the behavioral rule setting window 600 in accordance with a certain behavioral condition selected by using the behavioral characteristic selection window 300. After judging that a sufficient number of behavioral rules have been set, the user can then click one of those buttons which are shown in none of the figures. In such an environment, the work load borne by the user can also be reduced.

In addition, the visual programming system may provide an environment wherein the user is allowed to terminate the process to set behavioral rules by voice entered through the microphone 23 or by a gesture through the gesture recognition unit 24.

Figure 30:
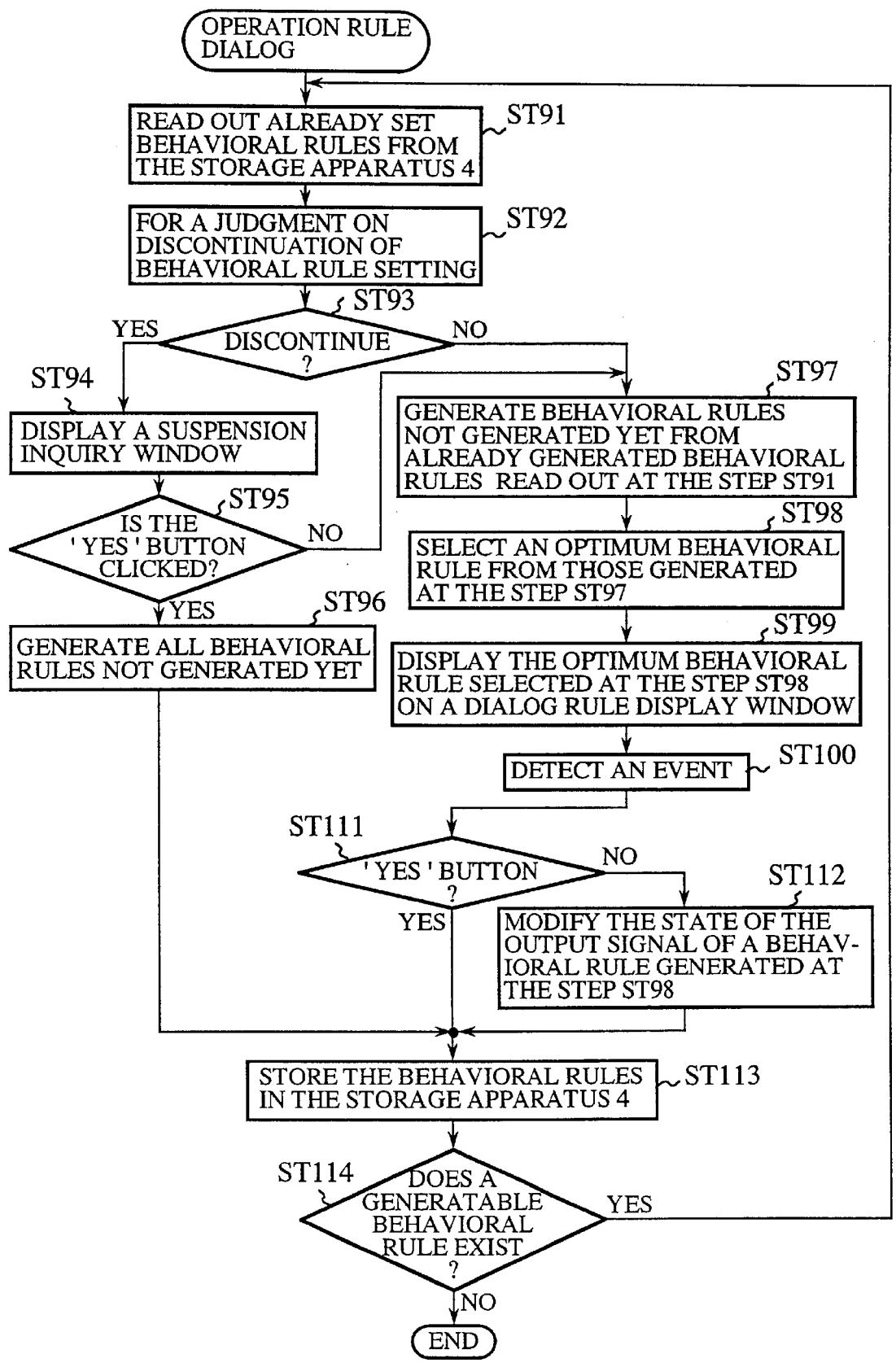
FIG. 30 is a flowchart showing typical operations carried out by a behavioral rule generation means 13a, a generated rule display means 13b, a system generated rule modification means 13c and a behavioral rule addition means 13d employed in the system adopting the visual programming method according to the third embodiment of the present invention.

FIG. 30 is a flowchart showing typical operations carried out by the behavioral rule generation means 13*a*, the system generated rule display means 13*b*, the system generated rule modification means 13*c* and the behavioral rule addition means 13*d*. As shown in the figure, the flowchart begins with a step ST91 at which the behavioral rule setting means 11 reads out behavioral rules set by the user from the storage apparatus 4. The flow of the processing then goes on to a step ST92 at which a logic equation generating means 14 forms a judgment as to whether or not operations rules sufficient for generating a logic equation have been set. The logic equation generating means 14 generates a logic equation from already set behavioral rules read out from the storage apparatus 4 and makes a decision to discontinue the process to set behavioral rules on the basis of the already set behavioral rules. The logic equation means 14 will be explained in detail in the description of a fourth embodiment.

If a decision to discontinue the process to set behavioral rules is made at the step ST92, at the step ST93, the window 1200 like the one shown in FIG. 13 is displayed on the display apparatus 1 to ask the user if the process to set behavioral rules can be discontinued by setting the output signal in an inactive state for all remaining behavioral rules which have not been set. The window also includes a 'yes' button 1201 and a 'no' button 1202 to be clicked by the user.

If the outcome of a judgment formed at a step ST95 indicates that the 'yes' button 1201 of the window 1200 displayed at the step ST94 has been clicked, the flow of the processing goes on to a step ST96 at which, for example, all remaining behavioral rules that have not been set are set with the output signal put in an inactive state. The flow of the processing then proceeds to a step ST113 at which the remaining behavioral rules set in this way are stored in the storage apparatus 4, ending the processing. Instead of continuing from the step ST93 to ST94 or continuing from the step ST95 to ST96, the flow of the processing may go on to the step ST97 at which behavioral rules that have not been set are generated from the behavioral rules read out from the storage apparatus 4 at the step ST91.

The flow of the processing then proceeds to a step ST98 at which a behavioral rule judged to be optimal among the behavioral rules generated at the step ST97 is selected. Then, the flow of the processing goes on to a step ST99 at which the behavioral rule selected at the step ST98 is displayed on the system generated rule display window 1000 in terms of visual objects. For example, knowing that behavioral rules 1 and 2 have been set, by using a Karnaugh map, behavioral rules that have not been set are generated at the step ST97 and a behavioral rule which is judged to be optimal among the generated behavioral rules is identified at the step ST98. Finally, the optimal behavioral rule is displayed at the step ST99 as shown in FIG. 11.

On the rule display window 700 on the right side of the display apparatus 1, behavioral rules 1 and 2 are displayed. On the system generated rule display window 1000, behavioral rule 3 of (X000: ON, X001: OFF and X002: OFF Y000: ON) generated from behavioral rules 1 and 2 is displayed. If the user thinks that the state of the output signal in behavioral rule 3 is correct for the combination of the states of the behavior relevant signals in the same behavioral rule, the user clicks the 'yes' button 1001. Otherwise, the user clicks the 'no' button 1002.

The flow of the processing then proceeds to a step ST100 to detect an event (a click event) in which the user clicks the 'yes' button 1001 or the 'no' button 1002 on the system generated rule display window 1000 displayed at the end of the display processing carried out at the step ST99.

Then, the flow of the processing continues to a step ST111 to form a judgment as to whether or not the click event detected at the step ST100 is an event in which the user clicks the 'yes' button 1001 on the system generated rule display window 1000. An outcome of the judgment indicating that the 'yes' button 1001 has been clicked implies that the behavioral rule generated by the behavioral rule generation means 13a matches the intention of the user. In this case, the flow of the processing goes on to a step ST113 at which the behavioral rule displayed on the system generated rule display window 1000 at the step ST99 is stored in the storage apparatus 4.

On the other hand, an outcome of the judgment of the step ST111 indicating that a button other than the 'yes' button 1001 has been clicked implies that the behavioral rule generated by the behavioral rule generation means 13a does not match the intention of the user. It should be noted that, in this explanation, a button other than the 'yes' button 1001 is the 'no' button 1002. In this case, the flow of the processing goes on to a step ST112 at which the state of the output signal in the behavioral rule displayed on the system generated rule display window 1000 at the step ST99 is inverted. For example, the on state is changed to an off one. The flow of the processing then continues to a step ST113.

In the example described above, the output signal is assumed to be activated in accordance with behavioral rules 1 and 2 only. Thus, for a behavioral rule shown in FIG. 11, the 'no' button 1002 is clicked. According to the behavioral rule shown in FIG. 11, the output signal Y000 is active. Thus, in the cataloged behavioral rule, the state of the output signal Y000 is inactive as displayed on the bottom line of the rule display window 700 shown in FIG. 12.

The flow of the processing then continues to a step ST114 to form a judgment as to whether or not a behavioral rule can be newly generated. If the outcome of the judgment indicates that all behavioral rules capable of generation have been generated, the processing is terminated. Otherwise, the flow of the processing returns to the step ST91 to carry out the processing described above repeatedly. In the flowchart, the operations at the steps ST91 to ST98 are carried out by the behavioral rule generation means 13a and the operation at the step ST99 is done by the system generated rule display means 13b. The operations at the steps ST110 to ST112 are performed by the system generated rule modification means 13c whereas the operations at the steps ST113 and ST114 are executed by the behavioral rule addition means 13d.

As described above, according to the third embodiment, there is provided a user interface capable of setting all behavioral rules wherein the visual programming system automatically generates a behavioral rule without the necessity for the user to take all behavioral rules into consideration so that it is necessary for the user to merely accept or deny a behavioral rule generated by the system. As a result, the user is capable of doing program development and programming work with ease without having knowledge of sophisticated programming.

FOURTH EMBODIMENT

Figure 31:
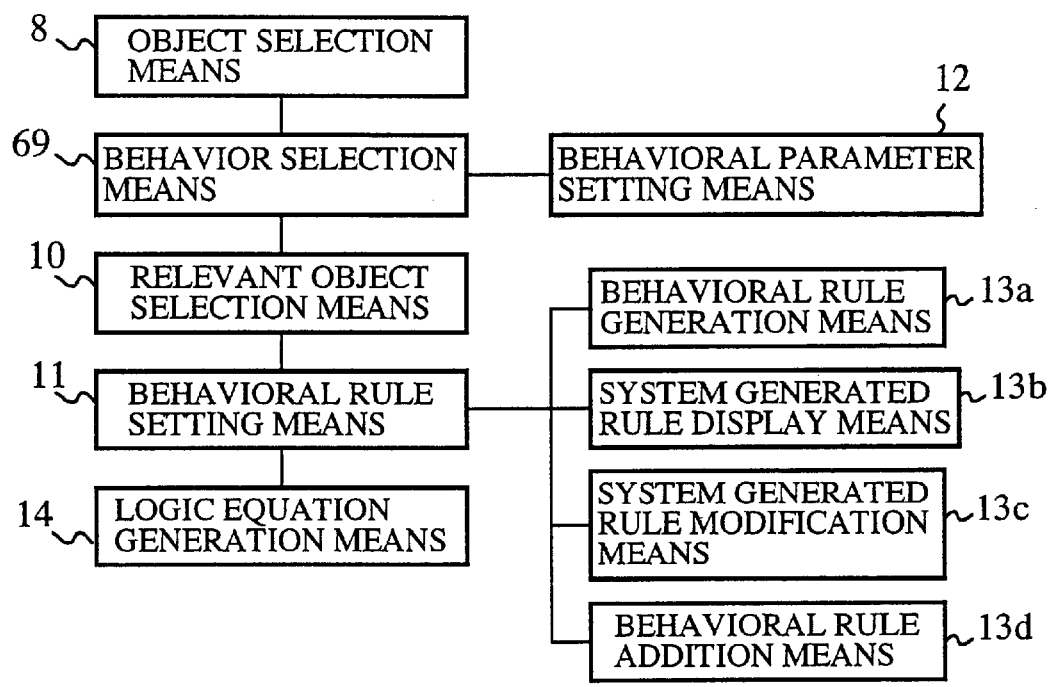
FIG. 31 is a block diagram showing a system adopting the visual programming method as implemented by a fourth embodiment of the present invention.

FIG. 31 is a block diagram showing a system adopting the visual programming method of the present invention. In the figure, reference numeral 14 denotes a logic equation generating means for generating a logic equation from behavioral rules stored in the storage apparatus 4. The logic equation generating means 14 does not have a user interface. It should be noted that, since the object selection means 8, the behavior selection means 69, the relevant object selection means 10, the behavioral rule setting means 11 and the behavioral parameter setting means 12, the behavioral rule generation means 13a, the system generated rule display means 13b, the system generated rule modification means 13c and the behavioral rule addition means 13d are identical with those of the second embodiment, they are denoted by the same reference numerals as the latter and their description is omitted to avoid duplication of explanation. The visual programming system implemented by the fourth embodiment is stored typically in the hard disc drive (HDD) 43 shown in FIG. 1 to be executed by the CPU 7 in conjunction with the display apparatus 1, the input apparatus 2 and other components.

In order to execute a program generated by a visual programming system implemented by the first, second or third embodiment, the program is loaded into a PLC and the user manipulates actual physical behavior relevant signals to make the output signal start the behavior thereof. At that time, it is necessary to assure that the states of the physical behavior relevant signals match behavioral rules which serve as a behavioral condition of the output signal.

In the system adopting the visual programming method provided by the fourth embodiment, a logic equation is generated from behavioral rules stored in the storage apparatus 4 and matching processing carried out by the behavioral rules during an operation is eliminated in order to increase the operating speed.

The operation of the logic equation generating means 14 is explained as follows.

None of the figures show a flowchart representing operations carried out by the logic equation generating means 14. A logic equation is generated from behavioral rules stored in the storage apparatus 4 typically by using the Quine-McCluskey method.

In the examples shown for the visual programming systems implemented by the first to third embodiments, the output signals displays behaviors in conformity with behavioral rules 1 and 2 only. For example, let 1 bit be assigned to each of the input signals and the on and off states be expressed by '1' and '0' respectively. In this case, behavioral rules 1 and 2 are expressed by bit strings 110 and 101 respectively. Thus, a logic equation is generated by finding a logical sum of these bit strings. The logical sum is expressed by an expression 110+101. By factorizing this expression, the logic equation serving as a behavioral condition of the output signal Y000 is found to be Y000=X000* (X001*^X002+^X001*X002) where the symbols '*', '+' and '^' represent respectively logic al multiplication, logical addition and logical negation of logic processing.

As described above, according to the fourth embodiment, a logic equation generating means generates a logic equation from behavioral rules stored in a storage apparatus, allowing matching processing carried out by behavioral rules during an operation to be eliminated. As a result, a program generated by the visual programming system can be executed at a high speed and the efficiency of the programming work can be enhanced.

FIFTH EMBODIMENT

Figure 32:
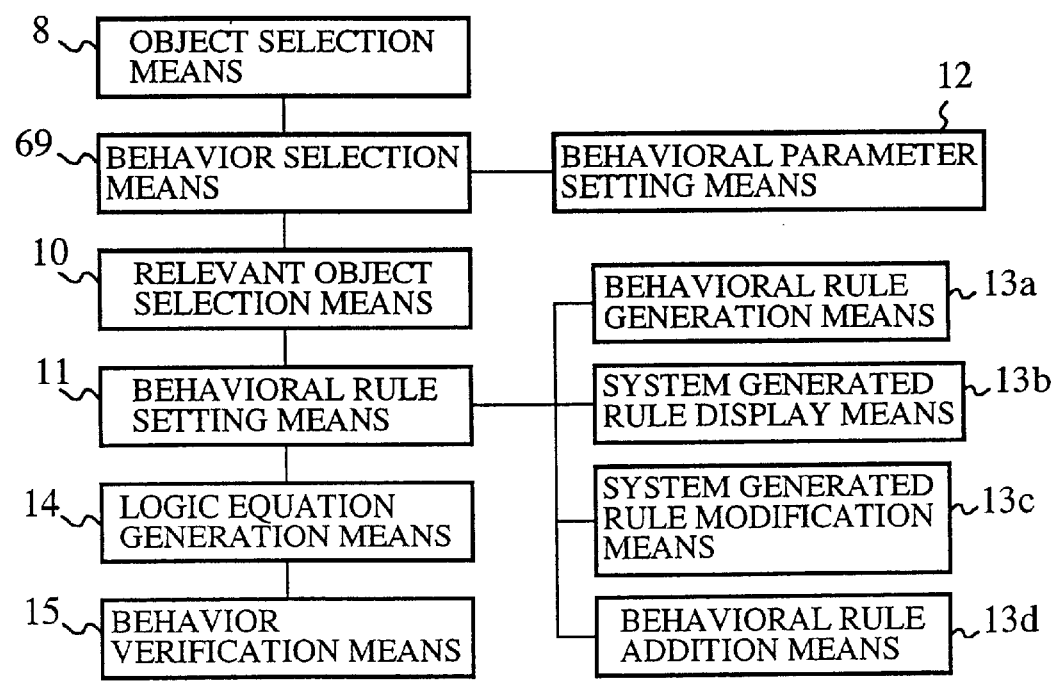
FIG. 32 is a block diagram showing a system adopting the visual programming method as implemented by a fifth embodiment of the present invention.
Figure 33:
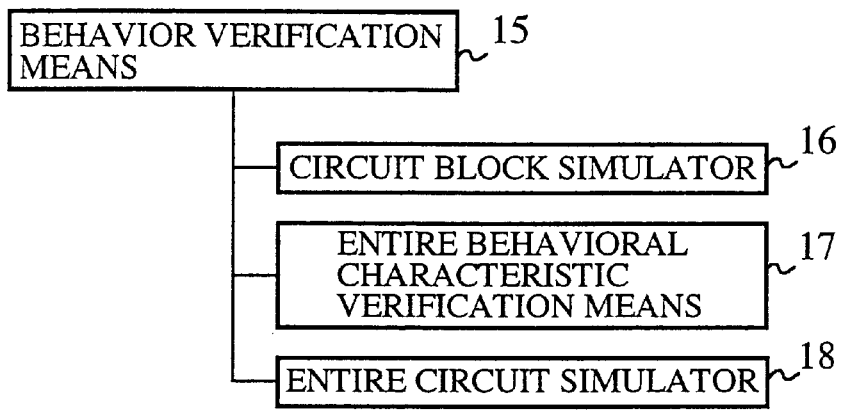
FIG. 33 is a block diagram showing a behavior verification means employed in the visual programming system shown in FIG. 32.

FIG. 32 is a block diagram showing a system adopting the visual programming method as implemented by a fifth embodiment of the present invention. In the figure, reference numeral 15 denotes a behavior verification means. FIG. 33 is a block diagram showing the behavior verification means 15. In the figure, reference numeral 16 denotes a circuit block simulator for executing a circuit block simulation and reference numeral 17 denotes an entire behavioral characteristic verification means. Reference numeral 18 is an entire circuit simulator for executing an entire circuit simulation it should be noted that other configuration elements are identical with those employed in the fourth embodiment and denoted by t he same reference numerals as the latter. Their description is thus omitted to avoid duplication of explanation. The visual programming system implemented by the fifth embodiment is stored typically in the hard disc drive (HDD) 43 shown in FIG. 1 to be executed by the CPU 7 in conjunction with the display apparatus 1, the input apparatus 2 and other components.

In the case of the visual programming system implemented by the fourth embodiment, in order to verify operations carried out by a program generated by the visual programming system, it is necessary to actually load the generated program into a PLC and execute the program in the PLC. In the system adopting the visual programming method provided by the fifth embodiment, on the other hand, operations carried out by a generated program can be verified through execution on the graphical editor.

None of the figures show a flowchart of the behavior verification means 15. The circuit block simulator 16 and the entire circuit simulator 18 operate by using timer control.

In a circuit block simulation executed by the circuit block simulator 16, visual objects representing behavior relevant signals selected by using the relevant signal selection window 500 are displayed on the behavior verification window 1300 of a circuit block created on the basis of a logic equation generated by the logic equation generating means 14 and used as a behavioral condition of an output signal along with areas for visually displaying data representing behavioral characteristics selected by using the behavioral characteristic selection window 300.

FIG. 14 is an explanatory diagram showing a typical state displayed on the behavior verification window 1300 provided by the fifth embodiment wherein the output signal Y000 and the input signals X000, X001 and X002 relevant to the behavior of the output signal Y000 constitute a circuit block based on a logic equation serving as a behavioral condition of the output signal Y000 and 'A delay exists' and 'flickering' are selected as behavioral characteristics of the output signal Y000. On the behavior verification window 1300 shown in FIG. 14, a 'verification by sentences' button 1301 is displayed but is ineffective in the fifth embodiment.

The output signal Y000 displays a behavior in conformity with behavioral rules 1 and 2 only. For example, assume that the visual objects for the input signals X000 and X001 displayed on the behavior verification window 1300 are changed from an OFF state to an ON state typically by operating the mouse 21 of the input apparatus 2 to so as to conform to behavioral rule 1.

In a circuit block simulation executed by the circuit block simulator 16, the fact that the states of the input signals X000 and X001 are set in conformity to behavioral rule 1 is detected and behavioral characteristics are read out from the storage apparatus 4. A behavior of the output signal Y000 conforming to the behavioral characteristics is then displayed on the behavior verification window 1300. FIG. 15 is an explanatory diagram showing a state conforming to behavioral rule 1 displayed on the behavior verification window 1300.

To put it in detail, in the circuit block simulation executed by the circuit block simulator 16, first of all, the 'A delay exists' behavioral characteristic is checked. Since an ON operation delay of the 'A delay exists' behavioral characteristic is 0, the 'flickering' behavioral characteristic is checked as soon as the fact that the states of the input signals X000 and X001 are set in conformity to behavioral rule 1 is detected. Since the ON time width and the OFF time width of the 'flickering' behavioral characteristic are both set at 0.3 seconds, the output signal Y000 flickers at intervals of 0.3 seconds. In the circuit block simulation executed by the circuit block simulator 16, the execution of the flickering behavior of the output signal Y000 is continued until the setting of the states of the input signals X000, X001 and X002 not conforming to behavioral rules 1 and 2 is detected on the behavior verification window 1300.

In the circuit block simulation executed by the circuit block simulator 16, as described above, the fact that the user sets a rule satisfying a logic equation for making the output signal display a behavior on a circuit block simulation window is detected and, by sequentially executing behavioral characteristics selected by using the behavior selection means 69, the output signal is driven to display a behavior. With the circuit block simulation executed by the circuit block simulator 16, the user is capable of verifying operations carried out by a program defining the behavior of one output signal.

Entire behavioral characteristic verification by the entire behavioral characteristic verification means 17 is started when a 'component model window display' sub-menu of a 'verification' menu of the signal box 200 is selected. It should be noted that the 'component model window display' sub-menu itself is shown in none of the figures.

FIG. 17 is an explanatory diagram showing a portion of the component model window 160. On the component model window 160 shown in FIG. 17, typically, combinations of behavior relevant signals and behavioral characteristics displayed on the behavior verification window 1300 shown in FIG. 14 are expressed globally on a macro basis. Since the purpose of the behavior verification window 1300 is to locally verify operations carried out by a program generated for an output signal, a logic equation and behavioral characteristics are displayed in detail. On the other hand, the component model window 160 is used for verification of setting of behavioral characteristics for all output signals globally on a macro basis. Pieces of information set for behavioral characteristics of all output signals are thus displayed on the component model window 160 globally on a macro basis in order to allow all the pieces of information to be displayed at the same time. It should be noted that, in the example shown in FIG. 17, information on only one output signal is displayed though.

An entire circuit simulation by the entire circuit simulator 18 is started when an 'entire simulation start' sub-menu of the 'verification' menu of the signal box 200 is selected. It should be noted that the 'entire simulation start' sub-menu itself is shown in none of the figures. In a circuit block simulation by the circuit block simulator 16, only operations for one output signal can be verified. In the entire circuit simulation by the entire circuit simulator 18, on the other hand, operations for all programmed output signal can be verified.

Operations for output signals can be verified at the same time at the level of the behavior verification window 1300. The window 170 shown in FIG. 18 does not include a button corresponding to the 'verification by sentences' button 1301 displayed on the behavior verification window 1300 shown in FIG. 14.

Figure 19:
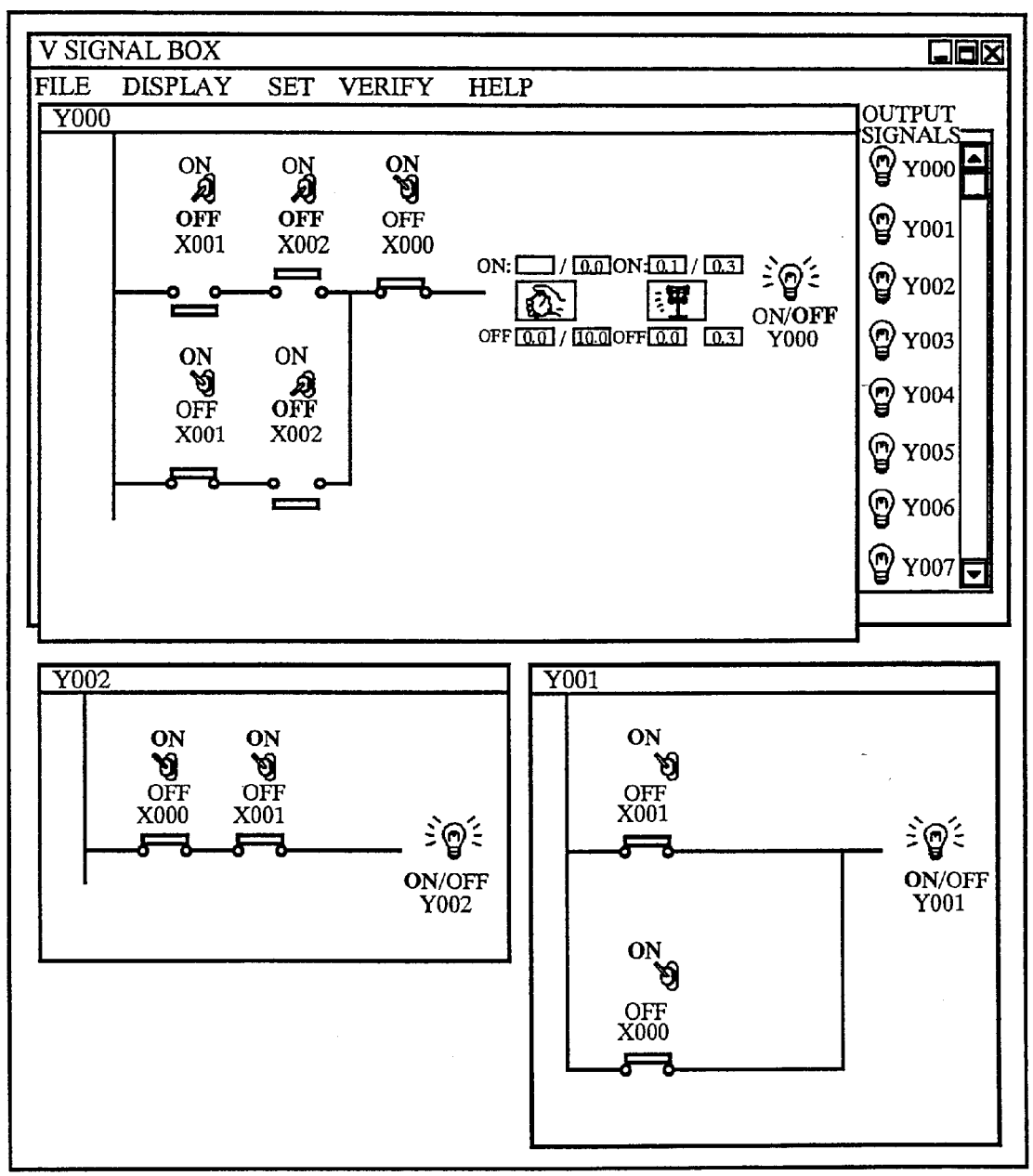
FIG. 19 is an explanatory diagram showing a result of a typical operation of the entire circuit simulation shown in FIG. 18.

FIG. 18 is an explanatory diagram showing a state resulting from selection of the 'entire simulation start' sub-menu upon completion of programming of three output signals Y000, Y001 and Y002. Three circuit block simulation windows shown in FIG. 18 each with an output signal name at the left upper corner thereof are each referred to as a circuit block simulation window. Simulation is carried out by operating visual objects each representing an input signal on each of the circuit block simulation window in the same way as the behavior verification window 1-300. However, an operation carried out on a visual object representing an input signal on any of the circuit block simulation windows is interlocked with the all other circuit block simulation windows. To be more specific, consider as an example a case in which visual objects representing the input signals X000 and X001 respectively on the circuit block simulation window for the output signal Y000 are switched from an off state to an on state. In this case, the input signals X000 and X001 on the circuit block simulation window for the output signal Y001 as well as the input signals X000 and X001 on the circuit block simulation window for the output signal Y002 are also switched from an off state to an on state at the same time, causing all the 3 output signals to start their behaviors. FIG. 19 is an explanatory diagram showing a result of the interlocked operations described above.

As described above, according to the fifth embodiment, operations carried out by a program generated by the visual programming system can be verified on the graphical editor by using a behavior verification means. As a result, even a user with little programming knowledge is capable of correctly doing programming work with ease.

SIXTH EMBODIMENT

Figure 34:
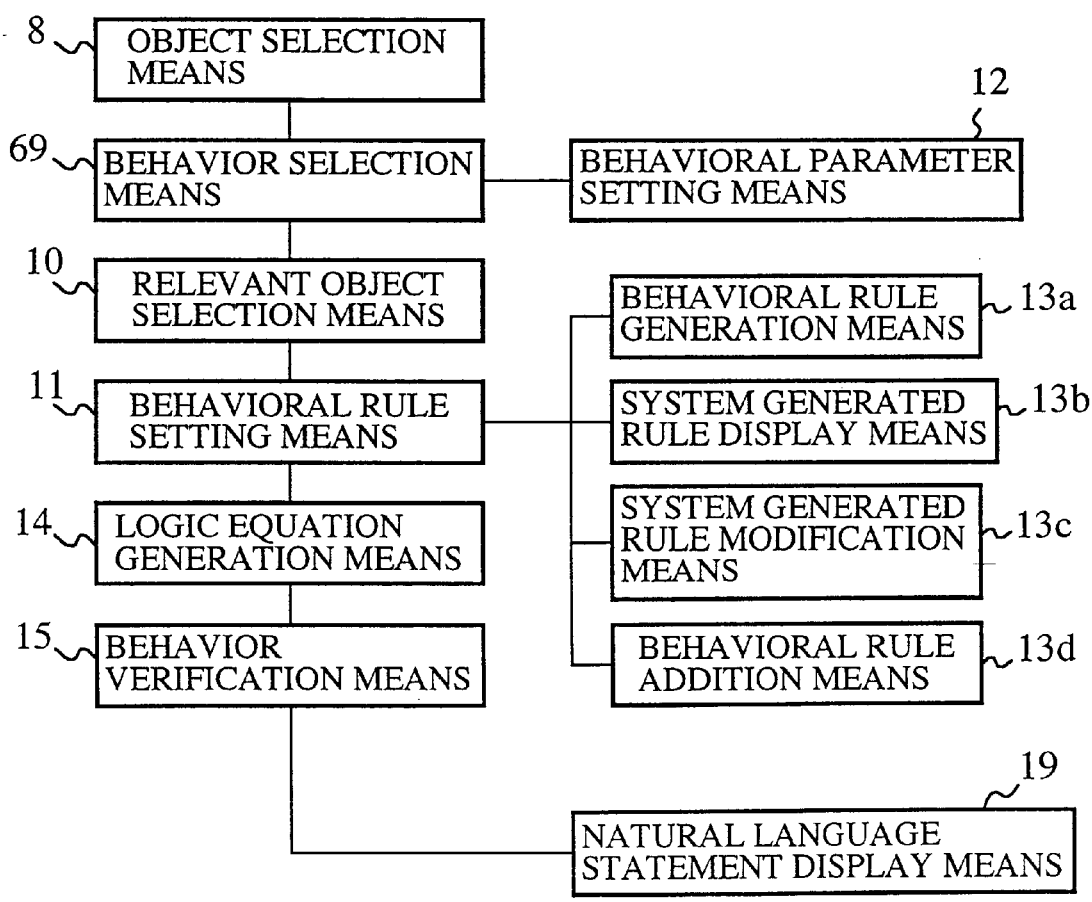
FIG. 34 is a block diagram showing a system adopting the visual programming method as implemented by a sixth embodiment of the present invention.

FIG. 34 is a block diagram showing a system adopting the visual programming method as implemented by a sixth embodiment of the present invention. In the figure, reference numeral 19 denotes a natural language statement display means having a function to describe a program by using sentences written in a natural language. It should be noted that other configuration elements are identical with those employed in the fifth embodiment and denoted by the same reference numerals as the latter. Their description is thus omitted to avoid duplication of explanation. The visual programming system implemented by the sixth embodiment is stored typically in the hard disc drive (HDD) 43 shown in FIG. 1 to be executed by the CPU 7 in conjunction with the display apparatus 1, the input apparatus 2 and other components.

In the case of the visual programming systems implemented by the first to fifth embodiments, the user does work to verify operations carried out by a program automatically generated by a visual programming system by using only interfaces which allow the user to do the work visually. In the case of a plurality of selected behavioral characteristics, for example, it may be difficult for the user to intuitively verify results of programming such as the ones shown in FIG. 14 using the behavior verification means 15. In this case, it is necessary to display combinations of behavior relevant signals and behavioral characteristics for verification one after another.

In the case of the system adopting the visual programming method as implemented by the sixth embodiment, the visual programming system is provided with an additional function to describe a program by using sentences written in a natural language in order to support the means used for verifying operations carried out by a program automatically generated by the visual programming system. For example, the natural language statement display means 19 is added to the configuration of the visual programming system implemented by the fifth embodiment as shown in FIG. 34.

The operation of the natural language statement display means 19 is explained as follows.

The natural language statement display means 19 generates sentences for explaining the behavior of an output signal mainly from information stored by the behavior selection means 69 and the behavioral parameter setting means 12 typically in the RAM unit 42 of the storage apparatus 4 and a logic equation generated by the logic equation generation means 14 when the natural language statement display means 19 detects the fact that the user clicks the verification by sentences button 1301 of the behavior verification window 1300 shown in FIG. 14 by operating the mouse 21. The generated sentences are displayed on a window newly displayed as a window other than the circuit block simulation window 1300. It should be noted that the newly displayed window itself is shown in none of the figures.

It is an object of the present invention to provide a visual programming environment. In programming work, however, logical thoughts of the user are demanded. For example, logical thoughts are required in setting a behavioral rule. As part of the visual programming environment, the present invention provides the natural language expression display means 19 for displaying sentences written in a natural language in order to support logical thoughts of the user. For example, the results displayed on the behavior verification window 1300 shown in FIG. 14 can be explained in terms of literal sentences as follows: "The output signal Y000 starts flickering at intervals of 0.3 seconds when the input signal X000 is turned on, the input signal X001 is turned on and the input signal X002 is turned off, or the input signal X000 is turned on, the input signal X001 is turned off and the input signal X002 is turned on, and when another behavioral condition is turned on, the flickering behavior is ended 10 seconds after the other behavioral condition is set."

By checking the literal description of the behavior of the output signal against the results of the programming displayed on the behavior verification window 1300, the user is capable of verifying the results of programming work done so far. In the visual programming environment of the visual programming system provided by the present invention, even a user having no knowledge of programming languages such as C, Basic and rudder diagrams cited in the description of the embodiments is capable of automatically generating a program by merely clicking graphical objects using a mouse.

To be more specific, the user is capable of generating a program through user interfaces. In addition, the user is also capable of carrying out simulation of a generated program by carrying out the same operations as the programming. Furthermore, it is needless to say that the user is also capable of modifying a program.

Here, if the 'cancel' button 305 on the behavioral characteristic selection window 300 shown in FIG. 4, the 'cancel' button 402 on the parameter setting window 400 shown in FIG. 5, the 'cancel' button 504 on the relevant signal selection window 500 shown in FIG. 6, the 'cancel' button 603 on the behavioral rule setting window 600 shown in FIG. 7, the 'cancel' button 1004 on the system generated rule display window 1000 shown in FIG. 11 or the 'cancel' button 1303 on the circuit block simulation window shown in FIG. 14 is selected, data set in the programming work done so far is all cleared, allowing the programming to be started again from a scratch. That is to say, the selection of the 'cancel' button results in a state in which the programming can be started from the work of selecting an output signal from those shown in the signal box 200.

If the 'return' button 306 on the behavioral characteristic selection window 300 shown in FIG. 4, the 'return' button 403 on the parameter setting window 400 shown in FIG. 5, the 'return' button 505 on the relevant signal selection window 500 shown in FIG. 6, the 'return' button 604 on the behavioral rule setting window 600 shown in FIG. 7, the 'return' button 1005 on the system generated rule display window 1000 shown in FIG. 11 or the 'return' button 1304 on the circuit block simulation window shown in FIG. 14 is selected, the flow of the processing of the programming work returns to an immediately preceding programming environment. For example, when the 'return' button 403 on the parameter setting window 400 shown in FIG. 5 is selected, the behavioral characteristic selection window 300 shown in FIG. 4 is displayed again.

The scope of the visual programming method provided by the present invention is not limited to the first to sixth embodiments described above. That is to say, the visual programming method provided by the present invention can also be applied to a field other than the programming environment of a programmable logic controller (PLC).

As described above, according to the sixth embodiment, the description of a program automatically generated by the visual programming system is presented to the user in terms of literal sentences written in a natural language. Thus, the user is capable of verifying the program through the literal sentences written in a natural language in addition to results of programming displayed on a circuit block simulation window. As a result, there is provided an effect that the user is capable of carrying out programming work with ease.

Embodiments Applying the Invention to FBDs, a PLC Programming Language

The following is a description of seventh to twelfth embodiments in which the visual programming method provided by the present invention and the system adopting the method are applied to functional block diagrams (FBDs), a programming language of programmable logic controllers (PLCs).

The system shown in FIG. 1 can also be used as a system adopting a visual programming methods provided by the seventh to twelfth embodiments.

In the visual programming system provided by the present invention, graphical objects used by the user are stored in and added to the storage apparatus 4.

In the following description of the embodiments, for each connected graphical object, lines on the left and right sides of the graphical object represent an input to and an output from the graphical object respectively.

The visual programming system provided by the present invention is constructed by using the commonly known object oriented technology. In addition, the graphical object used in the present invention is a generic name of resources for user interfaces usable in the present time and in the future such as windows, dialog boxes, icons, check boxes, buttons, scroll bars and menus.

In the following description, an object used in programming is referred to as a graphical object or a visual object.

When the user operates user interfaces based on the visual programming method provided by the present invention, the visual programming system of the present invention shown in FIG. 1 automatically generates a program. In the following description, only items of user interfaces characterizing the present invention are explained. Since techniques for automatically generating a program are the same as the conventional system, it is not necessary to explain them.

In order to operate user interfaces based on the visual programming method provided by the present invention, the use of a variety of input apparatuses is conceivable. In the following description, however, basic operations of graphical objects such as buttons, check boxes, slide bars and icons are carried out typically by clicking (or dragging) the mouse 21 of the input apparatus 2. Characters are entered by typically operating the keyboard 22 of the input apparatus 2.

A phrase saying: "a graphical object is clicked" or the like in the following description means a series of operations wherein the graphical object on a screen of a graphical editor is first pointed to by a cursor, that is, the cursor is located at a position inside the graphical object, and the button of the mouse is subsequently pressed and then released.

On the other hand, a phrase saying: "a graphical object is double-clicked" or the like means a series of operations wherein the graphical object on a screen of a graphical editor is first pointed to by a cursor, that is, the cursor is located at a position inside the graphical object, and the button of the mouse is then pressed twice within a predetermined period of time.

A phrase saying: "a graphical object is dragged" or the like means a series of operations wherein the graphical object on a screen of a graphical editor is first pointed to by a cursor, that is, the cursor is located at a position inside the graphical object, and the mouse is then moved with the button pressed.

A phrase saying: "a graphical object is dragged and dropped" or the like means a series of operations wherein the mouse is dragged, that is, moved with the button pressed to a target position and, at the target position, the mouse is dropped, that is, the pressing of the button is ended.

A graphical object in a phrase saying "A graphical object is operated" or the like is a generic graphical object representing a button, a check box, a slide bar, an icon, etc. instead of a specific object such as an icon.

SEVENTH EMBODIMENT

Figure 35:
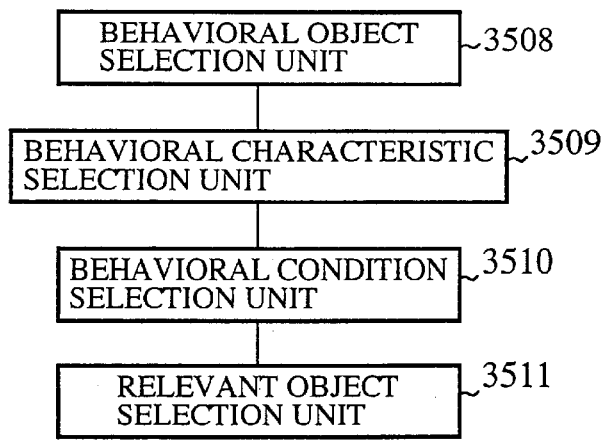
FIG. 35 is a block diagram showing a system adopting the visual programming method as implemented by a seventh embodiment of the present invention.

FIG. 35 is a block diagram showing a system adopting the visual programming method as implemented by a seventh embodiment of the present invention. In the figure, reference numerals 3508, 3509, 3510 and 3511 denote a behavioral object selection unit, a behavioral characteristic selection unit, a behavioral condition setting unit and a relevant object selection unit respectively. Characteristics of the visual programming system implemented by the seventh embodiment mainly relate to user interfaces. Like the conventional system, the visual programming system implemented by the seventh embodiment certainly includes a means for generating a program (or code). It should be noted that this means is shown in none of the figures. A program generated by the visual programming system is transmitted to a programmable logic controller (PLC) typically by way of the network connection apparatus 5 shown in FIG. 1. The visual programming system implemented by the seventh embodiment as shown in FIG. 35 is stored typically in the hard disc drive (HDD) 43 shown in FIG. 1 and, when necessary, loaded into the RAM unit 42 to be executed by the CPU 7 in conjunction with the display apparatus 1, the input apparatus 2 and other components. As user interfaces, the behavioral object selection unit 3508, the behavioral characteristic selection unit 3509, the behavioral condition setting unit 3510 and the relevant object selection unit 3511 use a behavioral object selection window 3600, a behavioral characteristic selection window 3800 shown in FIG. 38, a behavioral condition setting window 4100 shown in FIG. 41 and a relevant object selection window 4400 shown in FIG. 44 respectively.

In the system adopting the visual programming method as implemented by the seventh embodiment, the behavioral object selection unit 3508 is used for selecting a graphical object representing a driving member defining a behavior of a load connected thereto. The behavioral characteristic selection unit 3509 is used for selecting characteristics of the behavior of a graphical object representing a driving member defining a behavior of a load connected thereto. The behavioral condition setting unit 3510 is used for setting conditions for the behavior of a graphical object representing a driving member defining a behavior of a load connected thereto, that is, for setting behavioral conditions of a graphical object representing a driving member defining a behavior of a load connected thereto. The relevant object selection unit 3511 is used for selecting a graphical object representing a member relevant to a graphical object representing a driving member defining a behavior of a load connected thereto. As a result, there is exhibited an effect that a user who has a lack of professional knowledge of programming is capable of visually developing a program with ease by merely clicking graphical objects displayed on a screen of a graphical editor using a device such as a mouse without the need to master a programming language which is difficult to understand.

The following is a description of the behavioral object selection unit 3508 employed in the visual programming system implemented by the seventh embodiment as shown in FIG. 35.

The description begins with an explanation of a user interface provided by the behavioral object selection window 3600 used by the behavioral object selection unit 3508.

Figure 36:
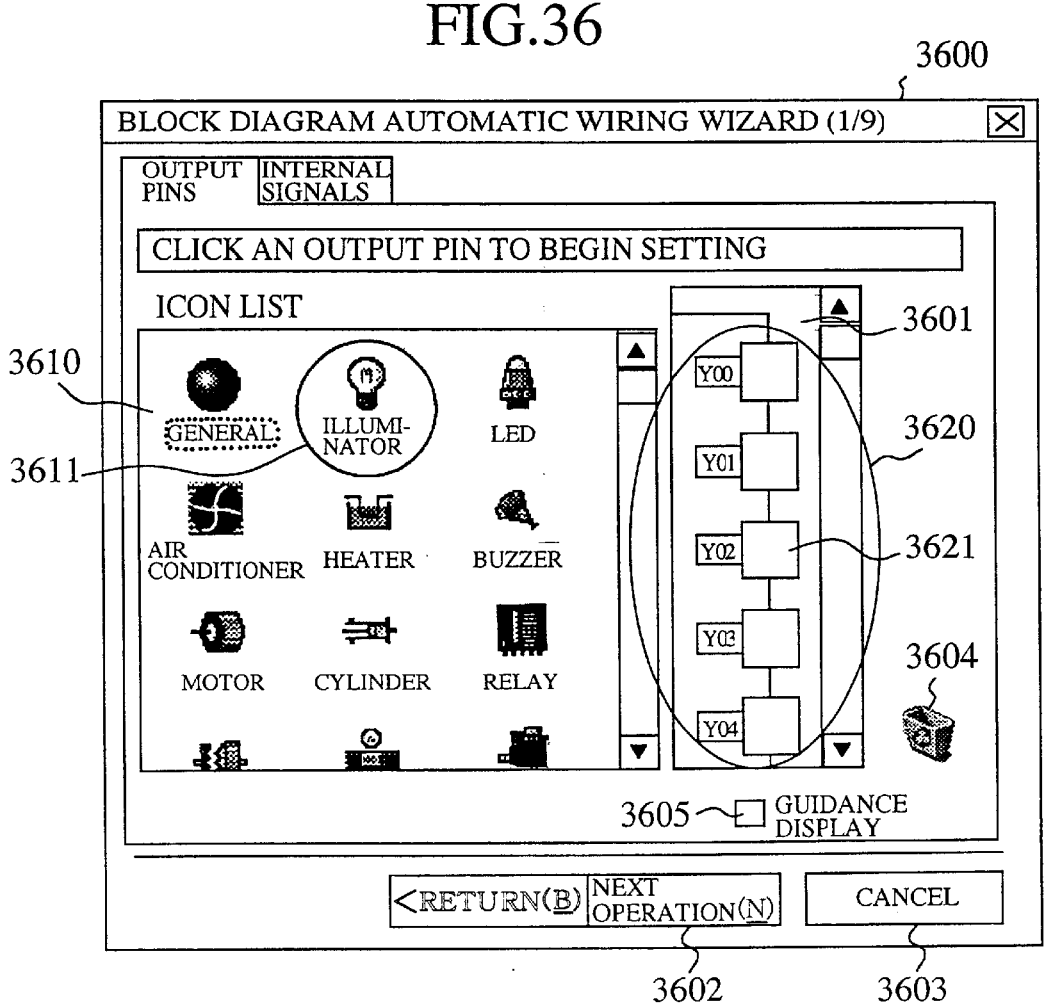
FIG. 36 is an explanatory diagram showing a behavioral object selection window.

FIG. 36 is an explanatory diagram showing an example of the behavioral object selection window 3600. It is an object of work carried out by the user on the behavioral object selection window 3600 to select and relocate a load member of the configuration of an application system being constructed, a member, the behavior of which is to be defined in the work. A driving member defining a behavior of a load connected thereto is a member playing the role of the output part of the input/output of the application system being constructed. The behavioral object selection window 3600 shown in FIG. 36 is a window used for selecting and locating a member playing the role of the output. In the figure, reference numeral 3610 denotes a member selection window, an area for displaying graphical objects (or icons) representing members that can each be selected by the user as an output.

A name 'icon list' is displayed inside the window shown in FIG. 36. Reference numeral 3601 is a layout diagram window displaying a layout diagram showing a layout of driving members to be selected by the user. The layout diagram window 3601 includes a layout area 3620. An icon selected from those displayed on the member selection window 3610 is then relocated at a position in the layout area 3620. The layout area 3620 corresponds to output pins of an actual programmable logic controller (PLC). The user is said to carry out work to virtually connect a driving member controlled by a program to a programmable logic controller (PLC).

Icons marked with Y00, Y01, Y02, - - - , YNM in the layout area 3620 are each referred to hereafter as an output pin icon.

When the user clicks a 'next operation (N)' button 3602, the programming process continues to a next operation environment. When the user clicks the 'next operation (N)' button 3602 of the window shown in FIG. 36, for example, the programming process continues to processing by the behavioral characteristic selection unit 3509. If a 'cancel' button 3603 is clicked, on the other hand, the programming is ended.

When it is desired to delete an icon, the user can delete the icon by carrying out a drag and drop operation on the icon to a garbage can icon 3604. For example, one of the output pin icons not connected to a load member can be deleted from the layout area 3620 on the layout diagram window 3601 shown in FIG. 36.

When the user clicks a 'guidance display' check box 3605, a window showing how to operate the window presently displayed is displayed. The functions of these buttons apply to all windows explained in the following description.

Operations carried out by the user are explained as follows.

To begin with, assume that one of the icons each representing a driving member defining a behavior of a load connected thereto is clicked to be selected from those displayed in the layout area 3620. For example, an output pin icon representing an output pin Y00 of an actual programmable logic controller (PLC) is selected. Then, a graphical object representing a load member is selected by carrying out a click operation. The clicked load member is connected to the selected output pin Y00 and the behavior of the load member is thus defined by the output pin Y00. These 2 operations cause an icon 3611 representing an illuminator, the load member, to be displayed at the position of the output in icon Y00. Thus, the output pin Y00 of the programmable logic controller (PLC) is said to be virtually connected to the illuminator, outputting a signal for controlling the illuminator to the illuminator. The 2 operations can also be carried out in the reversed order to give the same result. That is to say, even if the output pin icon Y00 is clicked after the icon 3611 representing the illuminator has been clicked, the same result will be obtained.

An output pin icon representing the other output pin Y01 or Y02 can be virtually connected to an icon representing a load member, the behavior of which is to be defined. In the following explanation of the embodiment, basically, programming is done for one graphical object representing a driving member defining a behavior of a load connected thereto. Thus, at the time the 'next operation (N)' button 3602 is clicked, an icon connected to a selected output pin icon is the object of programming. When this programming is completed, another icon can be programmed.

Load members displayed on the member selection window 3610 physically exist. Examples of load members that can be used in programming of a programmable logic controller (PLC) are a motor, a relay, an illuminator and a computer.

On the behavioral object selection window 3600, there exist 2 tags, namely, an 'output pin' tag and an 'internal signal' tag.

Figure 37:
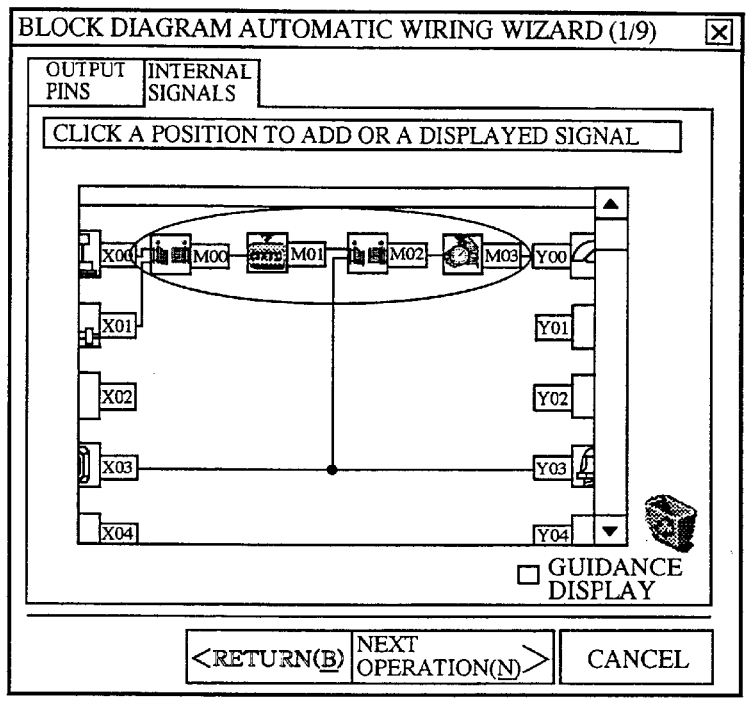
FIG. 37 is an explanatory diagram for a case in which an internal signal tag of a behavioral object selection means has been selected.

The 'output pin' tag represents output pins of the programmable logic controller (PLC) explained before whereas the 'internal signal' tag represents signals between input and output pins of the programmable logic controller (PLC). The signals between input and output pins are marked with notations M00, M01, M02 and M03 and enclosed in an ellipse as shown in FIG. 37. In the hardware of the programmable logic controller (PLC), input and output signals can be identified but internal signals exist inside the hardware and drive an output signal according to a program. Like an output signal, internal signals are each an object of programming to define the behavior of a load connected to the output pin. Since the programming method of internal signals is the same as an output signal, there is no need to explain it again.

Next, processing carried out by the behavioral object selection unit 3508 is explained.

Figure 39:
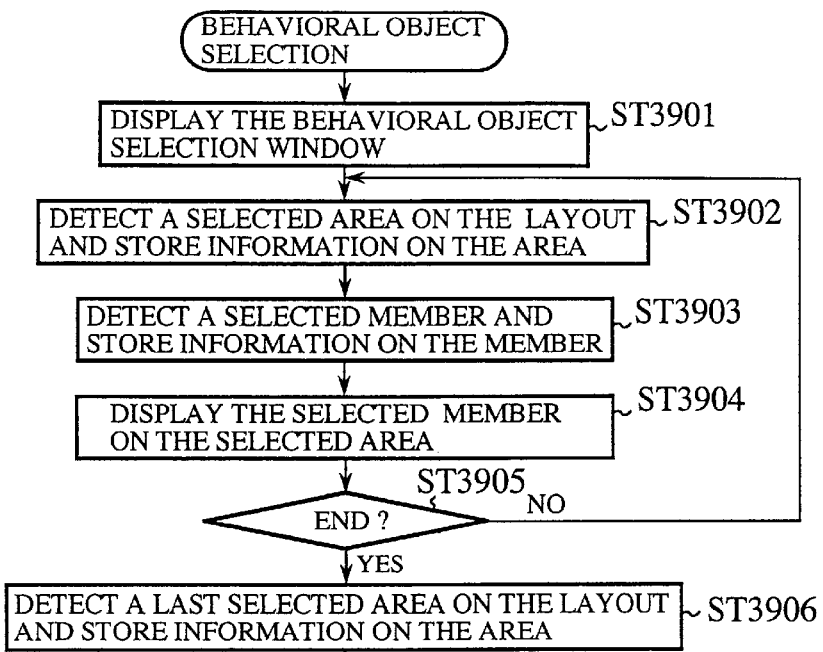
FIG. 39 is an explanatory diagram showing a behavioral characteristic selection window.

FIG. 39 is a flowchart showing typical operations carried out by the behavioral object selection unit 3508. As shown in the figure, the flowchart begins with a step ST3901 at which the behavioral object selection window 3600 is displayed on the display apparatus 1. The flow of the processing then goes on to a step ST3902 at which the fact that the user selects for example an output pin icon 3621 from the layout area 3620 by clicking the mouse 21 is detected and the selected output pin icon 3621 is stored in the storage apparatus 4. Then, the flow of the processing proceeds to a step ST3903 at which an icon representing a load member selected by the user by clicking the mouse 21 from the member selection window 3610 as a member to be connected the selected output pin is stored in the storage apparatus 4. An example of an icon representing such a member is an illuminator icon 3611 shown in FIG. 36. The flow of the processing then continues to a step ST3904 at which the illuminator icon 3611 is relocated to a position of the output pin icon 3621. Then, the flow of the processing goes on to a step ST3905 to form a judgment as to whether or not the 'next operation (N)' button 3602 or the 'cancel' button 3603 has been clicked. If neither of the buttons has been clicked, the flow of the processing returns to the step ST3902 to wait for an operation to be carried out by the user.

If the visual programming system recognizes that the 'next operation (N)' button 3602 has been clicked, the flow of the processing proceeds to a step ST3906 at which a last selected output pin icon is stored in the RAM unit 42 employed in the visual programming system shown in FIG. 1.

Next, processing carried out by the behavioral characteristic selection unit 3509 employed in the visual programming system implemented by the seventh embodiment as shown in FIG. 35 is explained.

The explanation begins with a description of a user interface of the behavioral characteristic selection unit 3509.

Figure 38:
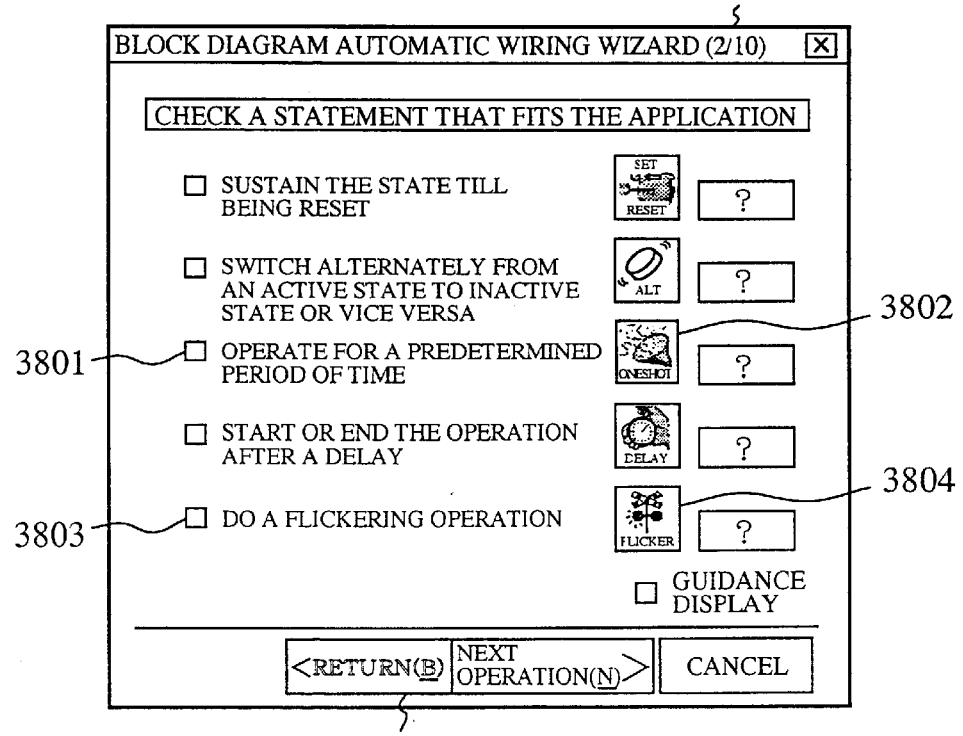
FIG. 38 is a flowchart showing typical operations carried out by a behavioral object selection unit shown in FIG. 35.

FIG. 38 is an explanatory diagram showing an example of the behavioral characteristic selection window 3800 serving as an interface of the behavioral characteristic selection unit 3509.

The work carried out by the user by using the behavioral characteristic selection window 3800 is to select a behavior of a driving icon defining a behavior of a load connected thereto. This icon was selected earlier by using the behavioral object selection window 3600. To put it concretely, the user selects a behavior to be defined for a load icon connected to an output pin. This icon is also referred to hereafter as an output.

Each icon shown in FIG. 38 is a graphical object representing a behavioral characteristic. For example, an icon 3804 is an icon representing a flickering (blinking) characteristic. In order to select a desired behavior to be defined for an output, the user clicks a check box on the left side of a literal statement describing the characteristic of the behavior in the example shown in FIG. 38 by using the mouse 21.

By using the behavioral characteristic selection window 3800, a plurality of characteristics may be selected. Results of the selection can be verified by assuring that check marks are displayed on check boxes.

Behavioral characteristics displayed on the behavioral characteristic selection window 3800 shown in FIG. 38 are no more than examples. It is needless to say that behavioral characteristics other than those shown in the figure can be programmed by the visual programming system provided by the present invention.

Buttons each marked with the question mark '?' are buttons which are clicked to display windows explaining the respective behavioral characteristics. It should be noted that the windows themselves are shown in none of the figures. Any of these buttons can be clicked when the user does not understand the meaning of a displayed icon or the meaning of the displayed explanatory literal description of a behavioral characteristic. When any of these buttons is clicked, the icon and the literal explanatory description associated with the button are further explained in terms of sentences, animation, moving pictures, photographs, sound or the like displayed on a window in a way which is easy to understand intuitively.

When the user desires to cancel the operation to select a behavioral characteristic and return to the behavioral object selection window 3600, the user clicks the 'return (B)' button 3805. The function of the 'return (B)' button applies to all windows cited in the description. That is to say, when the 'return (B)' button on a window is clicked, the processing returns to an operation environment immediately preceding the window.

Next, processing carried out by the behavioral characteristic selection unit 3509 employed in the visual programming system provided by the seventh embodiment as shown in FIG. 35 is explained.

Figure 40:
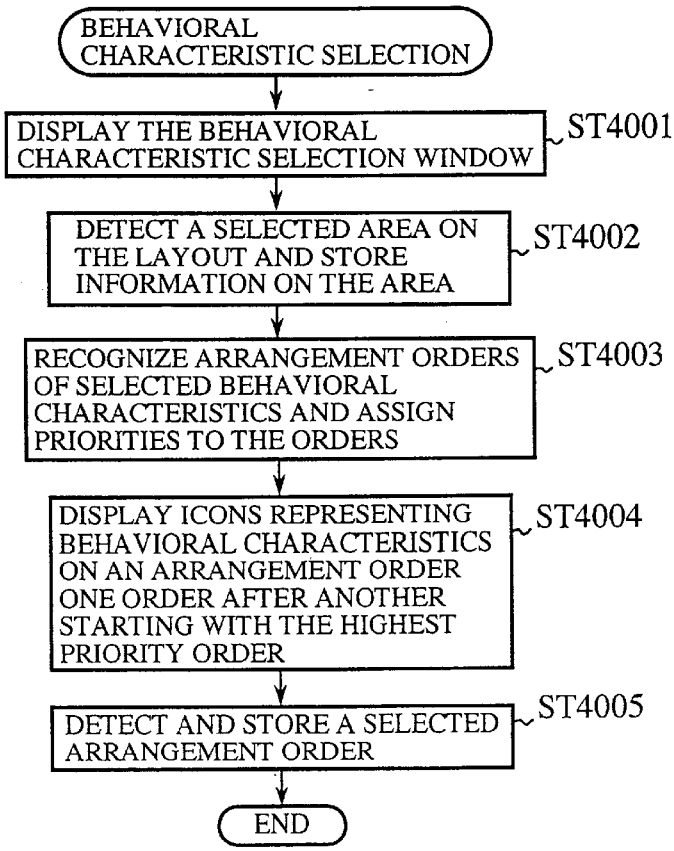
FIG. 40 is a flowchart showing typical operations carried out by a behavioral characteristic selection unit shown in FIG. 35.

FIG. 40 is a flowchart showing typical operations carried out by a behavioral characteristic selection unit 3509. As shown in the figure, the flowchart begins with a step ST4001 at which the behavioral characteristic selection window 3800 is displayed on the display apparatus 1. The flow of the processing then goes on to a step ST4002 at which a behavioral characteristic selected by the user is stored. For example, the user selects a one-shot behavioral characteristic described literally by a phrase 3801 saying: "A behavior for a predetermined period of time" and a flickering behavioral characteristic described literally by a phrase 3803 saying: "A blinking behavior" which are displayed on the behavioral characteristic selection window 3800 shown in FIG. 38. In this case, these pieces of information are stored typically in the RAM unit 42 shown in FIG. 1 at the step ST4002. Then, the flow of the processing proceeds to a step ST4003. When the user selects a plurality of behavioral characteristics at the step ST4001, possible order of arrangements of the selected behavioral characteristics are recognized by using a rule base, an algorithm or the like stored in the storage apparatus 4 at the step ST4003. A priority is then assigned to each order of arrangement in case a plurality of such order of arrangements are obtained as results of the recognition. The flow of the processing then continues to a step ST4004 at which the results of the recognition are displayed on a preview window inside a behavioral condition setting window 4100 like one shown in FIG. 41. As shown in the figure, the behavioral condition setting window 4100 is different from the behavioral characteristic selection window 3800. Then, the flow of the processing continues to a step ST4005 at which an arrangement order selected by the user by using the preview window inside the behavioral condition setting window 4100 is stored typically in the storage apparatus 4.

Figure 41:
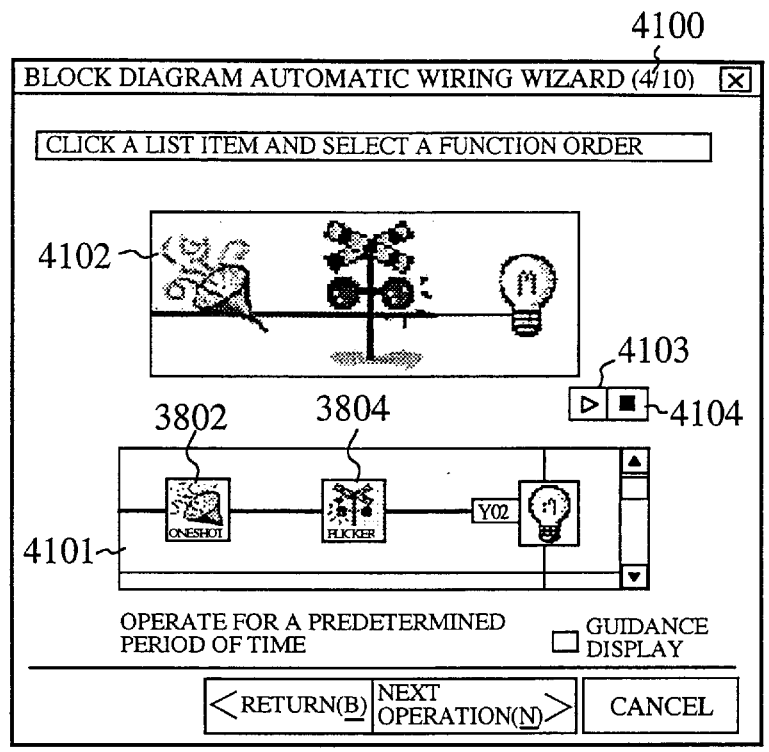
FIG. 41 is an explanatory diagram showing a preview window.

FIG. 41 is an explanatory diagram showing a typical preview window inside the behavioral condition setting window 4100. In the figure, reference numeral 4101 denotes a window displaying an order of arrangement of functions displayed at the step ST4004. To put it in detail, an icon 3802 representing the one-shot behavioral characteristic and an icon 3804 representing the flickering behavioral characteristic which are selected from the behavioral characteristic selection window 3800 shown in FIG. 38 are connected to each other by a line. It is obvious from FIG. 41 that the visual programming system judges an order of arrangement with the one-shot behavioral characteristic put first to be followed by the flickering behavioral characteristic to be optimum and recommends this order of arrangement to the user. This order of arrangement recommends operating hardware in which a flicker unit is driven by a one-shot signal rather than a one-shot device is driven by a signal output by a flicker unit. As described above, since the visual programming system determines an order of arrangement of behavioral characteristics selected by the user from the behavioral characteristic selection window 3800, it is not necessary for the user to determine the order of arrangement. As a result, the programming work load borne by the user can be reduced.

The one-shot behavior characteristic refers to an operation to output a signal for a fixed period of time. When it is desired to turn on an illuminator for only 10 seconds, for example, the one-shot behavior characteristic is selected. On the other hand, the flickering behavior characteristic refers to a blinking operation. When it is desired to put an illuminator in a blinking state, for example, the flickering behavior characteristic is selected. A lamp installed at a railway crossing can be given as an example of a device exhibiting this behavioral characteristic. With the order of arrangement of the one-shot behavioral characteristic and the flickering behavioral characteristic, an illuminator connected to the output pin Y02 shown on the window 4101 will flickers for a period of time of 10 seconds.

It is not until the time the 'next operation (N)' button is clicked that the order of arrangement shown in the window 4101 is determined as a final order of arrangement.

Reference numeral 4102 is a behavioral preview window displaying animation explaining an arrangement order of the functions shown on the window 4101. To be more specific, on the behavioral preview window 4102, there is displayed an example of animation for explaining an output of a combination of the one-shot and flicker behavioral characteristics. In FIG. 41, pictures of a cracker and a railway crossing represent the one-shot and flickering behavioral characteristics respectively. Reference numerals 4103 and 4104 are respectively start and stop switches of the animation displayed on the preview window 4102 in the behavioral condition setting window 4100.

If there are a plurality of possible orders of arrangement for behavioral characteristics selected by using the behavioral characteristic selection window 3800, the orders of arrangement can be displayed on the window 4101 sequentially one after another starting with the order of arrangement having the highest priority by operating typically a scroll bar. In addition, the user is capable of manually changing the arrangement order of behavioral characteristics currently displayed on the window 4101 by carrying out a double-clicking operation on the order of arrangement by using the mouse 21. It should be noted that the result of the double clicking operation is shown in none of the figures.

Next, the behavioral condition setting unit 3510 employed in the visual programming system implemented by the seventh embodiment as shown in FIG. 35 is explained. A function provided by the behavioral condition 3510 is to let an output selected by using the behavioral object selection window 3600 execute behavioral characteristics selected by using the behavioral characteristic selection window 3800 unconditionally, or conditionally depending on a result of a judgment formed on input signals coming from input pins relevant to the output which are selected by using the relevant object selection unit 3511. In the case of programming an unconditional behavior, the visual programming system creates a program that makes an output selected by using the behavioral object selection window 3600 always display a behavior exhibiting behavioral characteristics selected by using the behavioral characteristic selection window 3800.

In the case of programming a conditional behavior, on the other hand, the user does further setting work on the behavioral condition setting window 4100 shown in FIG. 41. In the example described above, the visual programming system creates a program that makes an illuminator connected to the output pin Y02 display a behavior exhibiting the one-shot and flickering behavioral characteristics. The condition for the illuminator to display the behavior with such characteristics is represented by a logic equation or a Boolean algebra equation which forms a judgment based on a combination of signals coming from input pins selected by using the relevant object selection unit 3511. The logic equation is a logic function of variables representing these input signals.

To explain the conditional behavior by using the above example, the output pin Y02 displays a behavior exhibiting the one-shot and flickering behavioral characteristics in dependence on the value of the logic function. In the explanation of the embodiment of the present invention, the condition for an output to display a behavior condition for the illuminator to display the behavior is represented by a logic equation. It should be noted, however, that the scope of the present invention is not limited to the embodiment. For example, the present invention can also be applied to a case in which behavioral rules to be described later are compared with the states of signals coming from input pins and, if any one of the behavioral rules matches the states, the output is driven to display a behavior.

First of all, a user interface provided by the behavioral condition setting unit 3510 is explained by using the behavior condition setting window 4100 used by the behavioral condition setting unit 3510.

Figure 42:
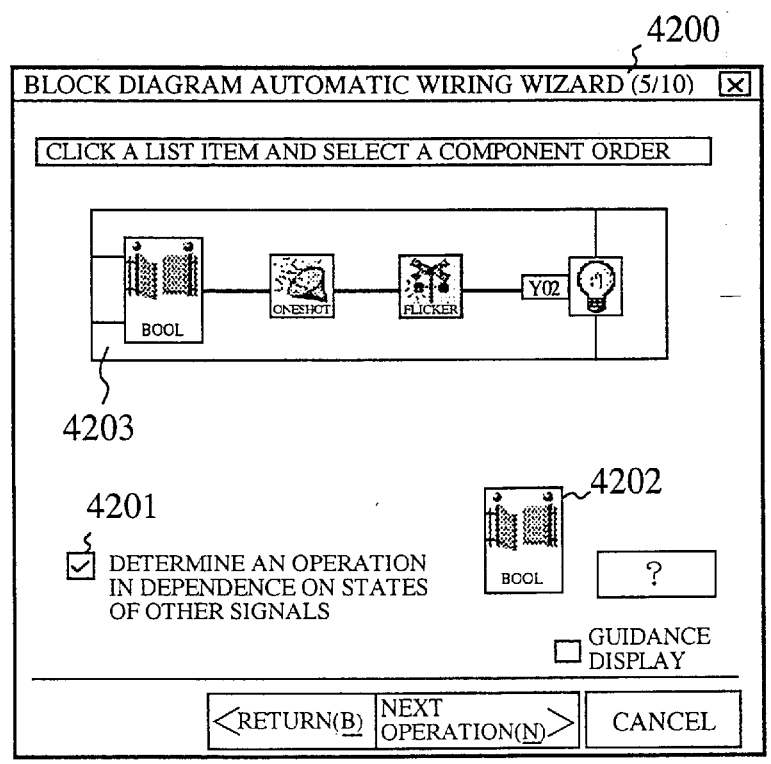
FIG. 42 is an explanatory diagram showing a behavioral condition setting window.

FIG. 42 is an explanatory diagram showing of a window 4200 showing an example of the behavioral condition setting window 4100. In the figure, reference numeral 4201 denotes a check box for setting a conditional behavior. By clicking this check box, the user is allowed to specify creation of a program for a conditional behavior.

On the window 4200 shown in FIG. 42, the check box 4201 is shown in a clicked state. Reference numeral 4202 is an icon representing a conditional behavior. Such an icon is referred to hereafter as a Boolean icon. When the check box 4201 is clicked, the Boolean icon 4202 is displayed inside a window 4203. The window 4203 shown in FIG. 42 is displayed with the Boolean icon 4202 appearing thereon. Before the check box 4201 was clicked to be put in a selected state, the Boolean icon 4202 was not displayed inside the window 4203. At that time, the same information as that displayed on the window 4101 beneath the preview window 4102 inside the behavioral characteristic selection window 4100 shown in FIG. 41 was displayed on the window 4203. On the window 4203 shown in FIG. 42, the Boolean icon 4202 is already displayed. If the check box 4201 in the selected state is clicked again, the Boolean icon 4202 will disappear from the window 4203, providing an unconditional behavior to the output.

Figure 43:
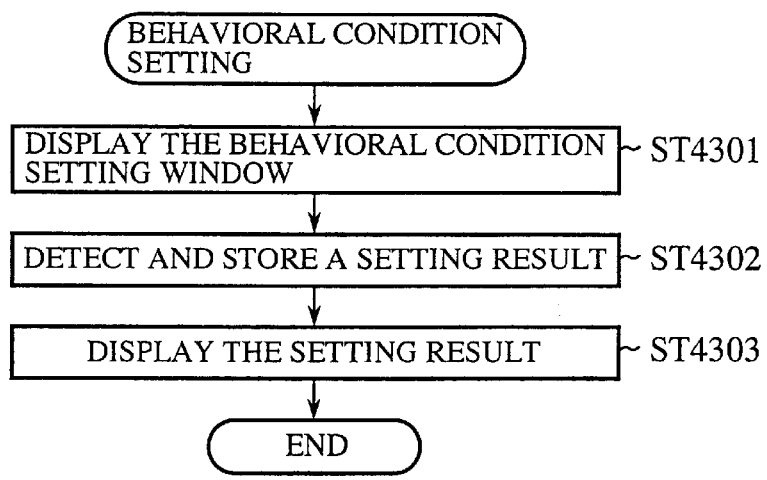
FIG. 43 is a flowchart showing typical operations carried out by a behavioral condition setting unit shown in FIG. 35.

FIG. 43 is a flowchart showing typical operations carried out by the behavioral condition setting unit 3510 employed in the visual programming system implemented by the seventh embodiment as shown in FIG. 35. As shown in the figure, the flowchart begins with a step ST4301 at which the behavioral condition setting window 4100 is displayed on the display apparatus 1. The flow of the processing then goes on to a step ST4302 at which results of selection made by the user by using the behavioral condition setting window 4100 are fetched and stored typically in the RAM unit 42 shown in FIG. 1. Then, the flow-of the processing proceeds to a step ST4303 at which a Boolean icon is displayed on a window 4203 of the behavioral condition setting window 4100 if the fetched results of detection indicate that the check box 4201 is selected.

Next, the relevant object selection unit 3511 employed in the visual programming system implemented by the seventh embodiment as shown in FIG. 35 is explained.

The explanation begins with a description of the relevant object selection window 4400 which serves as an interface of the relevant object selection unit 3511.

Figure 44:
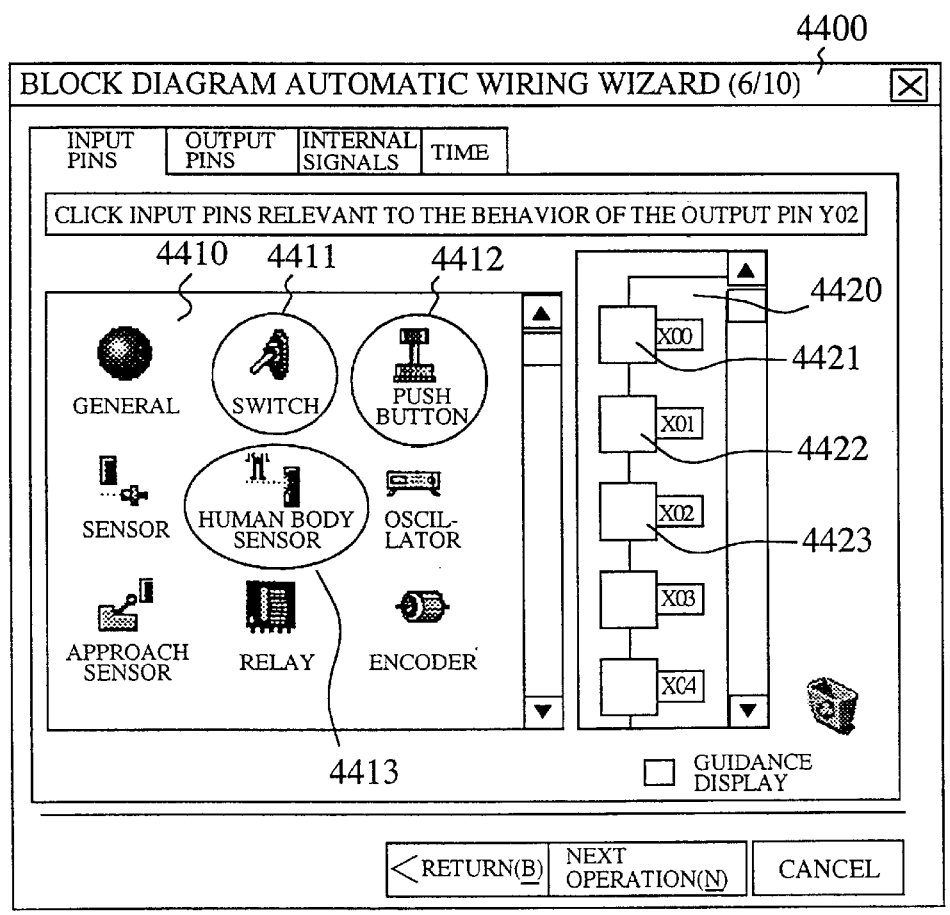
FIG. 44 is an explanatory diagram showing a relevant object selection window.

FIG. 44 is an explanatory diagram showing an example of the relevant object selection window 4400. As shown in the figure, the relevant object selection window 4400 has basically the same configuration as the behavioral object selection window 3600. The relevant object selection window 4400 is deliberately designed to have basically the same configuration as the behavioral object selection window 3600 in order to make user interfaces for selecting input and output members uniform. Work carried out by the user on the relevant object selection window 4400 is to select and relocate members serving as inputs for a member serving as an output of an application system being created. As described earlier, the member serving as an output is selected by using the behavioral object selection window 4400. In FIG. 44, reference numeral 4410 denotes a member selection window, an area for displaying graphical objects (or icons) representing members that can each be selected by the user as an input. Reference numeral 4420 is a layout diagram window for positioning a member selected by the user. On the layout diagram window 4420, there are displayed input pin icons each representing an input pin of an actual programmable logic controller (PLC). The input pin icons displayed on the layout diagram window 4420 are given names X00, X01, X02, X03, X04, etc.

An icon selected by the user from those displayed on the member selection window 4410 is relocated to a position of any of the input pin icons on the layout diagram area 4420. A selected icon is relocated at a position of any of the input pin icons on the layout diagram area 4420 as follows. First of all, an input pin icon, for example, the input pin icon 4421 representing the input pin X00, is clicked. Then, an icon displayed on the member selection window 4410 to represent a member to be connected to the input pin icon 4421, for example, an icon 4411 representing a switch is clicked. By doing so, the icon 4411 representing a switch is displayed at the location of the input pin icon 4421. In this operation, the user is said to virtually connect a member supplying a signal to the application system being created to the programmable logic controller (PLC).

A plurality of input pins can be selected. For example, in addition to the icon 4411 of a switch connected to the input pin icon 4421, an icon 4412 representing a push button and an icon 4413 representing a human body sensor can be connected to an input pin icon 4422 and an input pin icon 4423 respectively. Members represented by icons connected to input pin icons are inputs represented by variables of a logic function which serves as a behavioral condition for an output selected by using the behavioral object selection window 3600 shown in FIG. 36 to display a behavior, that is, an output, the behavior of which is defined.

Each member displayed inside the member selection window 4410 shown in FIG. 44 physically exists as a member used as an input in programming of a programmable logic controller (PLC). Examples of the members are a variety of sensors and switches to mention a few.

Figure 60:
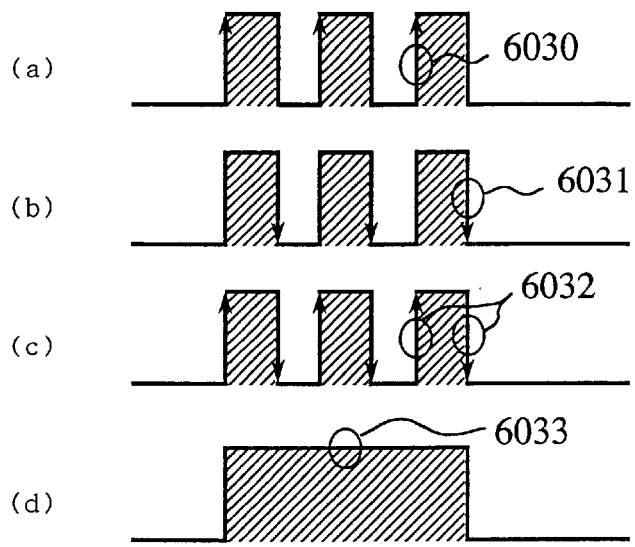
FIG. 60 is an explanatory diagram showing a characteristic set by a behavior detecting characteristic setting unit shown in FIG. 58.

The signal output by a member selected by using the relevant object selection member 3511 is typically a signal with a waveform showing ON/OFF states as shown in FIG. 60 (d) to be described later. With a switch selected as a member, when the switch is turned on, the member outputs a signal in an ON state. When the switch is turned off, on the other hand, the member outputs no signal, sustaining a continuous OFF state.

On the relevant object selection window 4400 shown in FIG. 44, an 'input pin' tag is selected. As examples of other tags, there are 'output pin', 'internal signal' and 'time' tags.

The 'output pin' tag is used, for example, to specify the output of the output pin icon Y00 as an input to the output pin icon Y02 when a program defining the behavior of the output pin icon Y02 is presently being created. A description of how the 'output pin' tag is operated is omitted.

Figure 45:
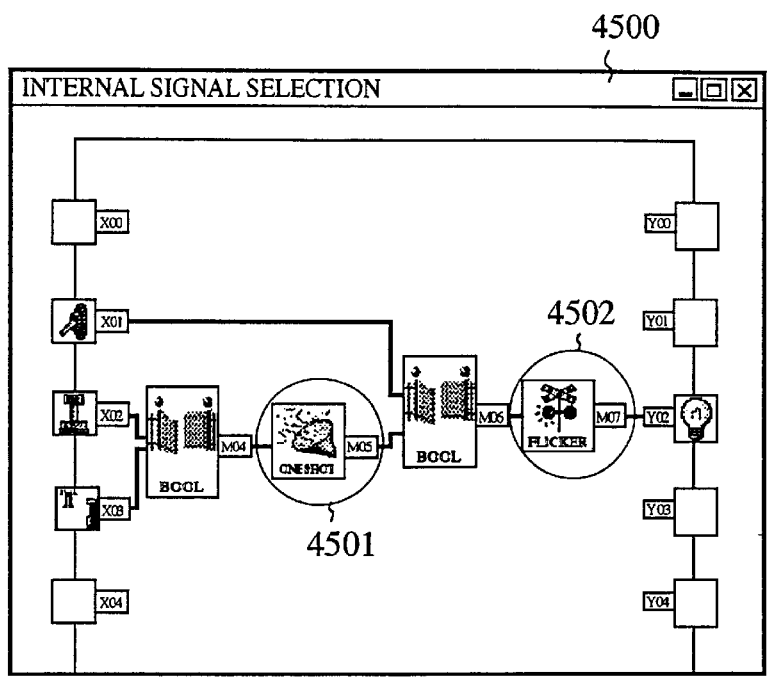
FIG. 45 is an explanatory diagram showing an internal signal selection window.

The 'internal signal' tag is used to specify the output of an internal signal as an input. FIG. 45 is an explanatory diagram showing a typical internal signal selection window 4500, a window for selecting an internal signal.

The internal signal selection window 4500 is displayed when the 'internal signal' tag on the relevant object selection window 4400 is selected. The user selects an internal signal on the internal signal selection window 4500 that the user desires to use as an input by carrying out a click operation.

Figure 46:
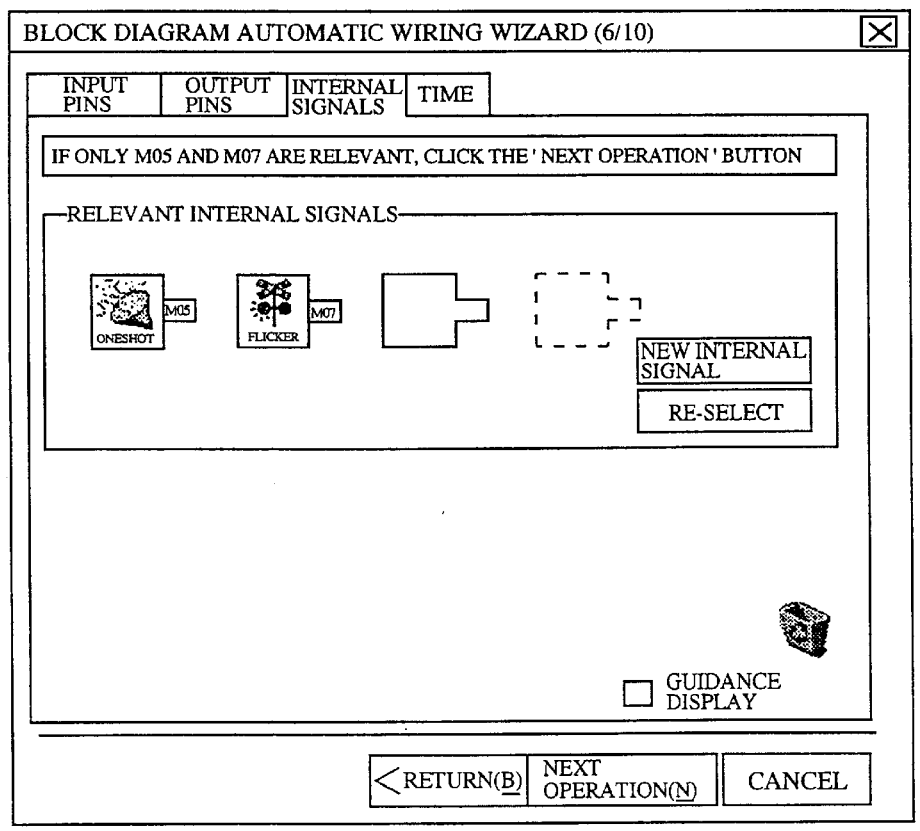
FIG. 46 is an explanatory diagram showing a window displaying internal signals selected by using the internal signal selection window.

FIG. 46 is an explanatory diagram showing a typical relevant object selection window 4400 which is displayed when the 'internal signal' tag on the relevant object selection window 4400 is clicked. Even though there is only one relevant object selection window 4400, what is displayed thereon varies depending on which tag is selected as shown in FIG. 46.

The example shown in FIG. 46 indicates that the user is allowed to select up to 4 internal signals. In the example, internal signals 4501 and 4502 have been selected from those displayed on the internal signal selection window 4500 shown in FIG. 45.

By using the internal signal selection window 4500, the internal signals 4501 and 4502 can be selected one after another or a plurality of internal signals can also be selected at one time. When it is desired to select a plurality of internal signals such as the internal signals 4501 and 4502 at one time, typically, with the 'shift' key of the keyboard 22 put in a pressed state, the internal signals 4501 and 4502 are clicked. By doing so, the 2 internal signals are selected at the same time. As a result, the selected internal signals are laid out on the relevant object selection window 4400 as shown in FIG. 46. The description of the 'time' tag is omitted.

Next, processing carried out by the relevant object selection unit 3511 employed in the visual programming system implemented by the seventh embodiment as shown in FIG. 35 is explained.

Figure 47:
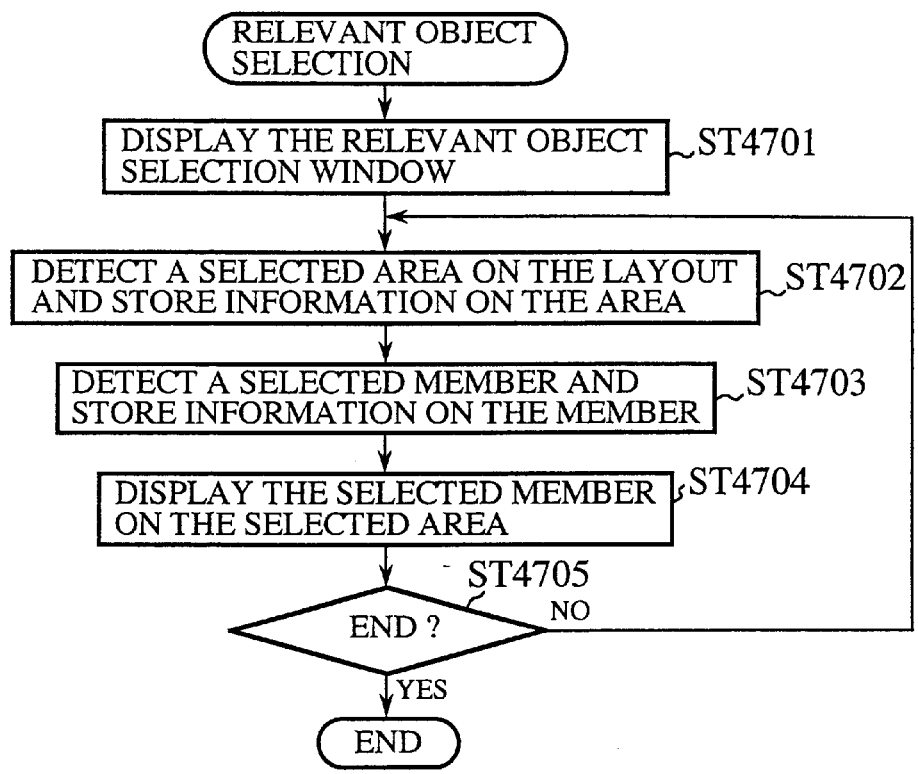
FIG. 47 is a flowchart showing typical operations carried out by a relevant object selection unit shown in FIG. 35.

FIG. 47 is a flowchart showing typical operations carried out by the relevant object selection unit 3511. In the following description, only operations to select input pins, the most general operations of the relevant object selection unit 3511, are explained.

As shown in FIG. 47, the flowchart begins with a step ST4701 at which the relevant object selection window 4400 is displayed on the display apparatus 1. The flow of the processing then goes on to a step ST4702 at which an operation carried out by the user to select one of input pin icons displayed on the layout diagram window 4420 by a clicking operation using the mouse 21 is detected and information on the selected input pin icon is stored typically in the RAM unit 42 shown in FIG. 1. Then, the flow of the processing proceeds to a step ST4703 to store information on an icon representing a member selected by the user from those displayed on the member selection window 4410 by a clicking operation using the mouse 21 to be connected to the selected input pin icon. The flow of the processing then continues to a step ST4704 at which the icon representing the selected member is displayed on the selected input pin icon. Then, the flow goes on to a step ST4705 to form a judgment as to whether or not the processing carried out by the relevant object selection unit 3511 has been completed. If the processing carried out by the relevant object selection unit 3511 has not been completed yet, the flow of the processing returns to the step ST4702.

The processing carried out by the relevant object selection unit 3511 is judged to be completed when selection of the 'next operation (N)', 'return (B)' or 'cancel' button on the relevant object selection window 4400 is detected.

A member can also be selected first from those displayed on the member selection window 4410 at the step ST4702 before an input pin icon displayed on the layout diagram window 4420 is selected at the step ST4703.

All icons representing behavioral characteristics and behavioral conditions have default parameters stored internally so that a program created to operate in accordance with default parameters can also be checked as well.

As described above, according to the seventh embodiment, the behavioral object selection unit 3508 is used for selecting a output graphical object defining a behavior of a load connected thereto, the behavioral characteristic selection unit 3509 is used for selecting a behavior of the output graphical object, the behavioral condition setting unit 3510 is used for setting conditions for the behavior of the output graphical object and the relevant object selection unit 3511 is used for selecting an input graphical object relevant to the behavior of the graphical object. As a result, there is exhibited an effect that a user who has a lack of professional knowledge of programming is capable of visually developing a program with ease by merely clicking graphical objects displayed on a screen of the graphical editor using a device such as a mouse without the need to master a programming language which is difficult to understand. There is also exhibited a result that, in a domain in which only specialists doing work such as PLC (programmable logic controller) programming particularly requiring professional knowledge of a programming language and sequence control are capable of creating programs, a user getting no professional training is also capable of creating such programs with ease.

EIGHTH EMBODIMENT

Figure 48:
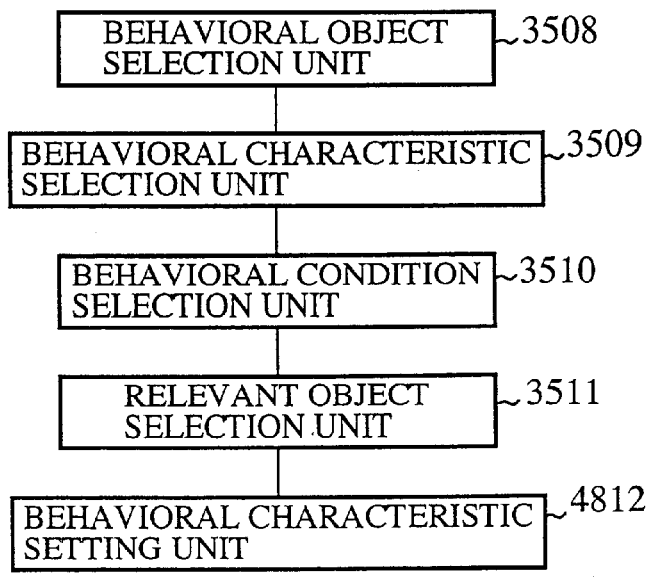
FIG. 48 is a block diagram showing a system adopting the programming method as implemented by a second embodiment of the present invention.

FIG. 48 is a block diagram showing a system adopting the visual programming method as implemented by an eighth embodiment of the present invention. In the figure, reference numeral 4812 denotes a behavioral characteristic setting unit. The visual programming system implemented by the eighth embodiment is a system provided with user interface having a function allowing the user to change a parameter of a behavioral characteristic selected by using the behavioral characteristic selection unit 3509. It should be noted that other configuration elements which are identical with those employed in the seventh embodiment are denoted by the same reference numerals as the latter. Their description is thus omitted to avoid duplication of explanation.

The visual programming system implemented by the eighth embodiment is stored typically in the hard disc drive (HDD) 43 shown in FIG. 1 and, when necessary, loaded into the RAM unit 42 to be executed by the CPU 7 in conjunction with the display apparatus 1, the input apparatus 2 and other components.

The behavioral characteristic setting unit 4812 has a behavioral characteristic setting window 4900 to be described later in the user interface thereof. The visual programming system implemented by the eighth embodiment is constructed by adding the behavioral characteristic setting unit 4812 to the configuration of the visual programming system provided by the seventh embodiment so that the user is capable of setting detailed parameters of a behavioral characteristic selected by using the behavioral characteristic selection unit 3509 by itself.

The following is a description of the behavioral characteristic setting unit 4812 employed in the visual programming system implemented by the eighth embodiment shown in FIG. 48.

The description begins with an explanation of the user interface of the parameter setting unit 4812.

Figure 49:
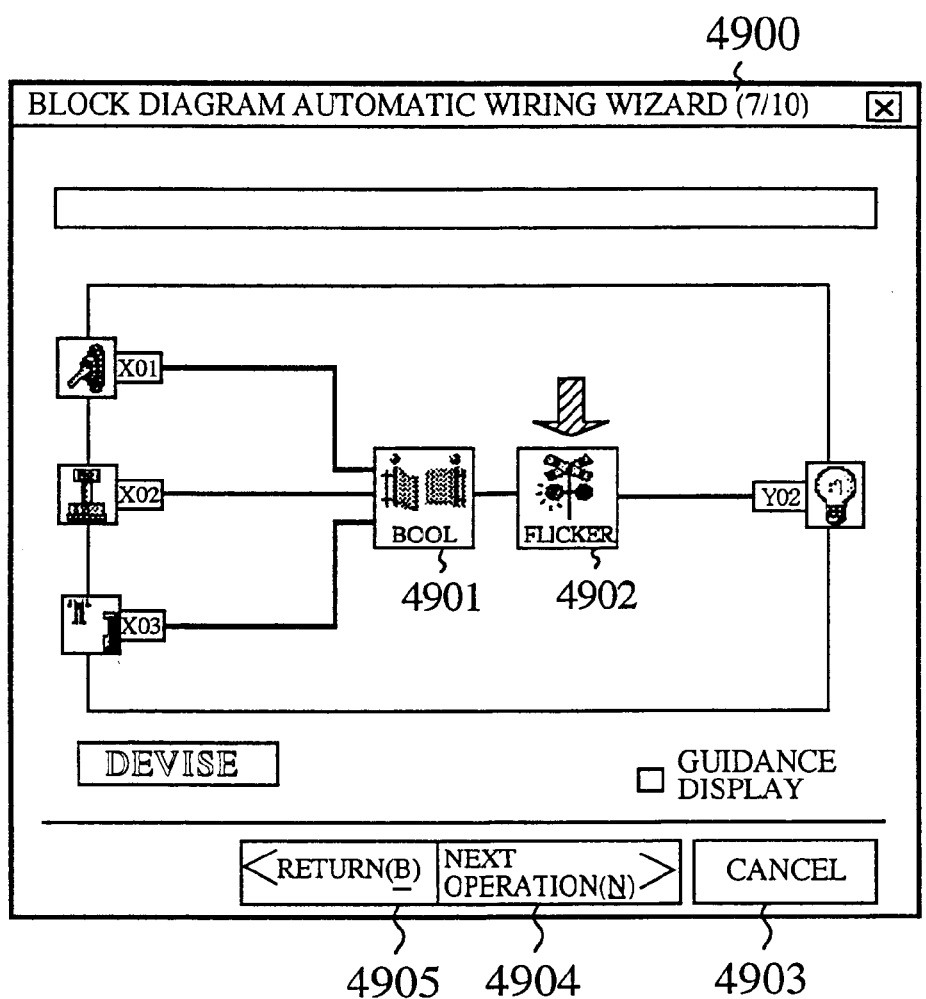
FIG. 49 is an explanatory diagram showing a behavioral characteristic setting window.

FIG. 49 is an explanatory diagram showing a behavioral characteristic setting window 4900 serving as the user interface of the parameter setting unit 4812.

An icon selected by using the behavioral object selection window 3600 shown in FIG. 36, an icon selected by using the behavioral characteristic selection window 3800 shown in FIG. 38, an icon representing a result set by using the behavioral condition setting window 4200 shown in FIG. 42 and icons selected by using the behavioral object selection window 4400 shown in FIG. 44 are connected by lines and displayed on the behavioral characteristic setting window 4900.

To put it in detail, on the behavioral characteristic selection window 4900 shown in FIG. 49, icons and signals are laid out so that an icon representing an output and icons representing inputs are displayed on the right and left sides respectively whereas an icon representing an internal signal is displayed between the output and the inputs. On the right side of FIG. 49, on the other hand, an icon representing an illuminator is displayed on an icon of the output pin Y02 selected by using the behavioral object selection window 3600. On the left side of FIG. 49, an icon representing a switch, an icon representing a push button and an icon of a human body sensor are respectively displayed on icons of the input pin X01, the input pin X02 and the input pin X03 which are selected by using the behavioral object selection window 3600. Finally, an icon representing a flicker selected by using the behavioral characteristic selection window 3800 and an icon representing a behavioral condition set by using the behavioral condition setting window 4100 are displayed between the inputs and the output.

An icon on the behavioral characteristic setting window 4900 shown in FIG. 49 that allows a parameter thereof to be set by using the behavioral characteristic setting unit 4812 is an icon other than those connected to the input and output pins, that is, an icon representing an internal signal. In the case of the example shown in FIG. 49, icons 4901 and 4902 are icons that allow parameters thereof to be set.

While the fact that parameters of input and output pins can be set is not explicitly revealed in the description of the eighth embodiment of the present invention, it is needless to say that such parameters can also be set by the visual programming method provided by the present invention.

The behavioral characteristic setting unit 4812 detects an icon with its parameter set at a default value among icons allowing parameters thereof to be set, informing the user of such a default parameter icon. In the technique for informing the user of such an icon, an arrow icon like one shown in FIG. 49 is typically used. In the figure, the user is notified that the parameter of the icon 4902 representing a flicker is set at its default value as it is. Parameters of all icons can be set in the order in which the visual programming system informs the user of the icons. However, the user does not have to set parameters in accordance with the order set by the visual programming system. When the user double-clicks an icon displayed on the behavioral characteristic setting window 4900, a parameter setting window for the icon is displayed and can be used for setting a parameter of the icon.

In the example shown in FIG. 49, even though the visual programming system informs the user of the icon 4902, the user is allowed to set parameters starting with the icon 4901 prior to the icon 4902 without causing a problem.

Next, processing carried out by the behavioral characteristic setting unit 4812 employed in the visual programming system implemented by the eighth embodiment as shown in FIG. 48 is explained.

Figure 50:
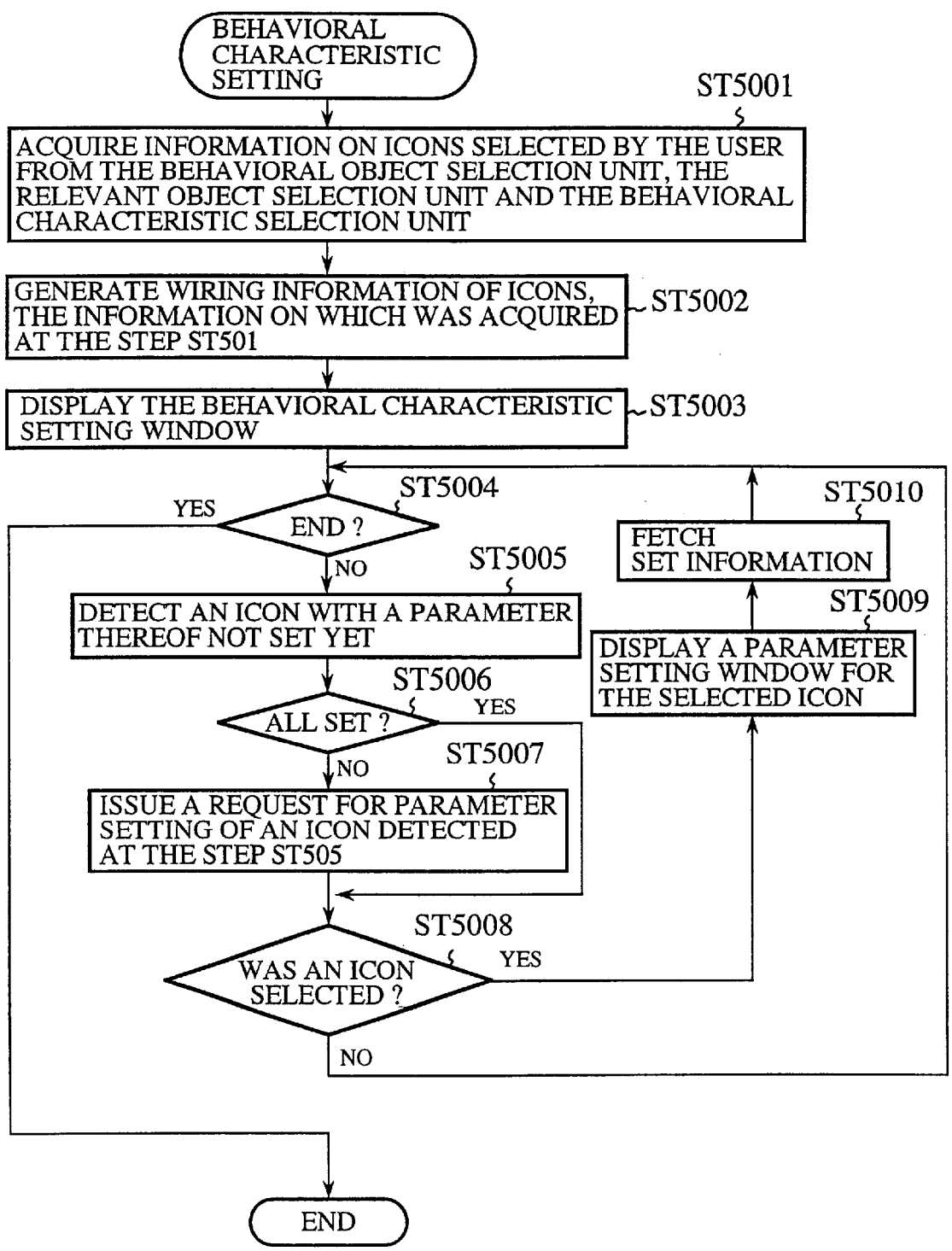
FIG. 50 is a flowchart showing typical operations carried out by a behavioral characteristic setting unit shown in FIG. 48.

FIG. 50 is a flowchart showing typical operations carried out by the behavioral characteristic setting unit 4812. As shown in the figure, the flowchart begins with a step ST5001 at which the behavioral object selection unit 3508, the behavioral characteristic selection unit 3509, the behavioral condition setting unit 3510 and the relevant object selection unit 3511 receive information on icons selected by the user.

The flow of the processing then goes on to a step ST5002 at which information on line connection for displaying the icons in a form like a function block diagram (FBD) is generated from the received information on the icons. Information on line connection includes coordinate positions of icons and lines connecting the icons on the behavioral characteristic setting window 4900. As a technique of generating information on line connection, the prior art is adopted.

Then, the flow of the processing proceeds to a step ST5003 at which a behavioral characteristic setting window 4900 based on the information on line connection generated at the step ST5002 is displayed. Icons are connected to each other and displayed on the behavioral characteristic setting window 4900 like the one shown in FIG. 49.

The flow the processing then continues to a step ST5004 to form a judgment as to whether or not the processing carried out by the behavioral characteristic setting unit 4812 has been completed. The processing is judged to be completed when the user clicks a 'return (B)' button 4905, a 'next operation (N)' button 4904 or a 'cancel' button 4903.

If the processing has not been completed yet, the flow of the processing goes on to a step ST5005 at which an icon with a parameter thereof not set yet is identified. Then, the flow of the processing continues to a step ST5006 to form a judgment as to whether or not a result of processing carried out at the step ST5005 indicates that parameters of all icons have been set. If parameters of all icons have been set, the flow of the processing goes on to a step ST5008. If the outcome of the judgment formed at the step ST5006 indicates that there is an icon, a parameter of which has not been set, on the other hand, the flow of the processing proceeds to a step ST4007 at which an arrow like one shown in FIG. 49 is displayed above the icon to notify the user that the parameter of the icon pointed to by the arrow has not been set yet. If there are a plurality of icons, parameters of which have not been set yet, the user is informed of typically an icon detected first. At the step ST5008, the behavioral characteristic setting unit 4812 forms a judgment as to whether or not an icon has been reported to the user or selected by the user through a double click operation at the step ST5007. If the outcome of the judgment formed at the step ST5008 indicates that such an icon exists, the flow of the processing continues to a step ST5009. Otherwise, the flow of the processing returns to the step ST5004 to enter an idle state.

When the flow of the processing goes on from the step ST5008 to the step ST5009, at the step ST5009, a parameter setting window 5110 for a selected icon like one shown in FIG. 51 is displayed. The flow of the processing then proceeds to a step ST5010 at which information set on the parameter setting window 5110 is fetched and stored in the storage apparatus 4 shown in FIG. 1.

If the processing carried out by the behavioral characteristic setting unit 4812 is finished, leaving an icon with a parameter thereof not set, the parameter of the icon remains set at its default value as it is. It is needless to say that the user is capable of checking if there is still a need for setting of such an icon by returning to the behavioral characteristic setting window 4900 shown in FIG. 49.

FIG. 51 is an explanatory diagram showing a typical parameter setting window 5110 displayed at the step ST5009. The parameter setting window 5110 is used for setting parameters of the flicker. The description of operations carried out on the parameter setting window 5110 is omitted.

As described above, according to the eighth embodiment, the behavioral characteristic setting unit 4812 allows the user to set detailed parameters of a behavioral characteristic selected by using the behavioral characteristic selection unit 3509. As a result, there is exhibited an effect that the user is capable of changing a value set for a parameter of a behavioral characteristic by using the behavioral characteristic selection unit 3509 and there is therefore exhibited an effect that the work of creating a program can be carried out with ease and with a high degree of efficiency.

NINTH EMBODIMENT

FIG. 52 is a block diagram showing a system adopting the visual programming method as implemented by the ninth embodiment of the present invention. In the figure, reference numeral 5213 denotes a relevant object devising unit having a function of characterizing a signal of a member selected as an input of an application system being created by using the relevant object selection unit 3511, that is, an input supplying a signal to the application system.

In the description of the visual programming methods provided by seventh and eighth embodiments and the systems adopting the methods, an input member outputs only an ON/OFF signal. In the case of the ninth embodiment, on the other hand, a relevant object devising unit 5213 added to the visual programming system allows the user to devise a signal output by an input member, giving rise to an effect that the user is capable of creating a complex program in a simple and easy way.

While no further explanation is elaborated upon, it is needless to say that the function of the relevant object devising unit 5213 is applicable to, for example, an internal signal. It should be noted that, since the behavioral object selection unit 3508, the behavioral characteristic selection unit 3509, the behavioral condition setting unit 3510, the relevant object selection unit 3511 and the behavioral characteristic setting unit 4812 shown in the figure are identical with those employed in the visual programming system implemented by the eighth embodiment as shown in FIG. 48, they are denoted by the same reference numerals as the latter and their description is not repeated.

The visual programming system implemented by the ninth embodiment is stored typically in the hard disc drive (HDD) 43 shown in FIG. 1 and, when necessary, loaded into the RAM unit 42 to be executed by the CPU 7 in conjunction with the display apparatus 1, the input apparatus 2 and other components.

Next, processing carried out by the relevant object devising unit 5213 employed in the visual programming system implemented by the ninth embodiment as shown in FIG. 52 is explained.

The explanation begins with a description of a user interface of the relevant object devising unit 5213.

The function of the relevant object devising unit 5213 is activated from the behavioral characteristic setting window 4900. The user selects one input or a plurality of inputs to be characterized. An input is selected typically by carrying out a click operation using the mouse 21. If a plurality of inputs are selected, typically, a 'devise' button is displayed. If the 'devise' button is selected, a programming box is displayed. If the programming box is double-clicked, the behavioral characteristic selection unit 3509 is activated.

Figure 53:
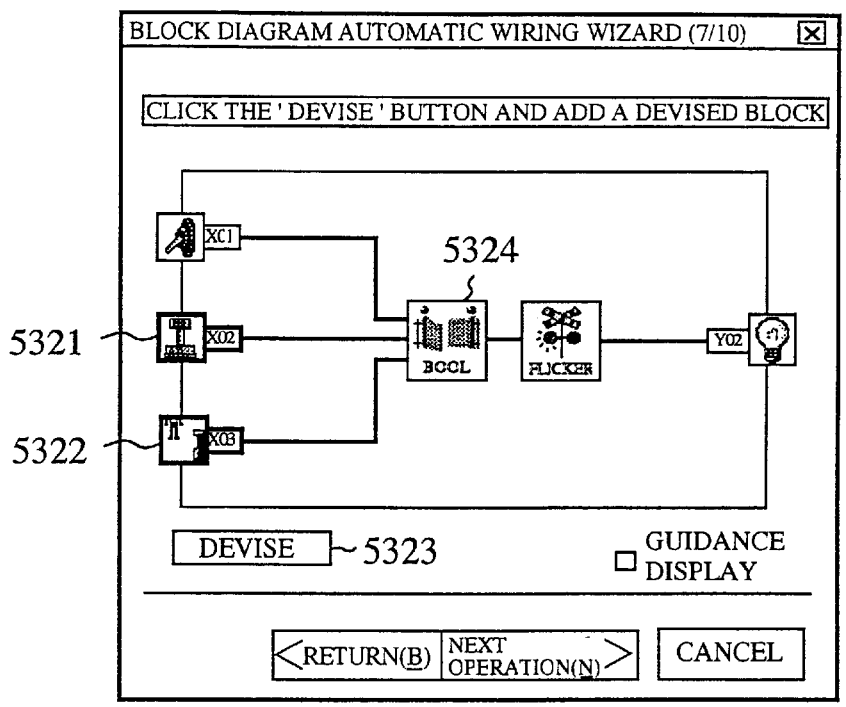
FIG. 53 is an explanatory diagram showing a typical user interface of a relevant object devising unit shown in FIG. 52.
Figure 54:
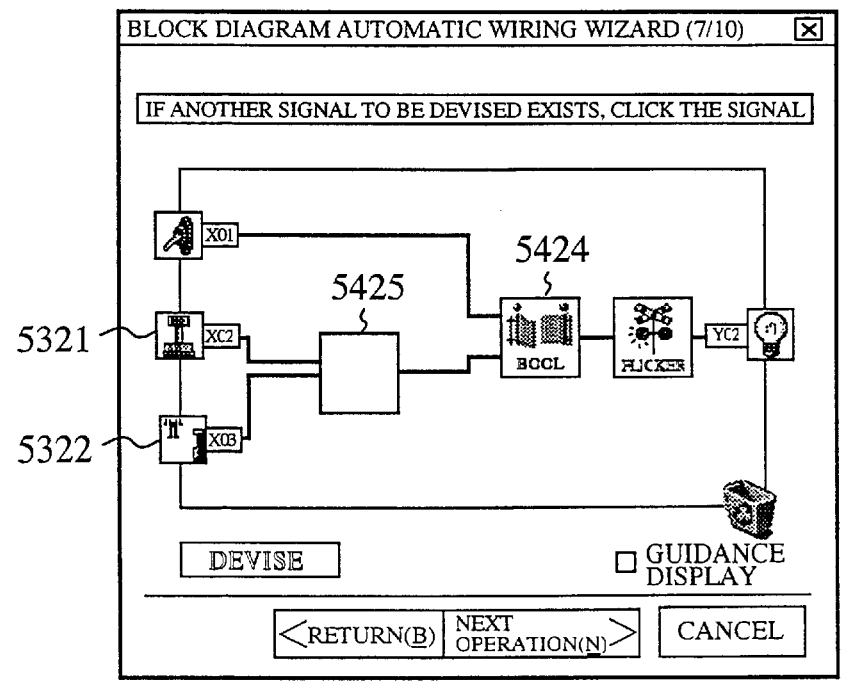
FIG. 54 is an explanatory diagram showing a programming box.

FIG. 53 is an explanatory diagram showing a typical user interface of the relevant object devising unit 5213. As shown in the figure, a plurality of inputs 5321 and 5322 are selected. As a result, the 'devise' button 5323 is displayed. FIG. 54 is an explanatory diagram showing a programming box 5425 displayed as a result of selection of the 'devise' button 5323 shown in FIG. 53.

As is obvious from comparison of FIG. 53 with FIG. 54, in FIG. 53, inputs 5321 and 5322 are connected directly by lines to an icon 5324 while, in FIG. 54 the inputs 5321 and 5322 are connected directly by lines to a programming box 5425 which is connected by a line to the icon 5324. The insertion of the programming box 5425 means that, when a plurality of inputs are selected to be devised, the same plurality of inputs are combined to give an additional new internal signal.

Next, processing carried out by the relevant object devising unit 5213 employed in the visual programming system implemented by the eighth embodiment as shown in FIG. 52 is explained.

Figure 55:
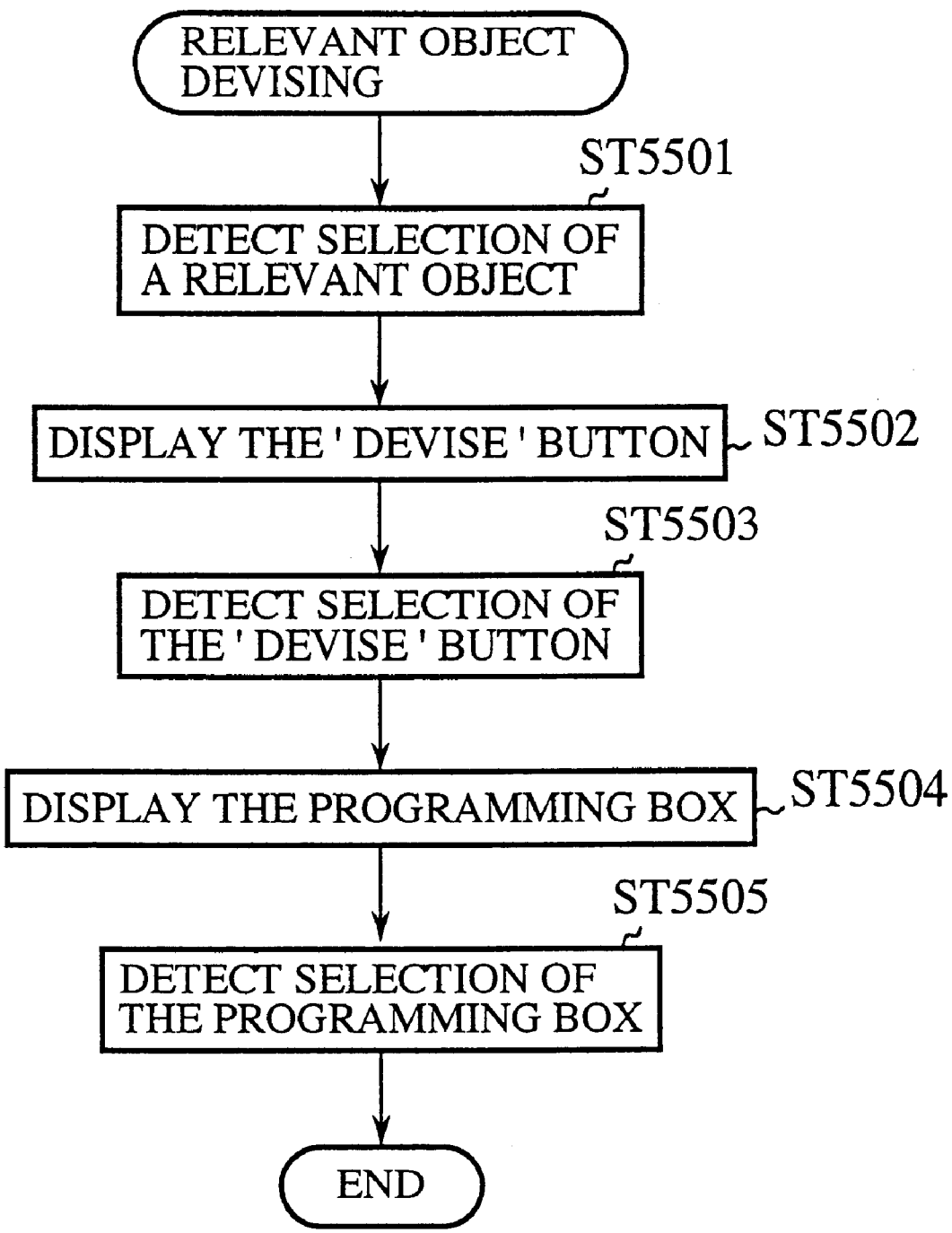
FIG. 55 is a flowchart showing typical operations carried out by the relevant object devising unit shown in FIG. 52.

FIG. 55 is a flowchart showing typical operations carried out by the relevant object devising unit 5213. As shown in the figure, the flowchart begins with a step ST5501 at which selection of one graphical object or a plurality of graphical objects each representing an input member on the behavioral characteristic setting window 4900 is detected. The selection of the same plurality of input members informs the graphical programming system that the user has an intention of devising the input members. Thus, at a step ST5502, the 'devise' button 5323 on the window shown in FIG. 53 is displayed to inform the user of a state allowing signals of input members to be devised. If a button other than the 'devise' button 5323 is clicked or double-clicked in this state, the 'devise' button 5323 is put in an unselectable state, terminating the processing carried out by the relevant object devising unit 5213 even though this feature is not explicitly shown in the figure.

The flow of the processing then goes on to a step ST5503 at which selection of the 'devise' button 5323 is detected. The detection of the selection of the 'devise' button 5323 informs the visual programming system that the user wants to do devising work. Thus, at a step ST5504, the programming box 5325 is displayed. As the programming box 5325 is double-clicked by using the mouse 21, the behavioral characteristic selection unit 5309 is activated, causing the behavioral characteristic selection window 3800 to be displayed. Even if the programming box 5325 is displayed, it is not necessary for the user to immediately double-click the programming box 5325 in order to activate the behavioral characteristic selection unit 5309. If not double-clicked, the programming box 5325 is stored in the visual programming system in a state of a parameter not set yet in the same way as other ions. If the programming box 5325 is put in a state of a parameter not set yet, the user will be informed of this state when the behavioral characteristic setting unit 4812 is activated.

When the user double-clicks the programming box 5425, the behavioral characteristic selection window 3800 is displayed. Since operations carried out hereafter are the same as those explained in the descriptions of the seventh and eighth embodiments, their explanation is not repeated here.

Figure 56:
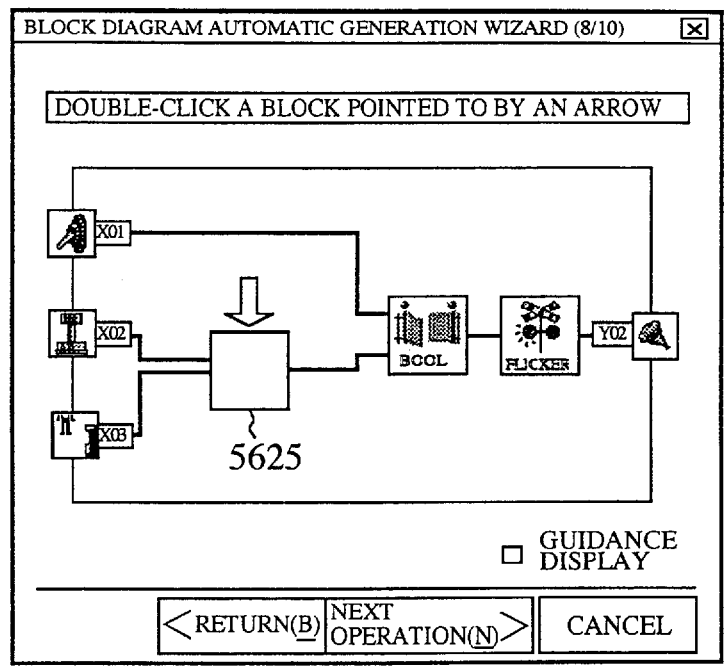
FIG. 56 is an explanatory diagram showing a case in which the programming system according to the present invention induces a setting operation of the programming box to the user.

FIG. 56 is an explanatory diagram showing a case in which the visual programming system notifies the user that a parameter of a programming box 5625 has not been set yet by putting an arrow icon above the programming box 5625 in an attempt to induce the user to start programming by double-clicking the programming box 5625.

Figure 57:
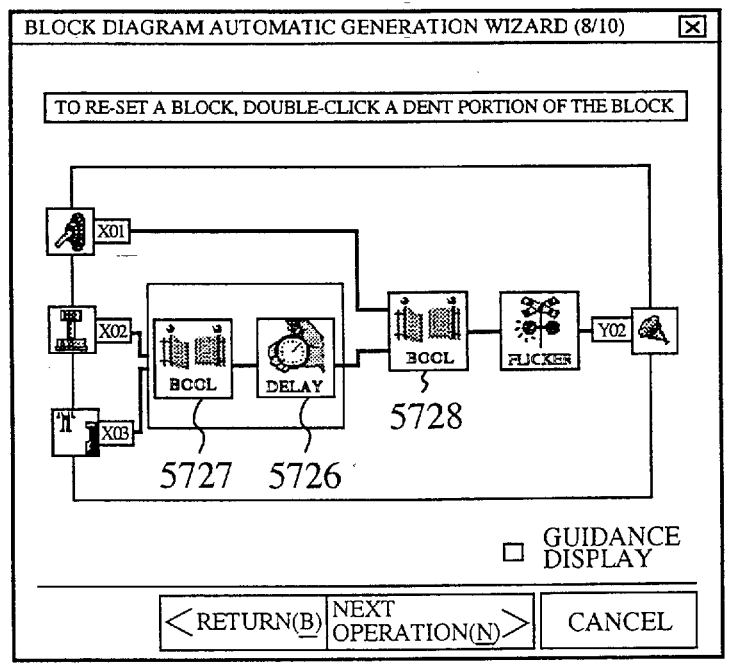
FIG. 57 is an explanatory diagram showing a typical user interface of a relevant object devising unit.

If the user double clicks the programming box 5625 in this state, the behavioral characteristic selection unit 3509 and the behavioral condition setting unit 3510 are activated sequentially one after another. FIG. 57 is an explanatory diagram showing a typical result of the double-clicking operation carried out by the user. FIG. 57 shows an icon 5726 representing a delay behavioral characteristic, that is, a function of delaying a behavior, and an icon 5727 representing a behavioral condition. The icons 5726 and 5727 respectively indicate that a delay behavioral characteristic has been selected by using the behavioral characteristic selection window 3800 and a behavioral condition has been set by using the behavioral condition setting window 4100.

In addition, there are dents around the icons 5726 and 5727 on the window shown in FIG. 57. By clicking the dent range outside the icon, the user is capable of re-setting of the programming box 5625 shown in FIG. 56 all over again.

As described above, according to the ninth embodiment, the relevant object devising unit 5213 allows a new internal signal to be added by using inputs selected by means of the relevant object selection unit 4812. As a result, there is exhibited an effect that the user is capable of creating a more complex program with ease and a higher degree of efficiency.

TENTH EMBODIMENT

Figure 58:
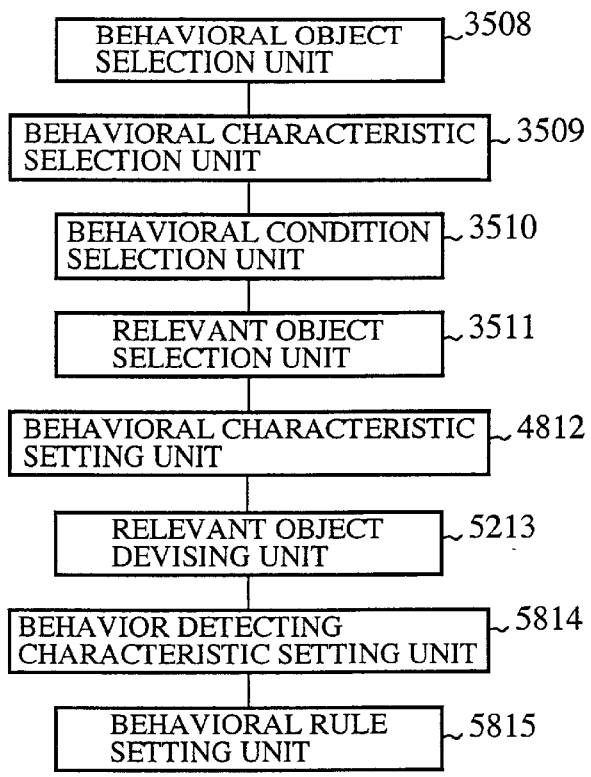
FIG. 58 is a block diagram showing a system adopting the programming method as implemented by a fourth embodiment of the present invention.

FIG. 58 is a block diagram showing a system adopting the visual programming method as implemented by a tenth embodiment of the present invention. In the figure, reference numerals 5814 and 5815 denote a behavior detecting characteristic setting unit and a behavioral rule setting unit respectively. It should be noted that, since the behavioral object selection unit 3508, the behavioral characteristic selection unit 3509, the behavioral condition setting unit 3510, the relevant object selection unit 3511, the behavioral characteristic setting unit 4812 and the relevant object devising unit 5213 shown in the figure are identical with those employed in the visual programming system implemented by the ninth embodiment as shown in FIG. 52, they are denoted by the same reference numerals as the latter and their description is not repeated.

The visual programming system implemented by the tenth embodiment is stored typically in the hard disc drive (HDD) 43 shown in FIG. 1 and, when necessary, loaded into the RAM unit 42 to be executed by the CPU 7 in conjunction with the display apparatus 1, the input apparatus 2 and other components.

In the description of the visual programming methods provided by seventh to ninth embodiments and the systems adopting the methods, each object outputs a signal only in ON and OFF steady states. In programming of a programmable logic controller (PLC), however, detection of a rising or falling edge of a signal other than the ON and OFF steady states may trigger a behavior. That is to say, in many cases, a member having an edge trigger characteristic is used.

In the visual programming method provided by the tenth embodiment and the system adopting the method, programming of an application system including a member with an edge trigger characteristic is made possible.

Next, processing carried out by the behavior detecting characteristic setting unit 5814 employed in the visual programming system implemented by the tenth embodiment as shown in FIG. 58 is explained.

The behavior detecting characteristic setting unit 5814 is used for setting the triggering characteristic of the behavior of a member selected by the user. To be more specific, the behavior detecting characteristic setting unit 5814 allows the behavior of a member selected by the user to be set at either 'ON/OFF' generally referring to a level (or steady) behavior or 'rising/falling' generally referring to an edge triggered behavior.

The behavior detecting characteristic setting unit 5814 is used for setting a parameter of an icon representing a behavioral condition. The function of the behavior detecting characteristic setting unit 5814 is provided on a behavioral characteristic setting window 4900. If an icon representing a behavioral condition is double-clicked, a behavior detecting characteristic setting window 5929 shown in FIG. 59 to be described later is displayed. By using this behavior detecting characteristic setting window 5929, the user sets the behavior of a selected member at either 'ON/OFF' or 'rising/falling/off'.

Figure 59:
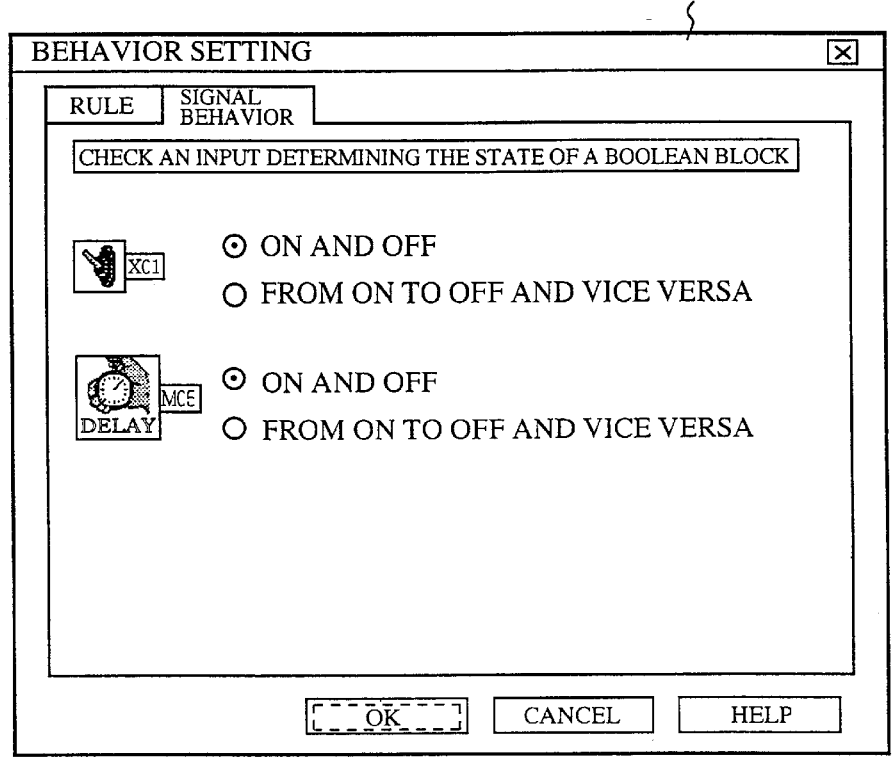
FIG. 59 is an explanatory diagram showing a behavior detecting characteristic setting window.

FIG. 59 is an explanatory diagram showing an example of the behavior detecting characteristic setting window 5929 serving as a user interface of the behavior detecting characteristic setting unit 5814. The behavior detecting characteristic setting window 5929 shown in FIG. 59 is displayed when the icon 5728 of a behavioral condition connected on the right side of the delay icon 5726 shown in FIG. 57 is double-clicked. On the behavior detecting characteristic setting window 5929 shown in FIG. 59, the input pin X01 connected to the icon 5728 and an icon M05 representing a delay characteristic are displayed. In this way, in the visual programming system implemented by the tenth embodiment, an icon connected to an icon representing a behavioral condition as an input is automatically extracted and displayed on the behavior detecting characteristic setting window 5929 shown in FIG. 59.

The behavior detecting characteristic setting window 5929 shown in FIG. 59 is used for selecting an event reporting any input to an icon representing a behavioral condition. A selected event can be 'when set at an ON or OFF level', 'when changed from an ON level to an OFF level' or 'when changed from an OFF level to an ON level'. Typically, the 'when set at an ON or OFF level' event is used as a default value.

The 'when changed from an ON level to an OFF level' event and the 'when changed from an OFF level to an ON level' event mean a falling edge and a rising edge respectively.

FIG. 60 is an explanatory diagram showing a rising edge, a falling edge and an ON level of a signal. Reference numeral 6030 shown in FIG. 60(*a*) denotes a rising edge of a signal which is detected at the instant the signal changes from an OFF level to an ON level. On the other hand, reference numeral 6031 shown in FIG. 60(*b*) denotes a falling edge of a signal which is detected at the instant the signal changes from an ON level to an OFF level. Reference numeral 6032 shown in FIG. 60(*c*) denotes both a rising edge and a falling edge of a signal which are detected at the instant the signal changes from an OFF level to an ON level and from an ON level to an OFF level respectively. Reference numeral 6033 shown in FIG. 60(*d*) denotes a detected ON level of a signal. In the case of the signals shown in FIGS. 60(*a*), 60(*b*) and 60(*c*), an instant or a transition is detected. In the case of the signal shown in FIG. 60(*d*), on the other hand, a steady state is detected.

Next, processing carried out by a behavioral rule setting unit 5815 employed in the visual programming system implemented by the tenth embodiment is explained.

The function of the behavioral rule setting unit 5815 is provided on the behavioral characteristic setting window 4900 and particularly used for setting a parameter of a Boolean icon. Parameters of a Boolean icon are set by entering a logic equation. A user having a problem to enter a logic equation may set a concrete behavior for an icon. In other words, by doing illustrative programming work, parameters of a Boolean icon can be set without entering a logic equation.

The behavioral rule setting unit 5815 is activated typically by double-clicking a Boolean icon, allowing the user to select either operations to enter a logic equation or illustrative programming. The user is also allowed to generate a logic equation by illustrative programming and then correct the generated logic equation.

Figure 61:
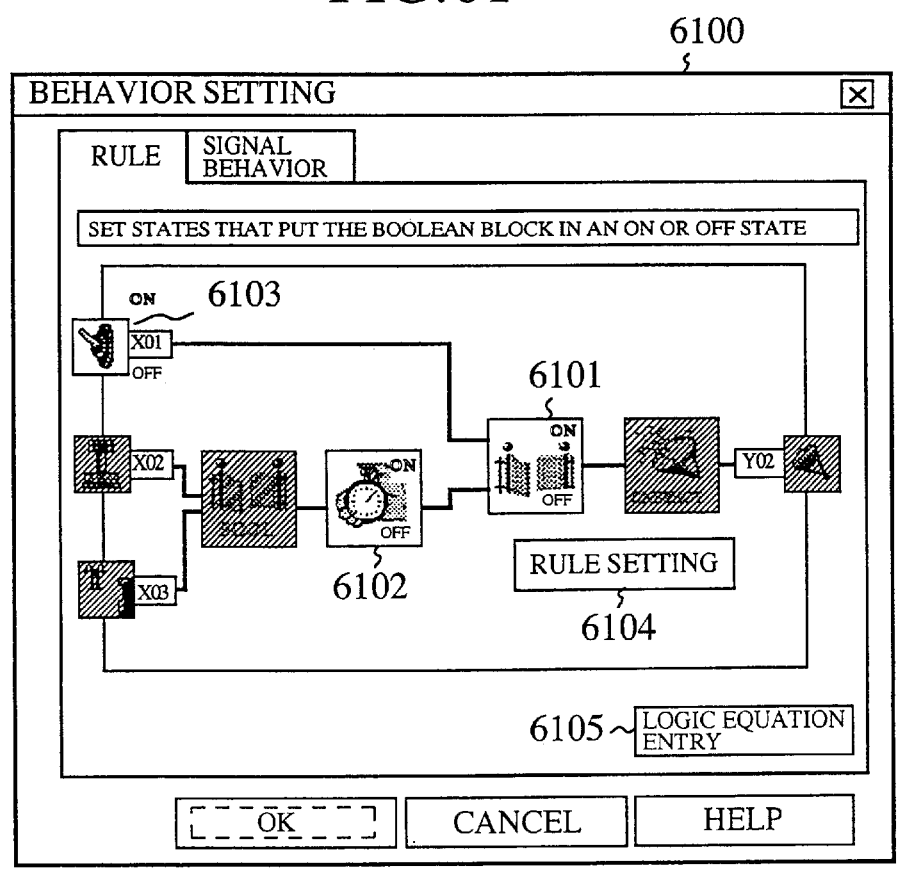
FIG. 61 is an explanatory diagram showing a typical user interface of a behavioral rule setting unit shown in FIG. 58.

FIG. 61 is an explanatory diagram showing a typical user interface of the behavioral rule setting unit 5815. The figure shows an example in which, when icons 6102 and 6103 connected as inputs to an icon 6101 representing a behavioral condition are both ON, the icon 6101 is also ON.

By default, the icons 6101, 6102 and 6103 are OFF. When any of them is clicked, its state is changed from OFF to ON or vice versa. When a 'rule setting' button 6104 is clicked after the setting of the states, the visual programming system stores information presently displayed on the window 6100 as one of Boolean rules of the Boolean icon 6101. After this work to set such a Boolean rule is carried out repeatedly, the visual programming system generates a logic equation from the set Boolean rules. During generation of a logic equation, the system displays Boolean rules that are not set by the user yet sequentially on the window 6100. The user is then allowed to make a decision as to whether or not to set the displayed Boolean rules as behavioral rules. At that time, when the 'rule setting' button 6104 is clicked, a displayed Boolean rule is set as a behavioral rule. If another button such as 'not set as a rule' button which is displayed separately from the 'rule setting' button 6104 is clicked, on the other hand, the displayed Boolean rule is not set as a behavioral rule. By carrying out this operation repeatedly for each displayed Boolean rule, the user is capable of preventing a Boolean rule from being overlooked. It should be noted that the additional Boolean rules themselves which are displayed by the visual programming system are not discussed here. It is needless to say that, if the behavior detecting characteristic setting unit 5814 executes edge trigger setting, behavioral rules for a member having an edge triggering characteristic can be set. It should be noted that no further detailed description is given.

Figure 62:
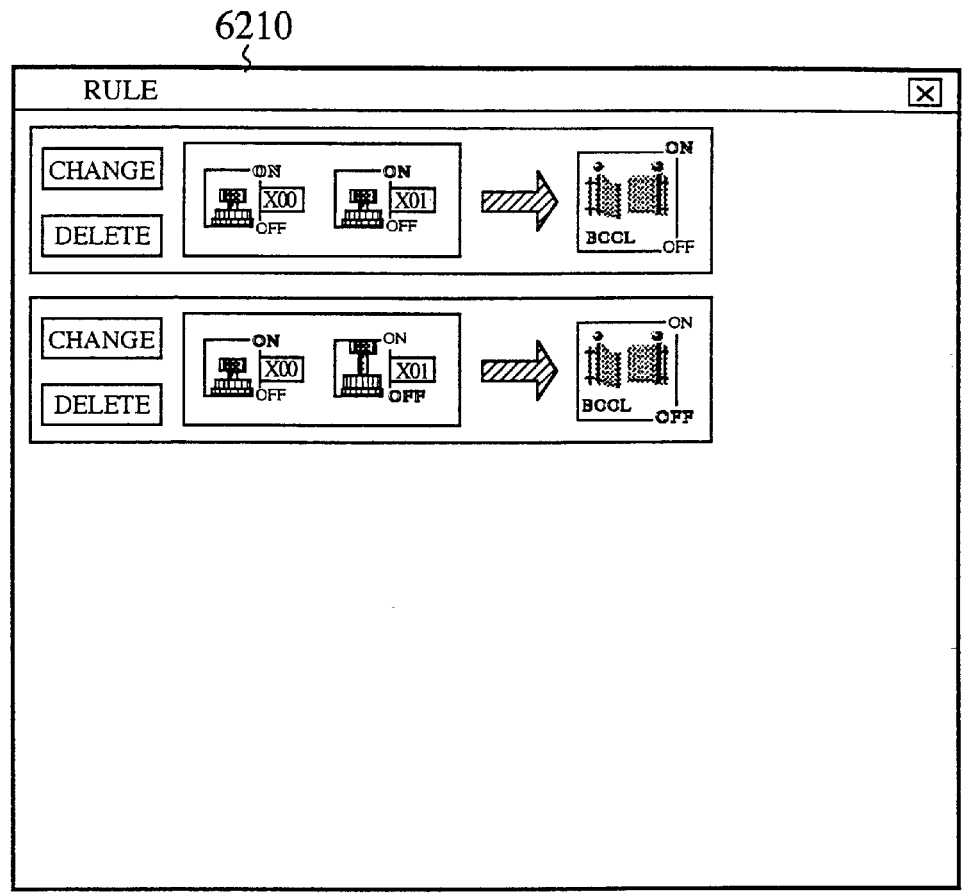
FIG. 62 is an explanatory diagram showing a behavioral rule table window.

FIG. 62 is an explanatory diagram showing a typical behavioral rule table window 6210. On the behavioral rule table window 6210 shown in the figure, an already set behavioral rule other than that set on the window 6100 shown in FIG. 61 is displayed. By displaying the behavioral rule table window 6210 in this way, the user is capable of preventing an operation of duplicating a behavioral rule from being carried out.

Next, processing carried out by the behavior detecting characteristic setting unit 5814 employed in the visual programming system implemented by the tenth embodiment as shown in FIG. 58 is explained.

Figure 63:
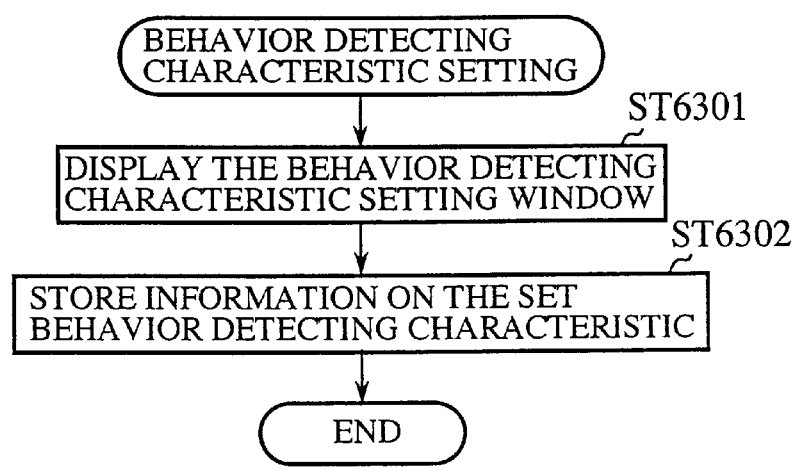
FIG. 63 is a flowchart showing typical operations carried out by the behavior detecting characteristic setting unit shown in FIG. 58.

FIG. 63 is a flowchart showing typical processing carried out by the behavior detecting characteristic setting unit 5814. As shown in the figure, the flowchart begins with a step ST6301 at which the behavior detecting characteristic setting window 5929 shown in FIG. 59 is displayed upon detection of the fact that an icon representing a behavioral rule was double-clicked by the user. At that time, an icon connected to the double-clicked Boolean icon as an input is identified and displayed on the behavior detecting characteristic setting window 5929.

The flow of the processing then goes on to a step ST6302 at which information on an item on the behavior detecting characteristic setting window 5929 selected by the user is stored typically in the RAM unit 42 employed in the visual programming system shown in FIG. 1.

Next, processing carried out by a behavioral rule setting unit 5815 employed in the visual programming system implemented by the tenth embodiment as shown in FIG. 58 is explained.

Figure 64:
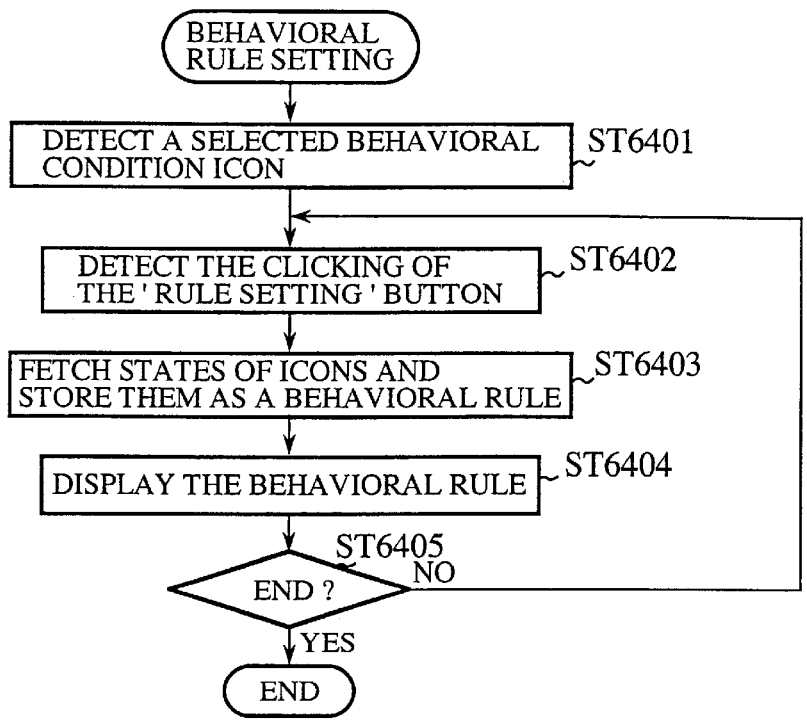
FIG. 64 is a flowchart showing typical operations carried out by the behavioral rule setting unit shown in FIG. 58.

FIG. 64 is a flowchart showing typical operations carried out by the behavioral rule setting unit 5815.

As shown in the figure, the flowchart begins with a step ST6401 at which a Boolean icon selected by a click operation is detected. The flow of the processing then goes on to a step ST6402 at which the operation to click the 'rule setting' button 6104 on the window shown in FIG. 61 is detected. Then, the flow of the processing proceeds to a step ST6403 at which the states of icons serving as inputs to the Boolean icon detected at the step ST6401 are fetched to generate a behavioral rule which is then stored. The flow of the processing then continues to a step ST6404 at which a behavioral rule generated at the step ST6403 is displayed on another window. Then, the flow of the processing goes on to a step ST6405 to form a judgment as to whether or not the processing to set behavioral rules has been completed. If not completed yet, the flow of the processing returns to the step ST6402. A judgment is formed at the step ST6405 typically by finding out whether or not an icon other than the icons detected at the steps ST6401 and 6402 or a button other than the 'rule setting' button 6104 has been clicked.

The flowchart shown in FIG. 64 shows typical operations carried out only for one Boolean icon. By repeating these operations, however, it is possible to keep up with a plurality of Boolean icons if such icons exist.

As described above, according to the tenth embodiment, by using the behavior detecting characteristic setting unit 5814, the user is capable of creating a more sophisticated and complex program. In addition, by using the behavioral rule setting unit 5815, the user is capable of visually generating a logic function without entering a logic equation and, hence, carrying out the work to create a more sophisticated program with ease and a higher degree of efficiency.

ELEVENTH EMBODIMENT

Figure 65:
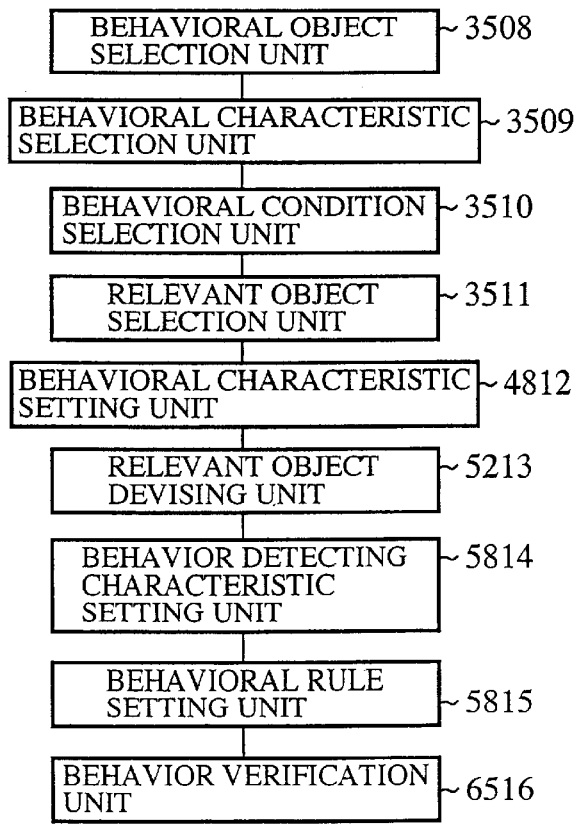
FIG. 65 is a block diagram showing a system adopting the programming method as implemented by a fifth embodiment of the present invention.

FIG. 65 is a block diagram showing a system adopting the visual programming method as implemented by an eleventh embodiment of the present invention. In the figure, reference numeral 6516 denotes a behavior verification unit. It should be noted that, since the behavioral object selection unit 3508, the behavioral characteristic selection unit 3509, the behavioral condition setting unit 3510, the relevant object selection unit 3511, the behavioral characteristic setting unit 4812, the relevant object devising unit 5213, the behavior detecting characteristic setting unit 5814 and the behavioral rule setting unit 5815 shown in the figure are identical with those employed in the visual programming system implemented by the tenth embodiment as shown in FIG. 58, they are denoted by the same reference numerals as the latter and their description is not repeated.

The visual programming system implemented by the eleventh embodiment is stored typically in the hard disc drive (HDD) 43 shown in FIG. 1 and, when necessary, loaded into the RAM unit 42 to be executed by the CPU 7 in conjunction with the display apparatus 1, the input apparatus 2 and other components.

The function of the behavior verification unit 6516 is presented to the user on the same window as the function setting window 4900. By clicking an icon displayed on the window, the user is capable of verifying the behavior of each member.

Figure 66:
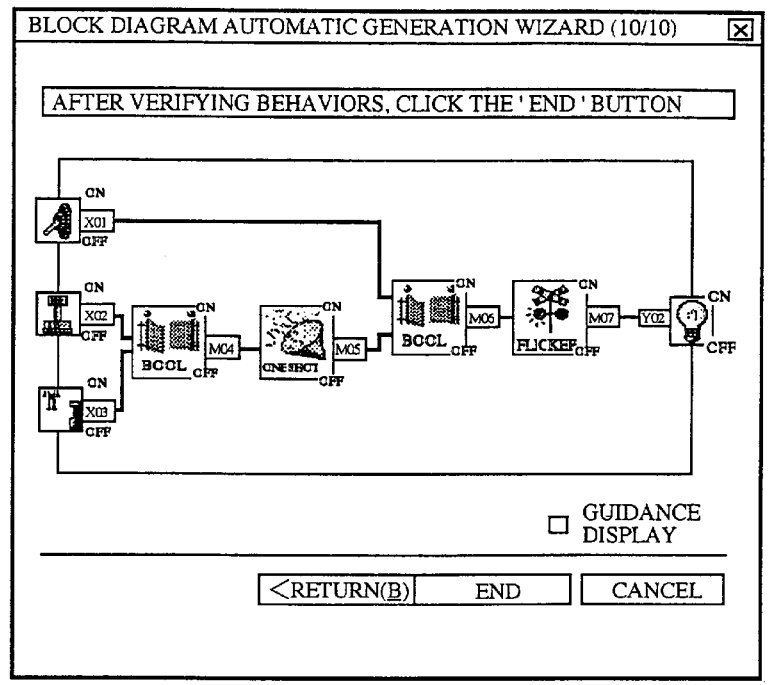
FIG. 66 is an explanatory diagram showing a typical user interface of a behavior verification unit shown in FIG. 65.

FIG. 66 is an explanatory diagram showing a typical user interface of the behavior verification unit 6516.

According to a set logic function wherein a Boolean icon M06 displayed on the window shown in FIG. 66 is ON when members X01 and M05 are ON, if the one-shot icon M05 and the input switch icon X01 are turned on by click operations, a flicker icon M07 is also turned on, causing an output icon Y02 to flicker for a period of time set in the one-shot icon M05.

Next, processing carried out by the behavior verification unit 6516 employed in the visual programming system implemented by the eleventh embodiment as shown in FIG. 65 is explained.

Figure 67:
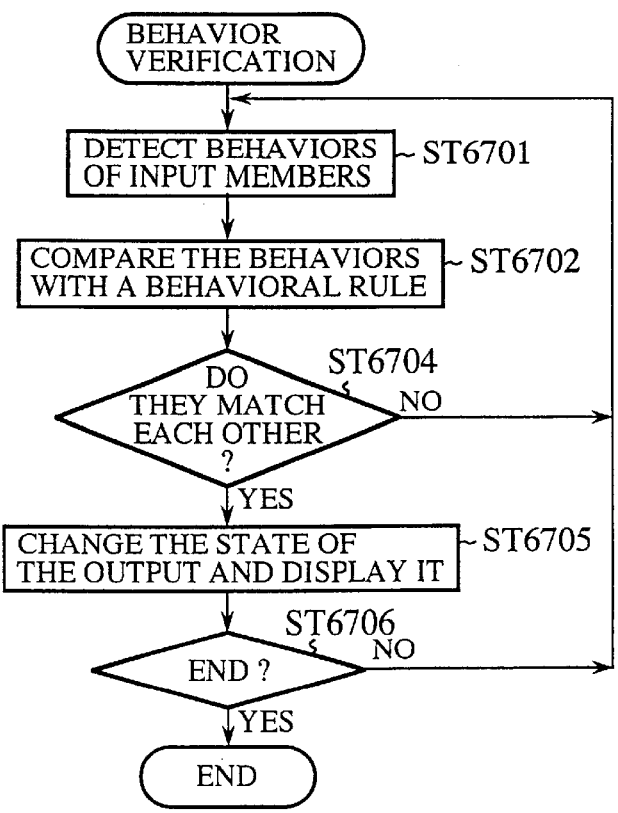
FIG. 67 is a flowchart showing typical operations carried out by the behavior verification unit shown in FIG. 65.

FIG. 67 is a flowchart showing typical operations carried out by the behavior verification unit 6516. As shown in the figure, the flowchart begins with a step ST6701 at which a state such as ON or OFF set in icons serving as inputs to each Boolean icon are detected. The flow of the processing then goes on to a step ST6702 at which the states detected at the step ST6701 are substituted for parameters of a logic function for the Boolean icon to find the value of the logic function which can be either TRUE or FALSE.

The flow of the processing then proceeds to a step ST6703 to form a judgment as to whether the value of the logic function found at the step ST6702 is TRUE or FALSE. If the value of the logic function is TRUE, the flow of the processing continues to a step ST6704. If the value of the logic function is FALSE, on the other hand, the flow of the processing returns to the step ST6701 to wait for the setting of input members to be changed.

At the step ST6704, the behavior of the output is changed. The flow of the processing then goes on to a step ST6705 to form a judgment as to whether or the processing carried out by the behavior verification unit 6516 has been completed. If not completed yet, the flow of the processing returns to the step ST6701.

As described above, according to the eleventh embodiment, by using the behavior verification unit 6516, the user is capable of verifying the behavior of a created program with ease. As a result, there is exhibited an effect that work to create a complex program can be done with ease and a higher degree of efficiency.

TWELFTH EMBODIMENT

Figure 68:
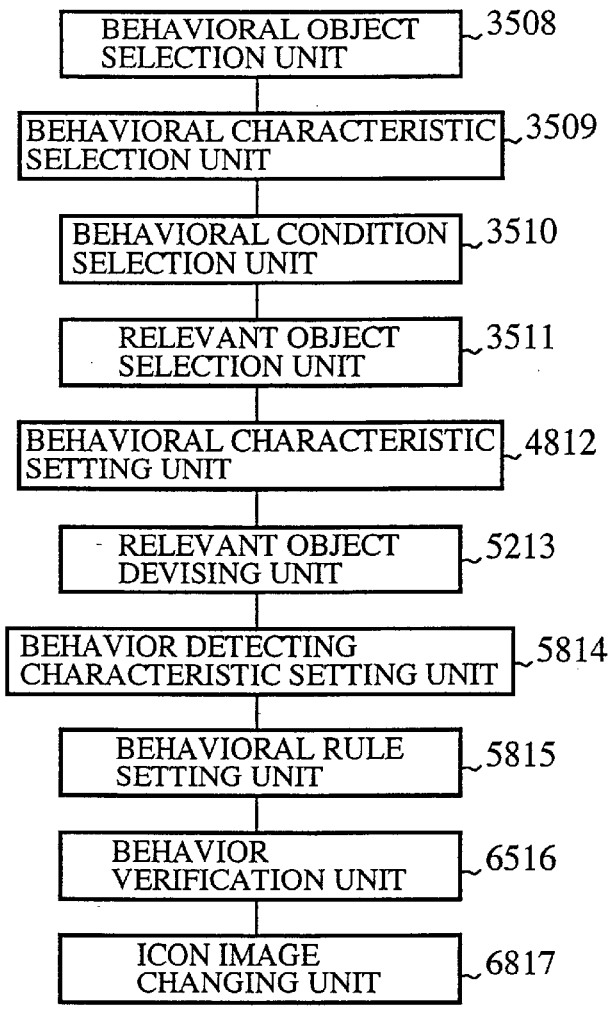
FIG. 68 is a block diagram showing a system adopting the programming method as implemented by a sixth embodiment of the present invention.
Figure 69:
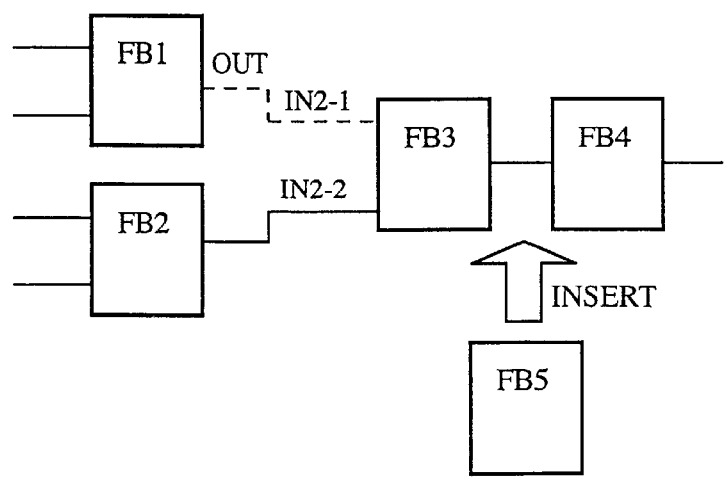
FIG. 69 is an explanatory diagram showing a typical operation to connect FBs to each other by a line.

FIG. 68 is a block diagram showing a system adopting the visual programming method as implemented by a twelfth embodiment of the present invention. In the figure, reference numeral 6817 denotes an icon image changing unit. It should be noted that, since the behavioral object selection unit 3508, the behavioral characteristic selection unit 3509, the behavioral condition setting unit 3510, the relevant object selection unit 3511, the behavioral characteristic setting unit 4812, the relevant object devising unit 5213, the behavior detecting characteristic setting unit 5814, the behavioral rule setting unit 5815 and the behavior verification unit 5816 shown in the figure are identical with those employed in the visual programming system implemented by the eleventh embodiment as shown in FIG. 65, they are denoted by the same reference numerals as the latter and their description is not repeated.

The visual programming system implemented by the twelfth embodiment is stored typically in the hard disc drive (HDD) 43 shown in FIG. 1 and, when necessary, loaded into the RAM unit 42 to be executed by the CPU 7 in conjunction with the display apparatus 1, the input apparatus 2 and other components.

Description of operations carried out by the icon image changing unit 6817 and the user interface thereof is omitted. At any rate, if a plurality of different icons representing the same object are stored in advance in the storage apparatus 4 shown in FIG. 1, by using the icon image changing unit 6817, the user is capable of changing the image of an icon used in visual programming with a high degree of freedom. As a result, it is possible to provide the user with a very friendly user interface which gives rise to an effect that each user is capable of doing work to create a program more visually, more easily and more efficiently.

As described above, the visual programming method provided by the present invention comprises the steps of: displaying graphical objects each defining a behavior on a graphical editor used for carrying out programming work by operating graphical objects each visually representing a function and selecting ones of the displayed graphical objects as objects used in the programming work; displaying behavioral characteristics of the graphical objects and selecting a behavioral characteristic of each of the selected graphical objects; defining a relation among a plurality of aforementioned selected graphical objects; and setting a behavioral rule of the selected graphical objects.

As a result, there is exhibited an effect that a user who never gets professional programming training is capable of visually developing a program with ease by merely clicking graphical objects displayed on a screen of the graphical editor using a device such as a mouse without the need to master a programming language which is difficult to understand. There is also exhibited a result that, in a domain in which only specialists doing work such as PLC (programmable logic controller) programming particularly requiring professional knowledge of a programming language and sequence control are capable of creating programs, a user getting no professional training is also capable of creating such programs with ease.

In addition, according to the present invention, the step of selecting a behavioral characteristic of a graphical object displayed on the graphical editor further includes a step of entering a detailed parameter of the behavioral characteristic. As a result, there is exhibited an effect that the user is capable of changing a set value of a behavioral characteristic and, hence, creating a program with ease.

Moreover, according to the present invention, the step of setting a behavioral rule of graphical objects each defining a behavior on the graphical objects further includes a step of generating a behavioral rule not set yet on the graphical editor from already set behavioral rules. As a result, there is exhibited an effect that the user is capable of creating a program with ease without the need to take all behavioral rules into consideration.

Further, according to the present invention, the step of generating a behavioral rule not set yet from already set behavioral rules further includes a step of displaying the generated behavioral rule. As a result, there is exhibited an effect that the user is capable of creating a program with ease.

In addition, according to the present invention, the step of generating a behavioral rule not set yet from already set behavioral rules further includes a step of allowing the user to modify a generated behavioral rule by entering an acceptance or refusal input in response to the displayed behavioral rule. As a result, there is exhibited an effect that the user is capable of creating a program with ease.

Moreover, according to the present invention, there is further included a step of adding a modified behavioral rule to already set behavioral rules. As a result, there is exhibited an effect that the user is capable of creating a program with ease.

Further, according to the present invention, there is further included a step of generating a logic equation from already set behavioral rules. As a result, there is exhibited an effect that matching processing of behavioral rules during an operation can be eliminated, allowing a program generated by the visual programming system to be executed at a high speed and, hence, the efficiency of the programming work to be enhanced.

In addition, according to the present invention, there is further included a step of displaying results of the visual programming on the graphical editor obtained at each of the steps in terms of graphical objects and allowing the user to verify a behavior by operating the graphical objects displayed on the graphical editor. As a result, there is exhibited an effect that the user is capable of correctly creating a program with ease.

Moreover, according to the present invention, a step of verifying a behavior further includes a step of generating a literal sentence written in a natural language to describe a program displayed on the graphical editor and displaying the generated literal sentence on the graphical editor. As a result, there is exhibited an effect that the user is capable of creating a program with ease.

Further, according to the present invention, there is provided a visual programming system wherein:
an object selection means displays graphical objects each defining a behavior on a graphical editor and allows the user to select ones of the displayed graphical objects as objects used in the programming work; a behavior selection means displays behavioral characteristics of the graphical objects and allows the user to select a behavioral characteristic of each of the selected graphical objects; a relevant object selection means defines a relation among a plurality of aforementioned graphical objects selected by using the object selection means and the behavior selection means; and a behavioral rule setting means sets a behavioral rule of the selected graphical objects.

As a result, there is exhibited an effect that the user is capable of creating a program with ease by operating graphical objects obtained as a result of visually expressing a function. That is to say, there is exhibited an effect that a user who never gets professional programming training is capable of visually developing a program with ease by merely clicking graphical objects displayed on a screen of the graphical editor using a device such as a mouse without the need to master a programming language which is difficult to understand. There is also exhibited a result that, in a domain in which only specialists doing work such as PLC (programmable logic controller) programming particularly requiring professional knowledge of a programming language and sequence control are capable of creating programs, a user getting no professional training is also capable of creating such programs with ease.

In addition, according to the present invention, a behavioral parameter setting means allows the user to enter a detailed parameter of a behavior selected by using the behavior selection means to the graphical editor. As a result, there is exhibited an effect that the user is capable of changing a set value of a behavioral characteristic and, hence, creating a program with ease.

Moreover, according to the present invention, a behavioral rule generation means generates a behavioral rule not set yet on the graphical editor from behavioral rules already set by the behavioral rule setting means. As a result, there is exhibited an effect that the user is capable of creating a program with ease.

Further, according to the present invention, a generated rule display means displays a behavioral rule generated by the behavioral rule generation means. As a result, there is exhibited an effect that the user is capable of creating a program with ease without the need to take all behavioral rules into consideration.

In addition, according to the present invention, a behavioral rule modification means allows the user to modify a behavioral rule displayed by the system generated rule display means by entering an acceptance or refusal input in response to the displayed behavioral rule. As a result, there is exhibited an effect that the user is capable of creating a program with ease.

Moreover, according to the present invention, a behavioral rule addition means adds a behavioral rule changed by the behavioral rule modification means to behavioral rules already set by the behavioral rule setting means. As a result, there is exhibited an effect that the user is capable of creating a program with ease.

Further, according to the present invention, a logic equation generation means automatically generates a logic equation from already set behavioral rules. As a result, there is exhibited an effect that matching processing of behavioral rules during an operation can be eliminated, allowing a program generated by the visual programming system to be executed at a high speed and, hence, the efficiency of the programming work to be enhanced.

In addition, according to the present invention, a behavior verification means displays a program automatically generated on the basis of data supplied by the behavior selection means, the behavioral parameter setting means and the logic equation generation means on the graphical editor in terms of graphical objects and allows the user to verify a behavior by operating the graphical objects displayed on the graphical editor. As a result, there is exhibited an effect that the user is capable of correctly creating a program with ease.

Moreover, according to the present invention, a natural language statement display means generates a literal sentence written in a natural language to describe a program displayed on the graphical editor by the behavior verification means and displays the generated literal sentence on the graphical editor. As a result, there is exhibited an effect that the user is capable of creating a program with ease.

Further, according to the present invention, a behavioral object selection means is used for selecting a graphical object for defining a behavior, a behavioral characteristic selection unit is used for selecting a behavior to be defined for a graphical objects, a behavioral condition setting unit is used for setting a behavioral condition for a graphical object to display a behavior and a relevant object selection unit is used for selecting a graphical object relevant to the behavior of a graphical object selected by using the behavioral object selection unit. As a result, there is exhibited an effect that the user is capable of creating a program with ease by operating graphical objects obtained as a result of visually expressing a function. That is to say, there is exhibited an effect that a user who has a lack of professional knowledge of programming is capable of visually developing a program with ease by merely clicking graphical objects displayed on a screen of the graphical editor using a device such as a mouse without the need to master a programming language which is difficult to understand. There is also exhibited a result that, in a domain in which only specialists doing work such as PLC (programmable logic controller) programming particularly requiring professional knowledge of a programming language and sequence control are capable of creating programs, a user getting no professional training is also capable of creating such programs with ease.

In addition, according to the present invention, a behavioral characteristic setting unit allows a detailed parameter of a behavioral characteristic selected by the behavioral characteristic selection unit to be set. As a result, there is exhibited an effect that the user is capable of changing a set value of a behavioral characteristic and, hence, carrying out work to create a program with ease and a higher degree of efficiency.

Moreover, according to the present invention, a relevant object devising unit allows a new internal signal to be added by using inputs selected by using the relevant object selection unit. As a result, there is exhibited an effect that the user is capable of carrying out work to create a program with ease and a higher degree of efficiency.

Further, according to the present invention, by using the behavior detecting characteristic setting unit, the user is capable of creating a more sophisticated and complex program. In addition, by using a behavioral rule setting unit, the user is capable of visually generating a logic function without entering a logic equation and, hence, carrying out the work to create a more sophisticated program with ease and a high degree of efficiency.

As described above, according to the present invention, by using the behavior detecting characteristic setting unit, the user is capable of creating a more sophisticated and complex program. In addition, by using the behavioral rule setting unit, the user is capable of visually generating a logic function without entering a logic equation and, hence, carrying out the work to create a more sophisticated program with ease and a high degree of efficiency.

Further, according to the present invention, by using a behavior verification unit, the user is capable of verifying the behavior of a created program with ease. As a result, the user is capable of carrying out the work to create a more sophisticated program with ease and a high degree of efficiency.

INDUSTRIAL APPLICABILITY

As described above, the visual programming method provided by the present invention and the system adopting the method are based on a technique of user interfacing that allows a program to be generated automatically by selecting an object for defining a behavior, defining a behavior and setting a behavioral rule on a graphical editor. Examples of possible fields in industries in which the present invention can be applied in an optimal manner are the field of functional block diagrams and visual programming tools based on a diagrams widely used as a programming language of programmable logic controllers (PLCs), and the field of a working environment for doing programming work on a screen by operating graphical objects such as icons and characters used in the GUI commonly known as a user interface for personal computers and workstations which play the role of graphical editor.

What is claimed is:

1. A visual programming method comprising:

a first step of displaying graphical objects representing a plurality of members connected to output terminals of a programmable logic controller;

a second step of displaying graphical objects representing the output terminals of the programmable logic controller;

a third step of connecting a first graphical object selected by a user from the graphical objects representing the plurality of members displayed in the first step, to a second graphical object selected by the user from the graphical objects representing the output terminals and displayed in the second step;

a fourth step of allowing a user to select a graphical object or a plurality of graphical objects from said graphical objects each used for defining a function and displayed at said first step and transferring the same plurality of selected graphical objects to said layout diagram;

a sixth step of creating a layout diagram showing a layout of the graphical objects representing the plurality of members and displaying said layout diagram on a screen;

a seventh step of allowing the user to select one of said graphical objects each used for defining a function and transferring said selected graphical object to said layout diagram created and displayed at said sixth step;

an eighth step of allowing a user to select a plurality of graphical objects from said graphical objects each used for defining a function and displayed at said first step and transferring the same plurality of selected graphical objects to said layout diagram created at said sixth step;

a ninth step of allowing a user to select a graphical object or a plurality of graphical objects from said graphical objects each used for defining a function and displayed at said first step and transferring the same plurality of selected graphical objects to said layout diagram created at said sixth step as well as displaying the same plurality of selected graphical objects on said layout diagram;

a tenth step of identifying arrangement orders of graphical objects selected by a user and assigning a priority to each of said arrangement orders when a plurality of arrangement orders are identified;

an eleventh step of displaying the same plurality of identified arrangement orders sequentially one after another in a sequence determined by said priorities assigned thereto at said tenth step, a twelfth step of allowing the user to select an arrangement order among the same plurality of identified arrangement orders displayed sequentially at said eleventh step;

a thirteenth of allowing a user to change an arrangement order of graphical objects selected by the user at said twelfth step;

a fourteenth step of detecting a settable parameter graphical object with a new parameter thereof among graphical objects selected by a user and notifying the user of a result of detection;

a fifteenth step of detecting selection of said graphical object reported to the user at said fourteenth step or a graphical object other than said reported graphical object and creating and displaying a window used for setting a parameter of said reported graphical object or said other graphical object; and a sixteenth step of allowing the user to set said parameter on said window displayed at said fifteenth step.

2. A visual programming method according to claim 1 further comprising a fourth step of allowing a user to select a graphical object or a plurality of graphical objects from said graphical objects each used for defining a function and displayed at said first step and transferring the same plurality of selected graphical objects to said layout diagram.

3. A visual programming method according to claim 2 further comprising a fifth step of displaying a graphical object or a plurality of graphical objects transferred at said fourth step on said layout diagram.

4. A visual programming method according to claim 1 further comprising:

a seventeenth step of selecting one graphical object or a plurality of graphical objects among graphical objects displayed on said graphical editor used for carrying out programming work by operating graphical objects each visually representing a function;

an eighteenth step of creating a new graphical object on the basis of said graphical objects selected at said seventeenth step and putting said created new graphical object in a displayable state; and a nineteenth step of displaying said new graphical object.

5. A visual programming method according to claim 4 further comprising:

a twentieth step of setting state information for graphical objects displayed on said graphical editor used for carrying out programming work by operating graphical objects each visually representing a function;

a twenty-first step of allowing a user to set a state of each of said graphical objects on the basis of setting carried out at said twentieth step; and a twenty-second step of storing a result obtained at said twenty-first step as a function rule.

6. A visual programming method according to claim 5 further comprising a twenty-third step of re-creating and displaying a behavioral rule stored at said twenty-second step on another screen.

7. A visual programming method according to claim 6 further comprising:

a twenty-fourth step of allowing a user to change a state of a graphical object; and a twenty-fifth step comprising the steps of:

monitoring a state of a graphical object set at said twenty-fourth step;

setting state information in said displayed graphical objects used for carrying out programming work by operating ordinary graphical objects each visually representing a function; and, if a condition set by the user with respective states of said graphical objects used as rules on the basis of said set state information is satisfied, detecting a parameter settable graphical object with a new parameter thereof from graphical objects selected by the user;

detecting selection of said parameter settable graphical object or a graphical object other than said parameter settable graphical object and creating a window used for setting a parameter of said parameter settable graphical object or said other graphical object;

allowing the user to set a parameter on said displayed window; and changing a state of said graphical object in accordance with said parameter set by the user.

8. A visual programming method according to claim 7 further comprising a twenty-sixth step of allowing a user to change an image of a graphical object.

9. A programming system comprising:

display means for displaying graphical objects representing a plurality of members connected to output terminals of a programmable logic controller, and for displaying graphical objects representing the output terminals of the programmable logic controller;

transfer means for connecting the graphical object selected by the user from the graphical objects representing the plurality of members displayed, to the graphical objects selected by the user from the graphical objects representing the output terminals and displayed;

said display means creating a layout diagram showing a layout of graphical objects representing configuration members of an application system being created by a user and displaying said layout diagram on a screen different from a screen for displaying a layout diagram showing a layout of graphical objects each defining a behavior;

said transfer means transferring a graphical object selected by a user from said graphical objects each defining a behavior to said layout diagram different from said laid out diagram showing a layout of graphical objects representing configuration members of an application system;

notification means for detecting a settable parameter graphical object with a parameter thereof not set yet among graphical objects selected by a user and notifying the user of a result of detection; and parameter setting means for detecting selection of said graphical object reported to the user by said notification means or a graphical object other than said reported graphical object and allowing the user to set a parameter of said reported graphical object or said other graphical object on a window created and displayed by said display means for setting a parameter.

10. A programming system according to claim 9 wherein said display means displays one graphical object or a plurality of graphical objects transferred by said transfer means on said layout diagram.

11. A programming system according to claim 9 further comprising:

an identifying means for identifying arrangement orders of graphical objects selected by a user and assigning a priority to each of said arrangement orders when a plurality of arrangement orders are identified;

a step display means for displaying the same plurality of identified arrangement orders sequentially one after another in a sequence determined by said priorities assigned thereto by said identifying means; and a select means for allowing the user to select an arrangement order among the same plurality of identified arrangement orders displayed sequentially by said step display means.

12. A programming system according to claim 9 further comprising a change means for allowing a user to change an arrangement order of graphical objects selected by the user.

13. A programming system according to claim 9 further comprising:

select means for selecting one graphical object or a plurality of graphical objects among graphical objects displayed on said graphical editor used for carrying out programming work by operating graphical objects each visually representing a function;

new object creation means for creating a new graphical object on the basis of said one graphical object or the same plurality of graphical objects selected by said select means and putting said created new graphical object in a displayable state; and new object display means for displaying said new graphical object.

14. A programming system according to claim 9 further comprising:

state information setting means for setting date information for graphical objects displayed on said graphical editor used for carrying out programming work by operating graphical objects each visually representing a function;

state setting means for allowing a user to set a state of each of said graphical objects on the basis of setting carried out by said state information setting means; and behavioral rule saving means for storing a result produced by said state setting means as a behavioral rule.

15. A programming system according to claim 14 further comprising a rule display means for re-creating and displaying a rule stored by said rule saving means on a new screen.

16. A programming system comprising:

display means for displaying graphical objects representing a plurality of members connected to output terminals of a programmable logic controller, and for displaying graphical objects representing the output terminals of the programmable logic controller;

transfer means for connecting the graphical object selected by the user from the graphical objects representing the plurality of members displayed in the first step, to the graphical objects selected by the user from the graphical objects representing the output terminals and displayed;

said display means creating a layout diagram showing a layout of graphical objects representing configuration members of an application system being created by a user and displays said layout diagram on a screen different from a screen for displaying a layout diagram showing a layout of graphical objects each defining a function;

said transfer means transferring a graphical object selected by a user from said graphical objects each defining a function to said layout diagram different from said laid out diagram showing a layout of graphical objects representing configuration members of an application system;

state information setting means for setting state information for graphical objects displayed on said graphical editor used for carrying out programming work by operating graphical objects each visually representing a function;

state setting means for allowing a user to set a state of each of said graphical objects on the basis of setting carried out by said state information setting means;

rule saving means for storing a result produced by said state setting means as a rule;

state change means for allowing a user to change a state of graphical object; and state change display means for monitoring a state of a graphical object set by said state change means; and, if a condition for respective states of said graphical objects set by the user on the basis of said set state information of each of said graphical objects is satisfied, changing a state of said graphical object with a parameter thereof set among said graphical objects each having a settable parameter, and displaying said state.

17. A programming system according to claim 16 wherein said display means displays a graphical object or a plurality of graphical objects transferred by said transfer means on a layout diagram different from a layout diagram showing a layout of graphical objects representing configuration members of an application system.

* * * * *